United States Patent
Shinozuka et al.

(10) Patent No.: US 6,240,207 B1
(45) Date of Patent: May 29, 2001

(54) HANDWRITING INPUT DISPLAY APPARATUS HAVING IMPROVED SPEED IN CHANGING DISPLAY OF ENTERED HANDWRITING

(75) Inventors: Hideaki Shinozuka, Saitama; Masayuki Chatani, Tokyo, both of (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 08/289,134

(22) Filed: Aug. 11, 1994

(30) Foreign Application Priority Data

Aug. 11, 1993 (JP) .................................................. 5-198707

(51) Int. Cl.⁷ .................................................. G06K 9/00
(52) U.S. Cl. .................................................. 382/187; 345/358
(58) Field of Search .................................. 382/179, 209, 382/293, 185–190, 202; 345/156–158, 173, 358; 178/18.03; 707/541

(56) References Cited

U.S. PATENT DOCUMENTS

| | | | | |
|---|---|---|---|---|
| 4,112,415 | * | 9/1978 | Hilbrink | 382/189 |
| 4,653,107 | * | 3/1987 | Shojima et al. | 382/187 |
| 5,010,500 | * | 4/1991 | Makkuni et al. | 382/186 |
| 5,297,216 | * | 3/1994 | Sklarew | 382/187 |
| 5,313,528 | * | 5/1994 | Nishida | 382/201 |
| 5,347,295 | * | 9/1994 | Agulnick et al. | 345/156 |
| 5,361,310 | * | 11/1994 | Ishigaki | 382/187 |
| 5,367,453 | * | 11/1994 | Capps et al. | 364/419.13 |
| 5,903,668 | * | 5/1999 | Beernink . | |

FOREIGN PATENT DOCUMENTS

| | | |
|---|---|---|
| 332 765 | 9/1989 | (EP) . |
| 91/17512 | 11/1991 | (WO) . |

OTHER PUBLICATIONS

Kurtenbach, G., et al., "Issues in Combining Marking and Direct Manipulation Techniques", Symposium on User Interface Software and Technology, Nov. 11, 1991.

* cited by examiner

*Primary Examiner*—Jay Patel
(74) *Attorney, Agent, or Firm*—Ronald P. Kananen; Rader, Fishman & Grauer

(57) ABSTRACT

A predetermined relationship is established with respect to an arbitrary shape of a pattern, or a character, which is inputted by employing a pen on an input table, and displayed on a display unit in a handwriting input display apparatus. Further, a gesture is handwritten on the input tablet with the pen, so that a preselected process operation is carried out for the shape previously represented on the display unit, and therefore the display condition thereof may be changed. The line segment under representation is quickly and readily changed into an arbitrary condition. When a gesture is entered with respect to a plurality of line segments, these line segments are rearranged in response to a command corresponding to this gesture.

13 Claims, 57 Drawing Sheets step S68 is started confirm coordinates for starting point ($Q_{2s}$) and end point ($Q_{2e}$) of input handwriting ($S_2$)

step S68 is ended

HANDWRITING INPUT DISPLAY APPARATUS HAVING IMPROVED SPEED IN CHANGING DISPLAY OF ENTERED HANDWRITING

DETAILED DESCRIPTION OF THE INVENTION

1. Field of the Invention

The present invention relates to a handwriting input display method suitable for, e.g., an electronic notebook apparatus and a portable computer.

2. Description of the Prior Art

Very recently, a CAD system has grown, and then an arbitrary pattern, or figure may be relatively simply inputted. In this CAD system, when a pattern having an arbitrary shape is drawn by using, for example, a mouse and a pen, a pattern corresponding to this input pattern is displayed on a monitor. Then, for example, after a plurality of line segments have been entered, the preselected parameters are designated in order to change the display conditions of these line segments.

For instance, when a plurality of line segments elongated along the vertical direction are displayed in such a manner that the upper ends thereof are aligned along the horizontal direction, the below-mentioned parameters are entered:

(1). A designation is made of a line segment of interest.

(2). A designation is made of reference points for the respective line segments of interest.

(3). A straight line such that the reference points for the respective line segments of interest should be aligned is entered.

(4). A designation is made as to whether or not an interval between the reference points is adjusted.

(5). A designation is made of the positions of the reference points at both ends after alignment.

(6). A designation is made of a method for transporting a line segment of interest (for example, a designation is made as to whether the line segment is transported along the y-axis direction, or along the direction of the line segment).

Otherwise, a predetermined mode is selected by way of the menu operation, and the process operations for the respective line segments are wholly designated.

However, the above-described parameter designating method owns such problems that the lengthy operating procedure is required and lengthy process time is needed. There is another problem that since the parameter designation is carried out by entering the numeral values, this parameter designation cannot be intuitively performed, resulting in poor operability.

Furthermore, the menu operation method owns the following drawbacks:

(1). It is difficult to designate an arbitrary point and an arbitrary direction at high speed.

(2). It is difficult to simply utilize the featured amounts of the established line segments (for example, an arbitrary point on a line segment of interest, a direction, or a length of a line segment of interest).

(3). When the numeral value is entered to designate the featured amount, it is difficult to intuitively input the featured amount.

The present invention has been made to solve these problems, and therefore has an object to provide such a method for performing an input process of a shape more quickly and more simply.

A handwriting input display method as described in claim 1 is characterized in that a plurality of line segments are displayed, a gesture is inputted so as to establish a predetermined relationship with said line segments; and display conditions of said lien segments are changed in response to said gesture.

A handwriting input display method as described in claim 2 is characterized in that a plurality of shapes are displayed; a gesture is inputted so as to establish a predetermined relationship with said shapes; a featured amount of said gesture is detected; and display conditions of said shapes are changed in accordance with the featured amount of said gesture.

This gesture may contain a handwritten character. Also, characters may be aligned by this entered gesture.

In accordance with the handwriting input display method as recited in claim 1, when the gesture is inputted to establish a predetermined relationship with the line segment, the display conditions of the line segment are changed in such a manner that the interval between the line segments is aligned in response to this input gesture. As a result, the display condition of the line segment can be simply and quickly changed.

In accordance with the handwriting input display method as recited in claim 2, when the gesture is inputted to establish a predetermined relationship with the shape such as the character and the pattern, for instance, the shapes are aligned with an equidistant interval at the input position of this gesture in response to the featured amount of this gesture. As a result, it is possible to easily and quickly change the display condition of the shape.

BRIEF DESCRIPTION OF THE DRAWINGS

FIG. 1 is a schematic block diagram for representing an arrangement of an apparatus to which a handwriting input display method according to an embodiment of the present invention has been applied. A CPU 1 controls the respective circuit units in accordance with a program previously stored in a ROM 2 to execute a character input/display operation. In a RAM 3, predetermined data and the like are stored, if required. To a backup RAM 4, predetermined power is continuously supplied from a battery 5, and information desired to be stored is stored even when the power supply of the apparatus is turned OFF. A timer 6 is so designed to be continuously operable by the battery 5 on the basis of a crystal oscillator 7.

Figure 1:
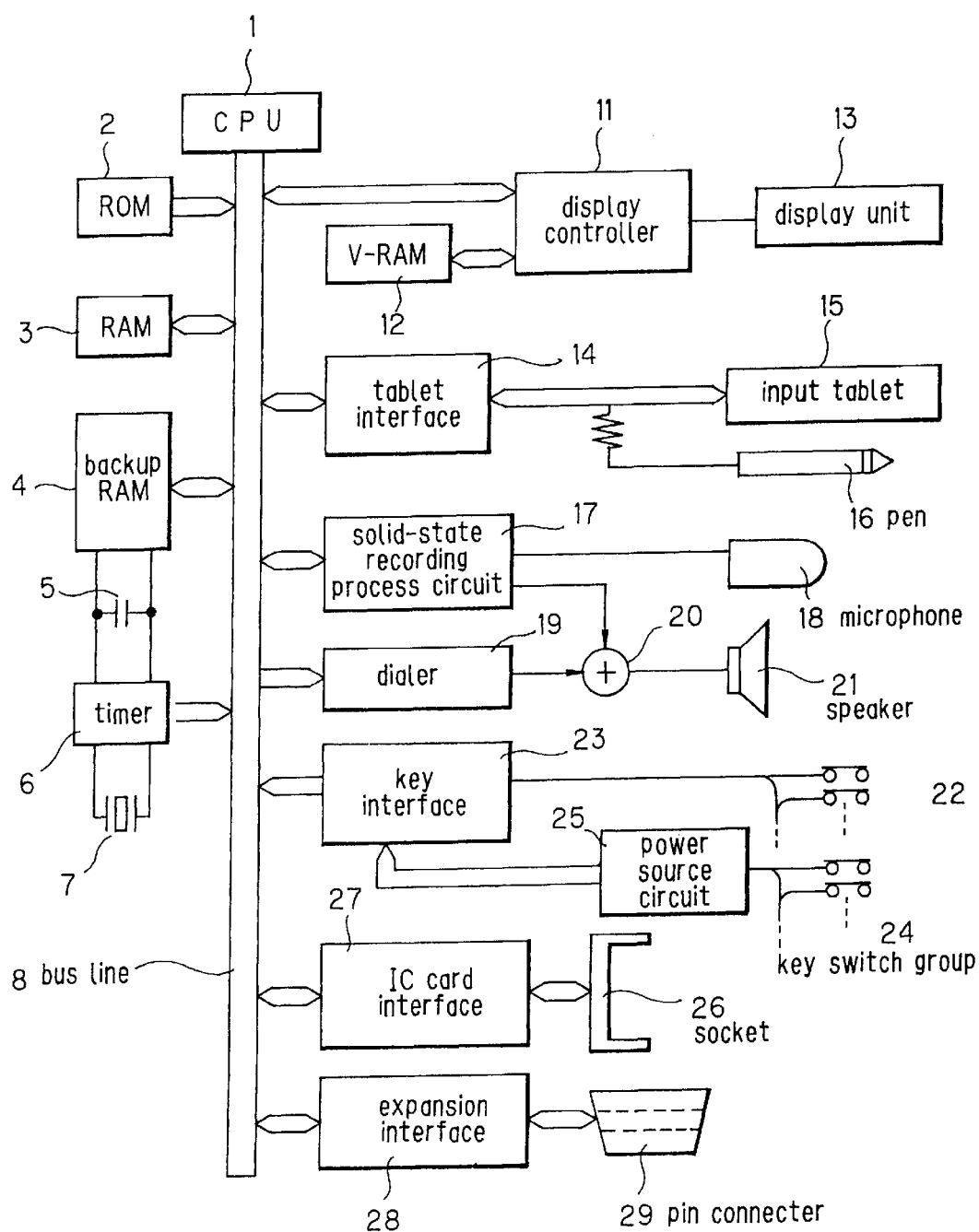
FIG. 1 is a schematic block diagram for showing an arrangement of an apparatus according to an embodiment of the present invention, to which the handwriting input display method of the present invention has been applied.

A display controller 11 expands data entered therein via a bus line 8 to a V-RAM 12, and causes the expanded image to be displayed on a display unit 13. An input tablet 15 outputs the entered coordinate position data to a tablet interface 14 by operating a pen 16. The tablet interface 14 outputs this data via the bus line 8 to either the CPU 1, or the display controller 11.

A microphone 18 outputs a collected speed signal to a solid-state recording process circuit 17 so as to be recorded thereon. The speed signal outputted from the solid-state recording process circuit 17 is supplied via an adder 20 to a speaker 21, thereby producing speech. A dialer 19 is under control by the CPU1 to output a predetermined dialing signal via the adder 20 to the speaker 21.

A plurality of key switch groups 22 are operated when the operation of the apparatus is switched, and signals responding to the key operations are supplied from a key interface 23 via the bus line 8 to the CPU 1. A power supply circuit 25 may be turned ON to supply the power to the respective circuit units, and such various operations by the solid-state recording process circuit 17 as recording, reproducing, stop, and volume controls may be performed by operating a predetermined key switch group among the plural key switch groups 24.

Furthermore, an IC card (not shown) may be inserted into a socket 26. An IC card interface 72 transfers and receives data with this IC card.

To a pin connector 29, for instance, a modem may be connected, and a signal is transferred/received via this modem and an extension interface 28.

It should be noted that the input tablet 15 is constructed of a transparent material and formed on a display unit 13. As a result, a representation of the display unit 13 may be observed through the input tablet 15.

Figure 2:
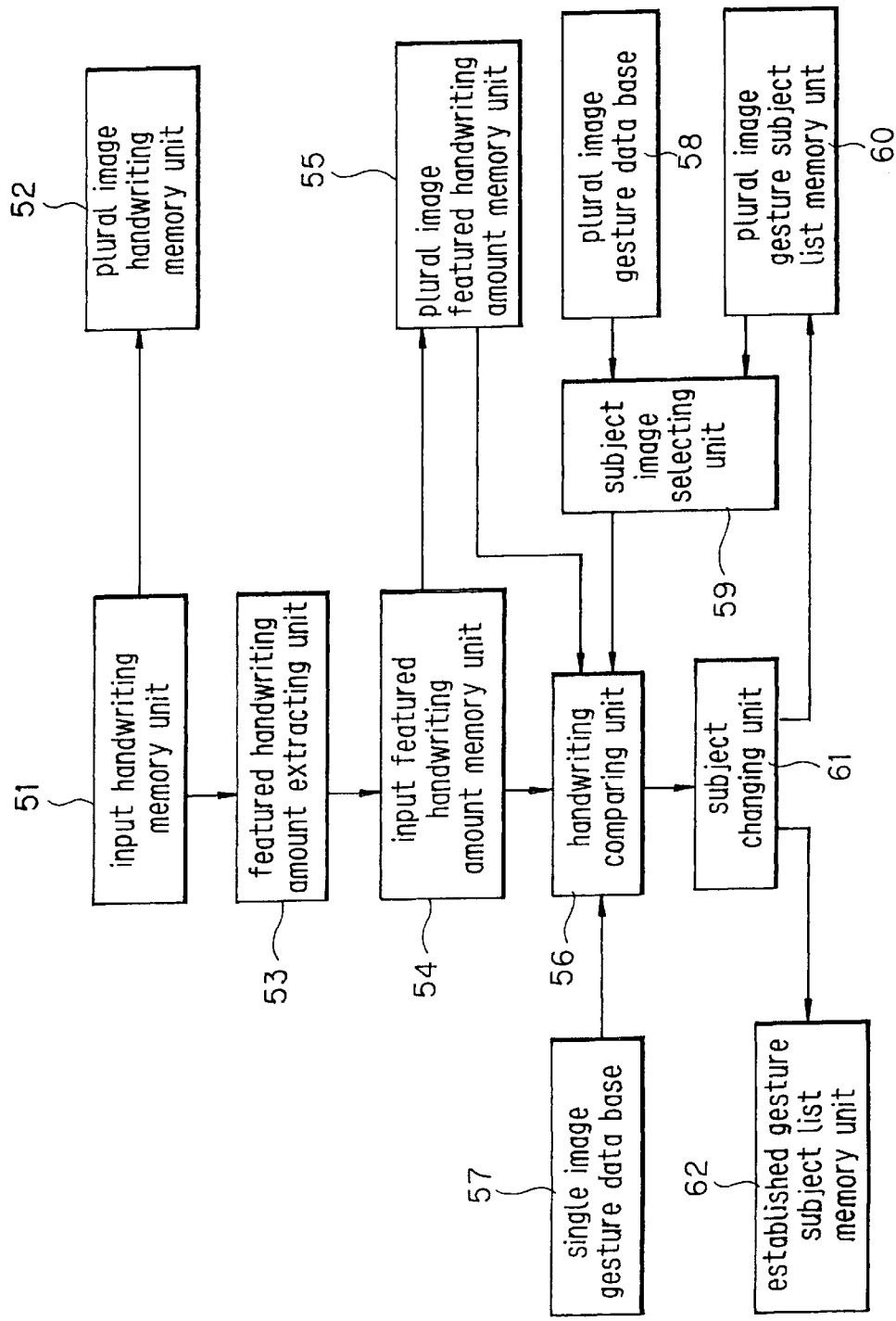
FIG. 2 is a functional block diagram for explaining operations of the embodiment of FIG. 1.

Before describing operations of the embodiment shown in FIG. 1, process operations executed by the CPU 1 are classified into functional blocks which will be explained with reference to FIG. 2 and FIG. 3. This CPU 1 executes process operations indicated in flow charts of FIG. 4 to FIG. 8. The functional block of FIG. 2 represents such a functional block related to the process operations for judging the gestures indicated in the flow charts of FIG. 4 through FIG. 6. The functional block of FIG. 3 indicates a functional block for executing the process operations corresponding to the gestures shown in FIG. 7 and FIG. 8.

In this embodiment, a display condition of a line segment is changed by inputting a gesture in such a manner that a predetermined relationship is established with respect to the displayed line segment. The respective storage units and data base are formed in the RAM 3, or the ROM 2 of FIG. 1, and other portions are formed inside the CPU 1 in these functional blocks.

When a gesture having a preselected shape is inputted on an input tablet 15 by operating the pen 16, coordinate data thereof which is detected by the input tablet 15 is entered via the tablet interface 14 into the CPU 1. The CPU 1 supplies this data to an input handwriting memory unit 51 and stores it into this memory unit 51. When the entered gesture is arranged by not a single image, by a plurality of images, the data about the images until all of the images for constituting this gesture are entered are stored into a plural image handwriting memory 52.

A featured handwriting amount memory unit 53 extracts a featured amount of handwriting stored in the input handwriting memory unit 51. This featured amount corresponds to, for instance, a direction and a length of a straight line portion of a line segment, a radius and a center angle of an arc, a quantity of a bending angle (vertex), and the number of loops. This featured amount is the same as that of the gesture stored in the single image gesture data base 57 and the plural image gesture data base 58.

The featured amount extracted by the handwriting featured amount extracting unit 53 is supplied to the input featured handwriting amount memory unit 54 so as to be stored therein. The featured amounts existing until all of the images are inputted in case that the gestures of the plural images are entered, are supplied to a plural image featured handwriting amount memory unit 55 so as to be stored therein.

A handwriting comparing unit 56 compares the featured amount of the gesture stored in either the input featured handwriting amount memory unit 54 or the plural image featured handwriting amount memory unit 55 with the featured amount of the single image gesture stored in the single image gesture data base 57. In this single image gesture data base 57, a combination among a featured amount and an identification number of a gesture command constructed by a single image (single image gesture), a retrieving method for a line segment to be processed, and a process method to be executed is employed as one data base element.

The handwriting comparing unit 56 compares the featured amount stored in the input featured handwriting amount memory unit 54 with the featured amount stored in the single image gesture data base 57 to obtain a resemblance degree of the inputted handwriting. A subject changing unit 61 compares the resemblance degree of the inputted handwriting supplied from the handwriting comparing unit 56 with a preset reference value, and when this resemblance degree is greater than the reference value, the inputted handwriting is recognized as the gesture and then both the gesture number thereof and this resemblance degree are supplied to an established gesture subject list memory unit 62 so as to be stored therein.

On the other hand, in the plural image gesture data base 58, a combination among an identification number of a plural image gesture, the number of images for constituting a gesture, a featured amount of each image, a featured amount between the images (e.g., positional relationship), a retrieving method of a line segment under process, and a process method to be executed is employed as a data base element. A subject image selecting unit 59 selects predetermined plural image gestures stored in this plural image gesture data base 58, and also selects one of these plural image gestures for comparison, which will then be supplied to the handwriting comparing unit 56. The handwriting comparing unit 56 compares this comparison subject with the one image featured amount of the inputted handwriting supplied from the input featured handwriting amount memory unit 54, thereby obtain the resemblance degree between them. The subject changing unit 61 recognizes such a resemblance degree as a point of a gesture when the compared resemblance degree is greater than the preset reference value, and supplies this resemblance degree to a plural image gesture subject list memory unit 60. Then, the supplied resemblance degree is stored together with the gesture-number thereof are stored in this memory unit 60.

When there are other images than the image stored in the plural image gesture subject list memory unit 60, which constitute this gesture, a subject image selecting unit 59 reads out these images from the plural image gesture data base 58, and supplies them to the handwriting comparing unit 56 as the comparison subject.

Subsequently, the handwriting comparing unit 56 compares the thus inputted comparison subject with the featured amount of the inputted handwriting supplied from the input featured handwriting amount memory unit 54 to obtain a resemblance degree therebetween. When the newly inputted resemblance degree is greater than a preset reference value, the subject changing unit 61 averages this resemblance degree and the resemblance degree (point of gesture) of the previously inputted handwriting, and then uses the averaged degree as a new point of the gesture to update the subject.

As described above when the plural image gesture having the point higher than the reference value is detected in the subject changing unit 61, this gesture is supplied to the established gesture subject list memory unit 62 and stored therein.

It should be noted that although the comparison is carried out every time the inputted handwriting for the single image is entered in the handwriting unit 56, when the handwriting is inputted for the plural image gesture, a plurality of handwriting may be combined for comparison purposes. Alternatively, a plurality of images may be sequentially selected for a single image inputted handwriting, and the image having the highest resemblance degree may be selected.

Figure 3:
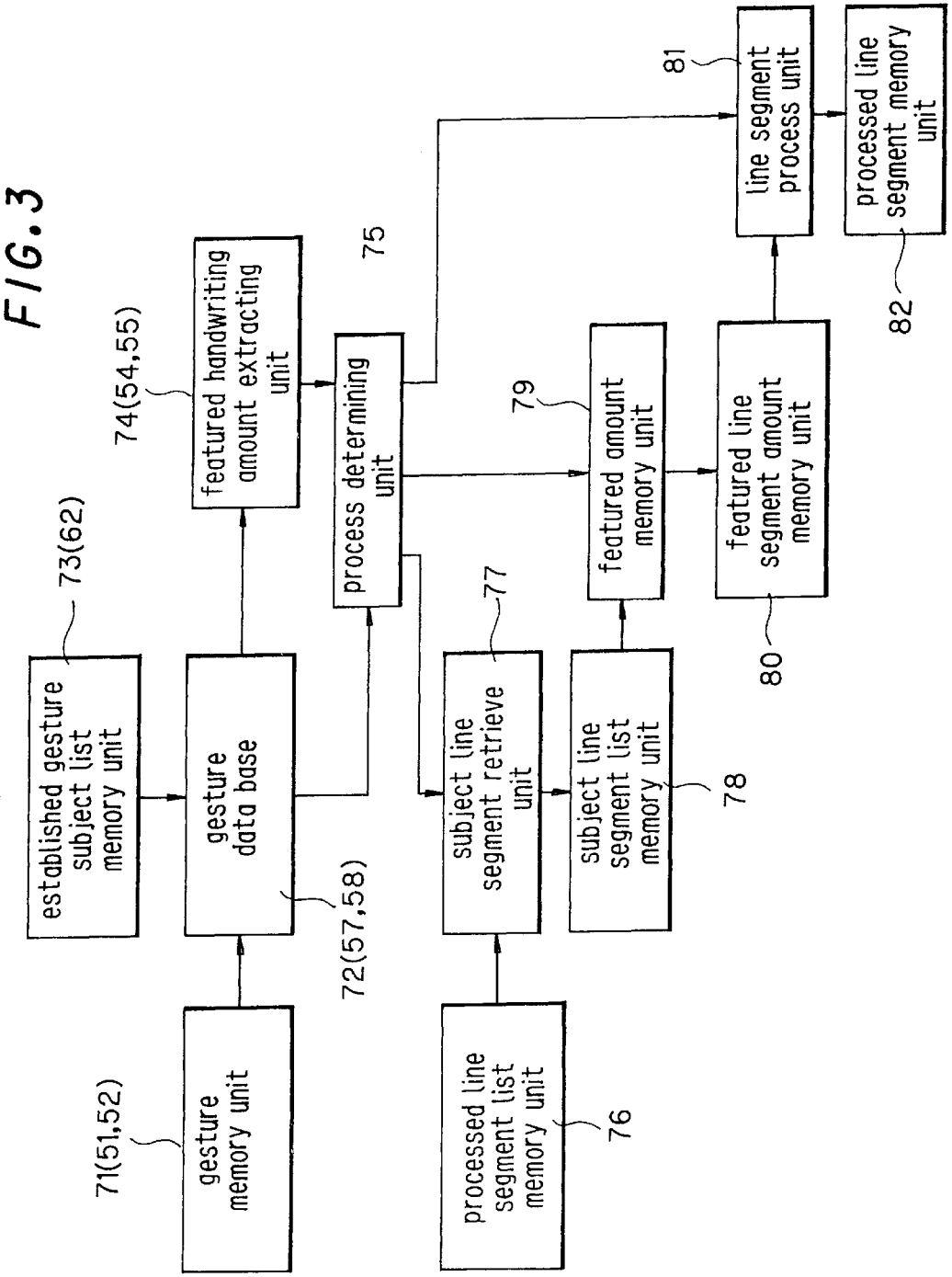
FIG. 3 is another functional block diagram for explaining the operation of the embodiment shown in FIG. 1.

On the other hand, when the gesture is stored in the established gesture subject list memory unit 62 in such a manner as described above, a process operation corresponding to this gesture is carried out in the functional block indicated in FIG. 3. In this functional block, an established gesture subject list memory unit 73 corresponds to the established gesture subject list memory unit 62 shown in FIG. 2. Similarly, a gesture data base 72 corresponds to the single image gesture data base 57 and the plural image gesture data base 58 shown in FIG. 2, and also a featured handwriting amount memory unit 74 corresponds to the input featured handwriting amount memory unit 54 and the plural image featured handwriting amount memory unit 55 indicated in FIG. 2.

A process determining unit 75 reads such data as a method for retrieving a line segment interest, a method for extracting a featured amount of a line segment of interest, and a method for processing a line segment of interest, corresponding to the gesture stored in the established gesture subject list memory unit 73 from the gesture data base 72, and reads the featured amount of the gesture entered from the featured handwriting amount memory unit 74. Then, the process determining unit 75 determines a process operation in response to these read data to control a subject line segment retrieving unit 77, a featured amount extracting unit 79, and a line segment processing unit 81.

A processed line segment list memory unit 76 stores data about previously entered line segments (line segments to be processed) other than the gesture. The subject line segment retrieving unit 77 retrieves the line segment to be processed from the line segments stored in the processed line segment list memory unit 76 in response to the control by the process determining unit 75, and then supplies the retrieved result to a subject line segment list memory unit 78 to be stored therein.

A featured amount extracting unit 79 extracts the featured amount of the subject line segment stored in the subject line segment list memory unit 78 in response to the control by the process determining unit 75, and supplies this extracted result to a featured line segment amount memory unit 80 to be stored therein. A line segment process unit 81 processes the featured amount of the line segment which is to be processed and is stored in the featured line segment amount memory unit 80 under control of the process determining unit 75, and produces data used to change the display condition of the line segment. Then, the produced data is supplied to a processed line segment memory unit 82 to be stored therein.

The data stored in this processed line segment memory unit 82 is read out and supplied via a display controller 11 to a V-RAM 12, in which this process data is expanded as bit map data. Then, this data is read by the display controller 11, and then outputted to a display unit 13 for the representation purpose.

Figure 4:
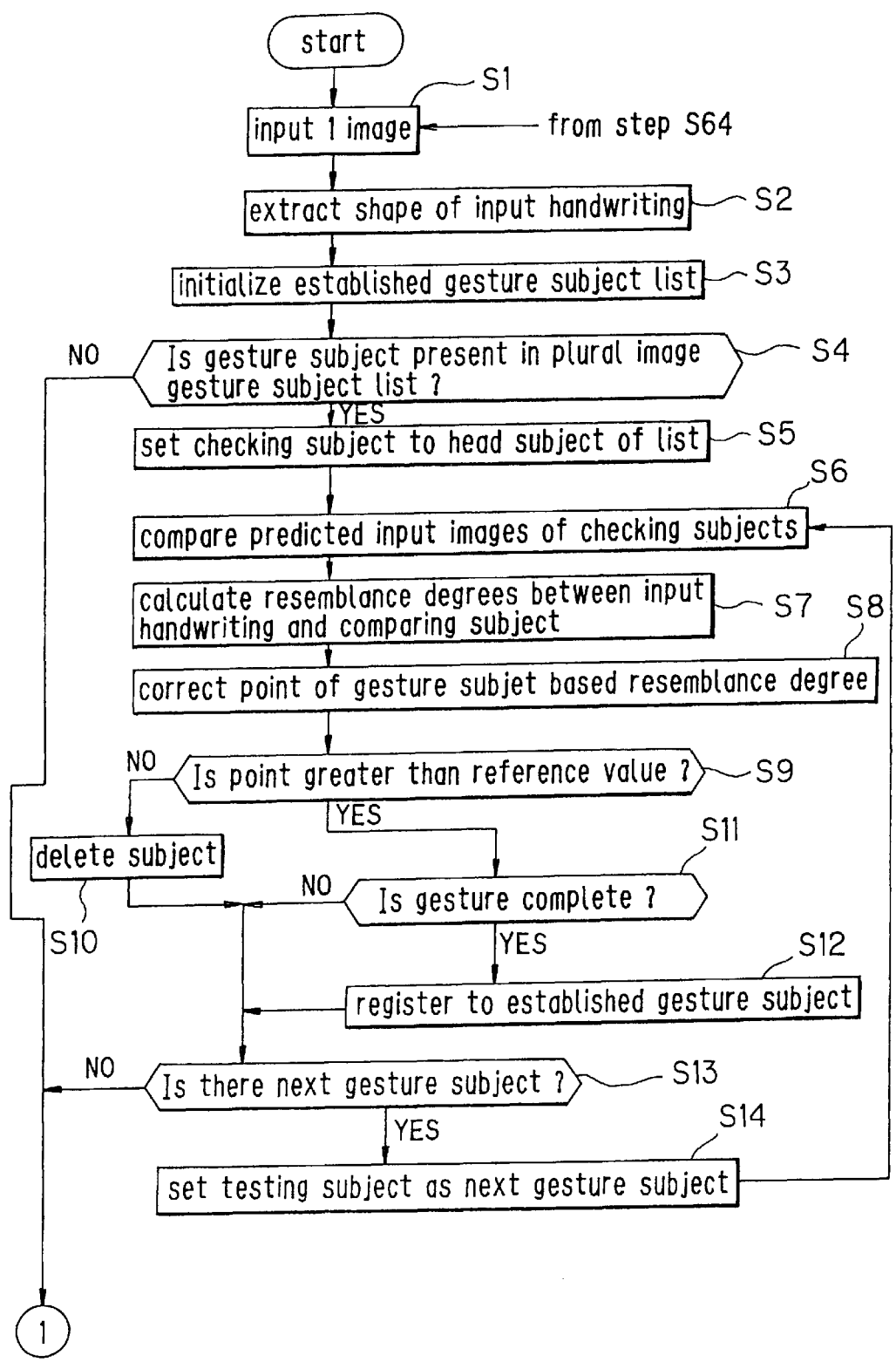
FIG. 4 is a flow chart for explaining the operation of the embodiment of FIG. 1.
Figure 5:
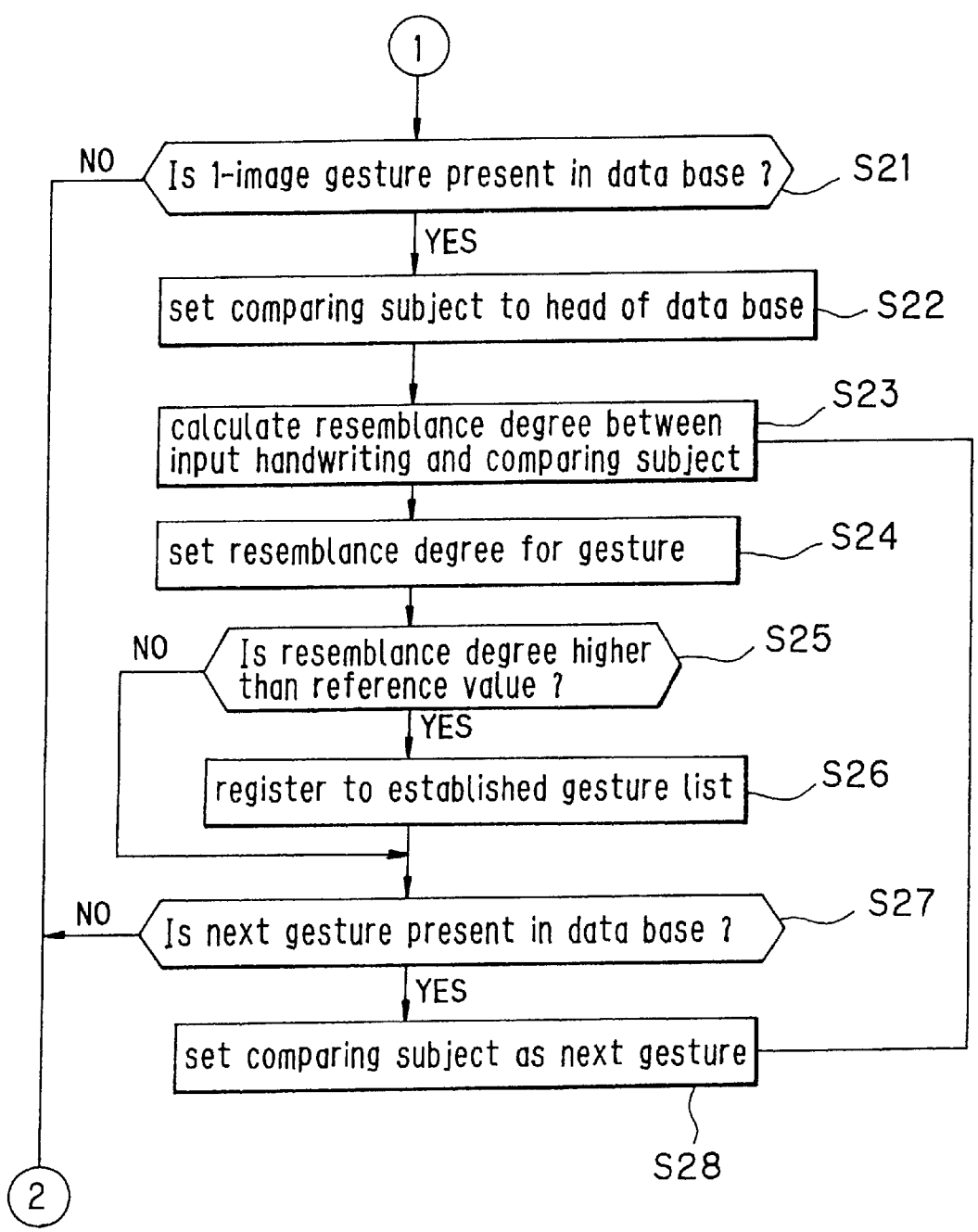
FIG. 5 is a flow chart subsequent to FIG. 4.
Figure 6:
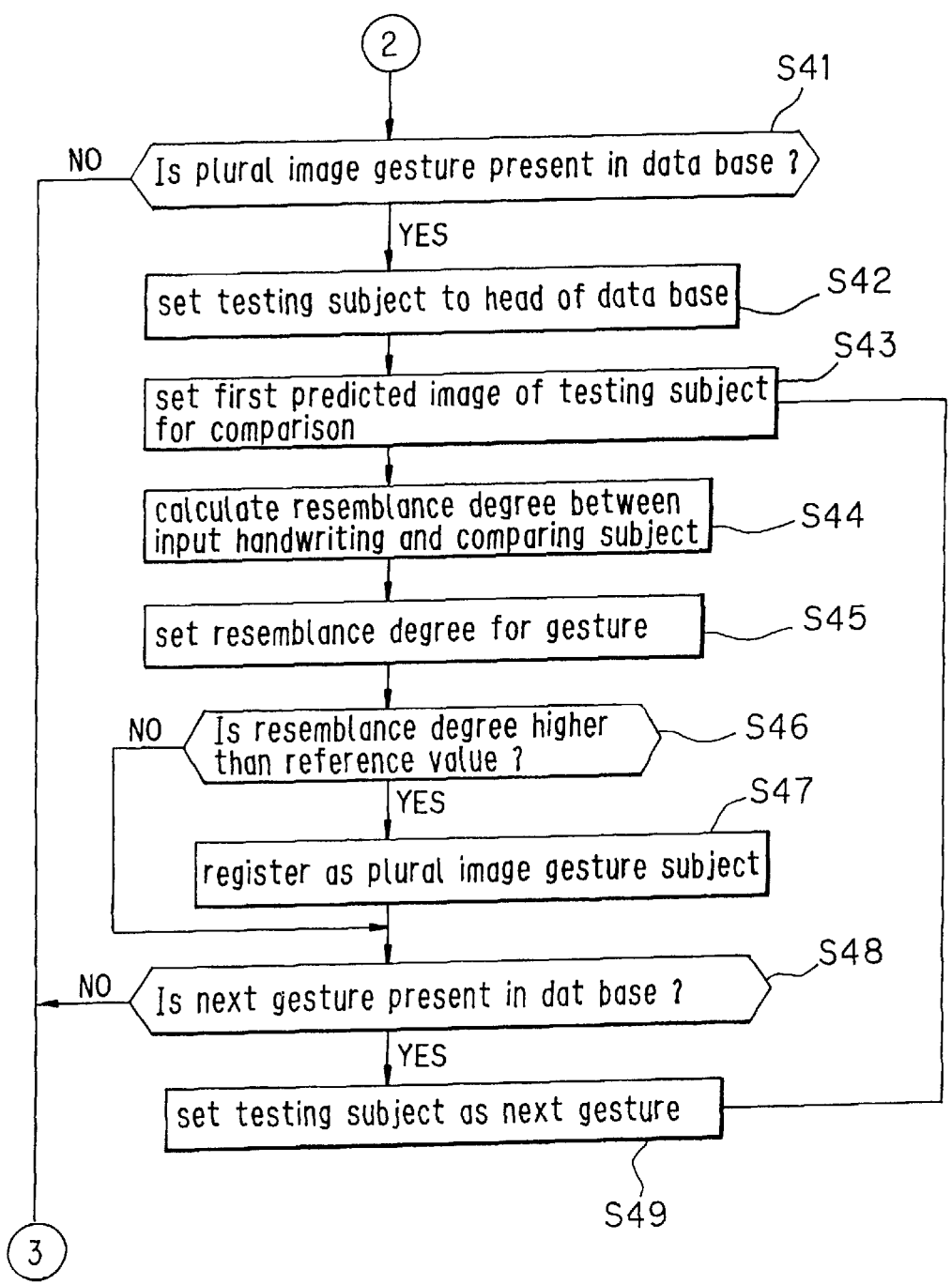
FIG. 6 is a flow chart subsequent to FIG. 5.
Figure 7:
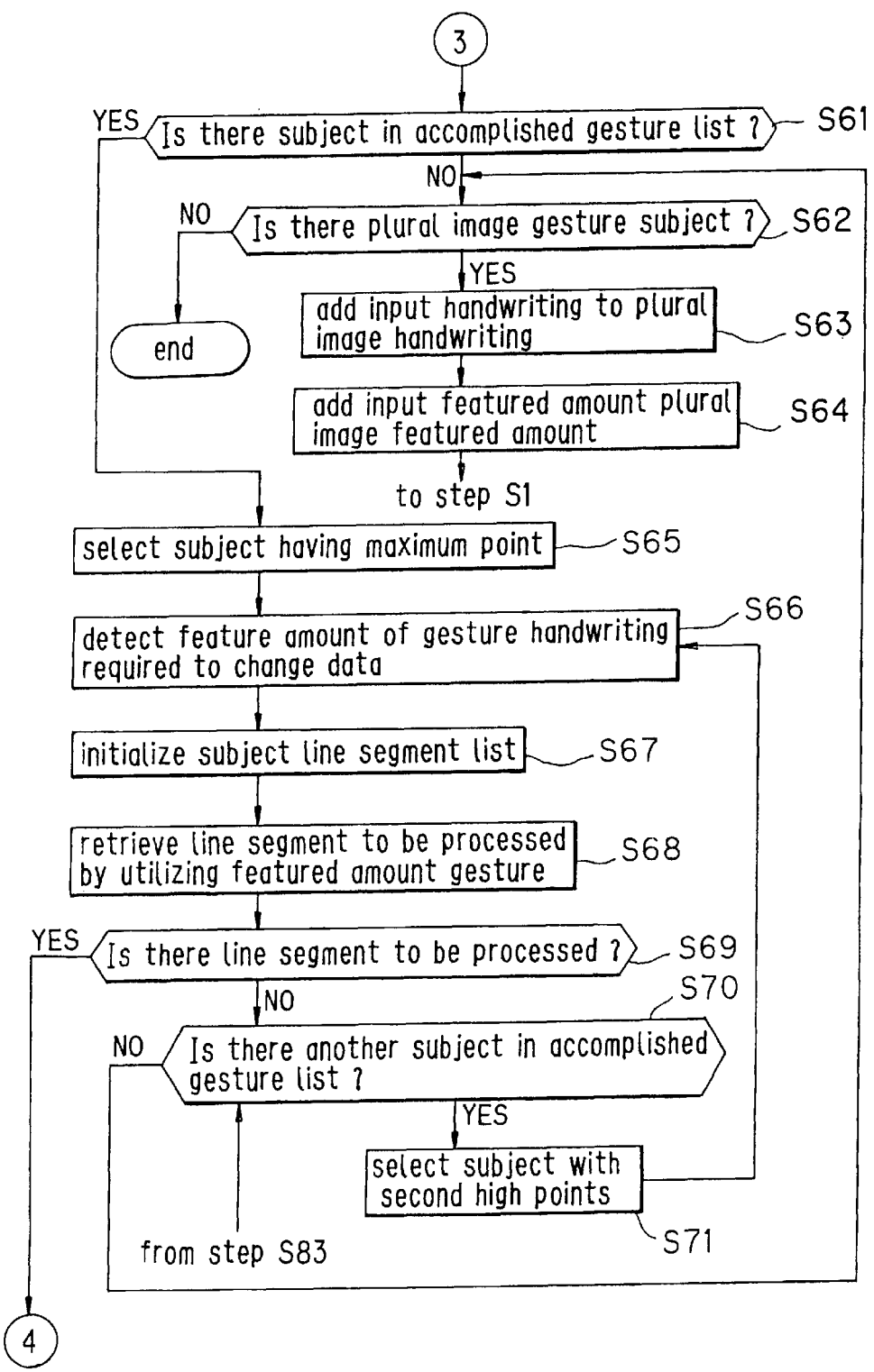
FIG. 7 is a flow chart subsequent to FIG. 6.
Figure 8:
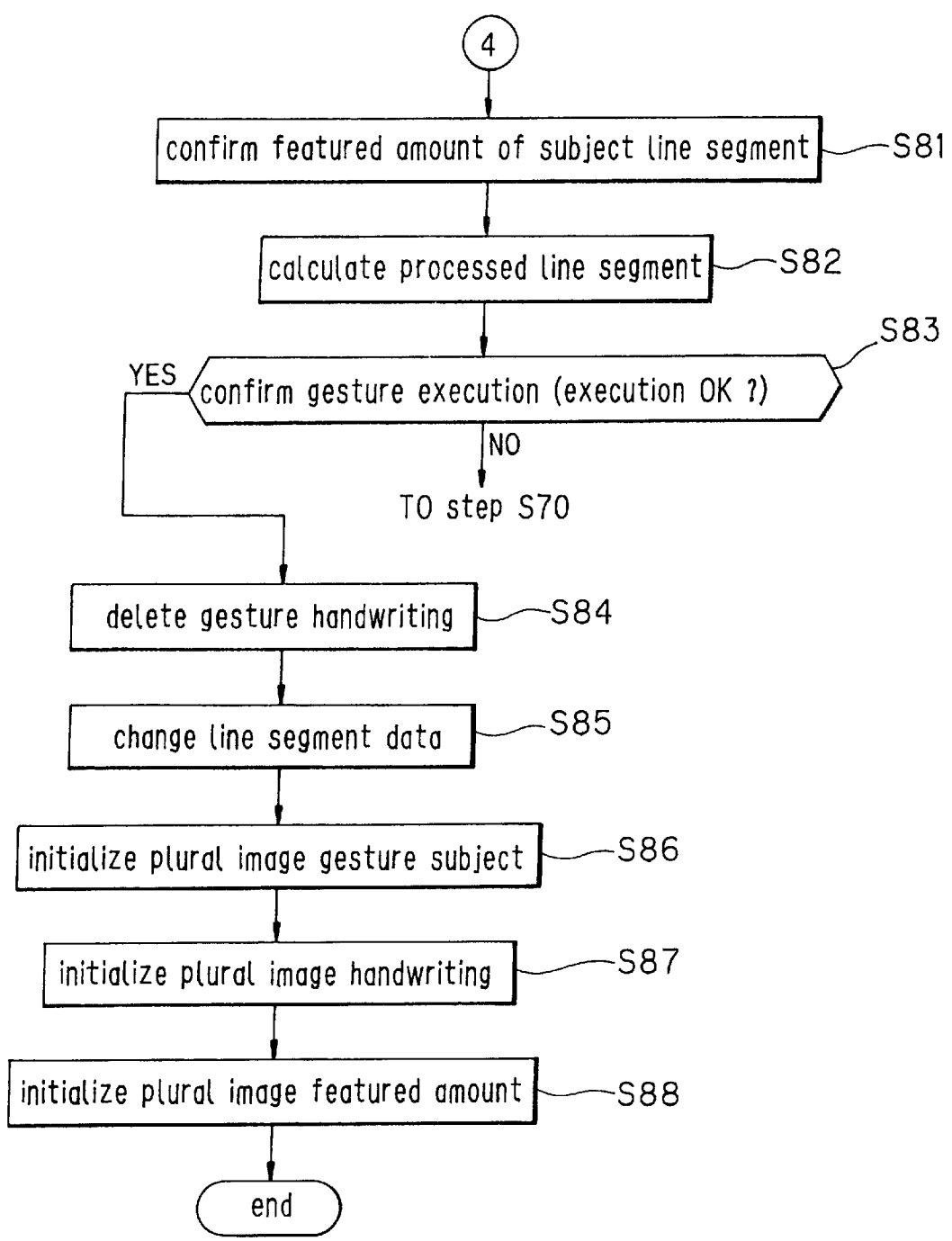
FIG. 8 is a flow chart subsequent to a flow chart subsequent to FIG. 7.

Referring now to FIG. 4 to FIG. 8, such a basic process operation will be explained that a gesture is inputted in a handwriting manner by operating the pen 16 on the input tablet 15 to establish a predetermined relationship with an arbitrary shape such as a pattern (figure) and a character which has been inputted on the input tablet 15 by employing the pen. 16 and displayed on the display unit 13, a predetermined process operation is performed for the previously displayed shapes on the display unit 13, and then the display conditions are changed. As previously stated, FIG. 4 to FIG. 6 represent a process operation for judging whether or not the inputted subject corresponds to the gesture, and FIG. 7 and FIG. 8 show a process operation to execute a suitable process operation for the inputted gesture.

First of all, at a step S1 of FIG. 4, a user manipulates the pen 16 on the input tablet 15 to enter a single image. Then, the process operation defined from the subsequent step S2 to the step S49 is performed to judge whether or not a gesture is inputted. If the inputted subject does not correspond to the gesture, then it is judged at a step S61 of FIG. 7 that no subject is stored in the established gesture subject list memory unit 62. Furthermore, at a step S62, it is judged that no subject is either stored in the plural image gesture subject list memory unit 60, and the present process operation is accomplished.

In case that a judgement is made that the inputted subject corresponds to a gesture command, the subject is present in the established gesture subject list memory unit 62, so that a process operation defined after the step S65 of FIG. 7 is performed.

To judge whether or not the inputted subject corresponds to the gesture, the featured amount of the input handwriting entered at the step S1 is extracted in the featured handwriting amount extracting unit 53, and then stored into the input featured handwriting amount memory unit 54. The process operation is advanced to a step S3 at which the list of the established gesture subject list memory unit 62 is initialized. As previously stated, the subject finally judged as the gesture (namely, subject having a higher point) is registered into this established gesture subject list. In accordance with this initialization, the corresponding gesture number is initialized in such a manner that the point of this subject is substituted by, for instance, zero, namely the number indicative of an unprocess condition (for example, 0 or −1).

Next, the process operation is advanced to a step S4 at which a judgement is made as to whether or not a subject is present in the plural image gesture subject list. As previously explained, when the gesture of the plural image has been inputted, the previously inputted image is stored in this plural image gesture subject list. As a consequence, when a first subject is entered, the subject has not yet been registered into the plural image gesture subject list. In this case, the process operation is advanced to a step S21 at which a check is done as to whether or not a single image gesture is located in the data base.

When all of the gestures are arranged by the gestures of plural images, no single image gesture is inputted. That is, in this case, the single image gesture data base 57 is not present in the data base. Then, in this case, the process operation is advanced from the step S21 to the step 41, at which a check is done as to whether or not the plural image gesture is present in the data base. When no single image gesture data base 57 is present, since all the gestures are constructed of the plural image gestures, this plural image gesture data base 58 is located in the data base. Then, in this case, the process operation is advanced from the step S41 to steps S42 through S49 at which a check is done as to whether or not the inputted handwriting corresponds to the plural image gesture.

To the contrary, when all of the gestures are the single image gestures, the single image gestures have been previously registered in the data base. Then, in this case, the process operation is advanced from the step S21 to steps S22 through S28, at which such a judging process as to whether or not the inputted handwriting corresponds to the single image gesture.

When the gesture is arranged by both of the single image gesture and the plural image gesture, there should be present both of the single image gesture data base 57 and the plural image gesture data base 58. In this case, the process operation as defined from this step S22 to the step S28, and also the process operation as defined from the steps S42 to S49 are executed, depending on the request.

Although it is theoretically possible to process a single image gesture as one sort of plural image gesture, the resultant judging process operation would become complex. Therefore, as described in the above embodiment, it is preferable to separately process the single image gesture and the plural image gesture.

Returning back to FIG. 4, another process operation is performed at a step S4 where if a judgement is done that the subject is stored in the plural image gesture subject list, namely in case of the input handwriting subsequent to the second image, then the process operation is advanced to a step S5 at which the head subject in the plural image gesture subject list is selected as a first checking subject. Then, the process operation is advanced to a step S6 at which a predetermined single image is selected as an predicted input subject for comparison from the plural image gestures of the subjects selected at the step S5.

Next, the process operation is advanced to a step S7 at which a resemblance degree between the comparison subject selected at the step S6 and the presently inputted handwriting is obtained by the handwriting comparing unit 56. Then, at a step S8, the point of the gesture subject is corrected in accordance with the resemblance degree obtained at the step S7. In other words, as previously stated, the resemblance degrees of the respective input handwriting among the input handwriting of the plural images are averaged. When this averaged value is used as the point of this gesture, a calculation is performed for both the resemblance degree of the previously entered handwriting and that of the presently entered handwriting, and then a newly calculated averaged value is set as the point of this gesture.

This point may be calculated by employing the statistical value such as the above-described average value, and also by way of the fuzzy calculation.

Next, the process operation is advanced to a step S9 at which a check is done by the subject changing unit 61 as to whether or not the point obtained at the step S8 is greater than a preset reference value. When the point is greater than the reference value, the process operation is advanced to a step S11 at which a judgement is made whether or not the gesture is accomplished. In other words, the gesture of the plural images is now entered, when this gesture of the plural images is arranged by, for instance, three images, for instance, the gesture is established if the third image is entered. Then, in this case, the process operation is advanced to a step S12 at which this gesture is registered into the list of the established gesture subject list memory unit 62.

At the step S11, when it is judged that the gesture is not yet accomplished, the process operation is advanced to a step S13, at which a judgement is made as to whether or not the subsequent gesture subject is present in the plural image gesture subject list (namely, it is judged whether or not there is such a gesture subject whose point remains initialized at the step S3). When the gesture of the plural images has not yet been established, it implies that the next gesture subject is still present. Then, in this case, the process operation is advanced to a step S14 at which the checking subject is changed into the next gesture subject. At the step S12, after the established gesture has been registered as the established gesture subject, a similar operation is carried out when it is so judged at a step S13 that there is a subsequent gesture subject. Then, the process operation is returned from the step S14 to the step S6 at which a similar process operation is repeated while the predicted input image used as the checking subject at the step S14 is employed for comparison purposes.

At the step S9, when it is judged that the point of the gesture subject is smaller than the reference value, the process operation is advanced to a step S10 at which this gesture subject is removed from the plural image gesture subject list. In other words, in this case, it is assumed that the presently entered handwriting is not to input this gesture.

At a step S13, when it is judged that there is no subsequent gesture subject in the plural image gesture subject list, the process operation is advanced to a step S21.

As previously described, at the step S21 shown in FIG. 5, a judgement is made as to whether or not the single image gesture is present in the data base. Then, when a judgement is made of YES, the process operation is advanced to a step S22 at which a comparison subject is set to the head gesture of the gesture stored in the single image gesture data base 57. Then, at a step S23, a calculation is carried out for a resemblance degree between the single image gesture of the comparison subject set at the step S22 and the presently inputted handwriting. At a step S24, the calculated resemblance degree is set as the point of this single image gesture.

At a step S25, if the point (resemblance degree) of the gesture set at the step S24 is compared with a preset reference value and this point is greater than the reference value, the process operation is advanced to a step S26 at which this point is registered into the established gesture subject list.

Either when a judgement is made that the point is smaller than the reference value at the step S25, or after the point has been registered into the established gesture subject list at the step S26, the process operation is advanced to a step S27 at which a judgement is made as to whether or not the next gesture (i.e., gesture whose point is not requested) is present in the single image gesture data base 57. When the next gesture is present, the process operation is advanced to a step S28 at which the comparison subject is changed into the subsequent gesture. Then, the process operation is returned to the step S23 at which a resemblance degree between the newly set gesture as the comparison subject and the input handwriting is calculated and a similar process operation is repeated.

At the step S27, if it is judged that there is no subsequent gesture in the single image gesture data base 57, then the process operation is advanced to a step S41.

At the step S41 of FIG. 6, a judgement is made as to whether or not the plural image gesture is present in the data base. When it is judged that the plural image gesture is present, the process operation is advanced to a step S42. At this step S42, the checking subject to be compared with the input handwriting is set to the head gesture within the plural image gesture data base 58. Then, the process operation is advanced to a step S43, at which a predetermined single image of the gesture recognized as the checking subject is assumed as a predicted first image to be compared.

Next, the process operation is advanced to a step S44 at which a resemblance degree between the input handwriting and the comparison subject set at the step S43 is calculated. Then, the calculated resemblance degree is understood as the point of this gesture at a step S45. At a step S46, a judgement is made as to whether or not the point (resemblance degree) of the gesture obtained at the step S45 is larger than the reference value. When it is judged that the point of the gesture is greater than the reference value, this point of the gesture is stored into the plural image gesture subject list memory 60 as the plural image gesture subject.

Either when it is so judged at the step S46 that the resemblance degree is smaller than the reference value, or when the gesture has been completely registered into the plural image gesture subject list at the step S47, the process operation is advanced to a step S48. At this step S48, a check is done as to whether or not the subsequent gesture (namely, gesture whose point is not yet updated) is located in the plural image gesture data base 58. When there is the next gesture, the process operation is advanced to a step S49 at which the checking subject is set to the next gesture. Then, the process operation is returned to the step S43 at which a first predicted image of this checking subject is compared with the input handwriting, and this comparing process is repeatedly performed in a similar manner to the above case.

When it is so judged at the step S48 that no next gesture is present in the plural image gesture data base 58, the process operation is advanced to a step S61 shown in FIG. 7.

With the above-described process operations, a judgement is made as to whether or not the inputted subject corresponds to the gesture. If the inputted subject corresponds to the gesture, then this gesture is described as a subject in the established gesture subject list. In this case, the process operation is advanced to a step S65 at which the subsequent process operation is carried out.

If the inputted subject does not correspond to the gesture, then there is no subject tin the established gesture subject list. Then, in this case, the process operation is advanced to the step S62 at which a judgement is made as to whether or not the gesture subject of the plural images is present. If the inputted subject does not correspond to the gesture, then there is no data also in the plural image gesture subject list. In this case, the process operation is accordingly ended.

On the other hand, it is so judged at the step S61 that no subject is present in the established gesture subject list in a half way when the plural image gesture is entered. It should be noted that in this case, a judgement is made at the step S62 that there is a subject in the plural image gesture subject list. Then, the process operation is advanced to a step S63, at which the input handwriting is added to the plural image handwriting in the plural image gesture subject list memory unit 60. Thereafter, the process operation is advanced to a step S64 at which the input featured amount is added to the plural image featured amount in the plural image featured handwriting amount memory unit 55. Then, the process operation is again returned to the step S1 at which a similar process operation is carried out for the newly entered input handwriting, as previously explained.

At steps succeeded to the step S65, a command corresponding to an inputted gesture is executed. That is, at a step S65, a selection is made of a subject having the highest point from the subjects stored in the established gesture subject list memory unit 62. Subsequently, the process operation is advanced to a step S66 at which a detection is made of such a featured amount for the handwriting of the gesture required to change the data about the line segment which has been inputted and displayed on the display unit 13. This necessary featured amount may be obtained from the gesture data base 72.

Next, the process operation is advanced to a step S67 at which the list of the line segment to be processed by the gesture is initialized. Then, the process operation is advanced to a step S68, at which the featured amount (parameter) of the gesture obtained at the step S66 is utilized to retrieve the line segment to be processed. The retrieving method for the processing subject has been stored in the gesture data base 72.

Next, at a step S69, as a result of the retrieving operation at the previous step S68, a judgement is made as to whether or not the line segment to be processed is retrieved. When no line segment to be processed is retrieved, the process operation is advanced to a step S70. At this step, another judgement is made as to whether or not another subject is present in the established gesture subject list. When another subject is present, the process operation is advanced to a step S71 at which a subject having the second highest point is selected. Then, the process operation is returned to the step S66, at which the featured amount required to execute the command of this selected subject is extracted, and the subsequent process operation is similarly repeated.

At a step S70, when it is so judged that there is no another subject in the established gesture subject list, the process operation is returned to the step S62 at which a check is done as to whether or not a subject is present in the plural image gesture subject list. Then, the subsequent process operations are similarly executed in response to this judgement result.

The reason why the process operation is returned from the step S70 to the step S62 and the subsequent process operation is repeated, is to confirm whether or not it is recognizable that the plural image gesture is being entered.

At the step S69, when it is so judged that the line segment to be processed for the gesture is retrieved, the process operation is advanced to a step S81 represented in FIG. 8.

At this step S81, a confirmation is made of a featured amount (parameter) of a line segment which should be processed. The necessary featured amount can be recognized from the gesture data base 72. At a step S82, the line segment data after process is calculated by utilizing the process content stored in the gesture data base 72, the featured amount of the gesture, and the featured amount of the line segment to be processed. Then, the calculated data is stored in a processed line segment memory unit 82.

Subsequently, the process operation is advanced to a step S83, at which a confirmation is made as to whether or not the process operation corresponding to the gesture is executable. For instance, such a confirmation whether or not the process operation is executable is given to a user by representing a change made when the gesture command is executed by varying its color. As a concrete confirmation method, a region corresponding to YES/NO is displayed on the display unit 13, and any of YES/NO is touched by a user with the pen 16. When the user refuses this execution, the process operation is returned to the step S70 at which a confirmation process for another gesture is performed.

When the user allows the execution of the gesture, the process operation is advanced to a step S84 at which the handwriting of the gesture is erased. For example, when such a handwriting having no relationship with the gesture is allowed to be entered during the input operation of the plural image gesture by adding such a process operation that a constructive handwriting number is added to the gesture subject, only the handwriting for constituting the confirmed gesture command may be erased.

At the next step S85, the line segment data is changed into the data calculated at the step S82. Concretely speaking, the line segment data to be processed which has been stored in the subject line segment list memory unit 78 is removed from the processed line segment list memory unit 76, and then the line segment data after being changed, which has been stored in the processed line segment memory unit 82 is added. As a consequence, the previously entered and displayed line segment is changed into such a display state corresponding to the entered gesture.

Next, the list of the plural image gesture subject list memory unit 60, the plural image handwriting data of the plural image handwriting memory unit 52, and the data about the plural image featured handwriting amount of the plural image featured handwriting amount memory unit 55 are initialized at steps S86 to S88.

As described in the above case, when the handwriting having no relationship is allowed to be displayed during the input operation of the plural image gesture by adding the handwriting number for constituting the gesture subject, only the subject containing the handwriting for constituting the fixed gesture command is removed. In this case, the operation mode may be escaped from the gesture input mode by preparing such a gesture command which can invalidate all of the plural image gestures under entry.

After the process operation of the step S88 shown in FIG. 8, when the gesture input operation is complete, the operation mode may be automatically changed from the gesture command input mode into the pattern input mode.

The above-described process operations represented in the flow charts from FIG. 4 to FIG. 8 are a basic process operation. These process operations are slightly different in accordance with the concrete gestures. A description will now be made of this different portion.

Figure 14:
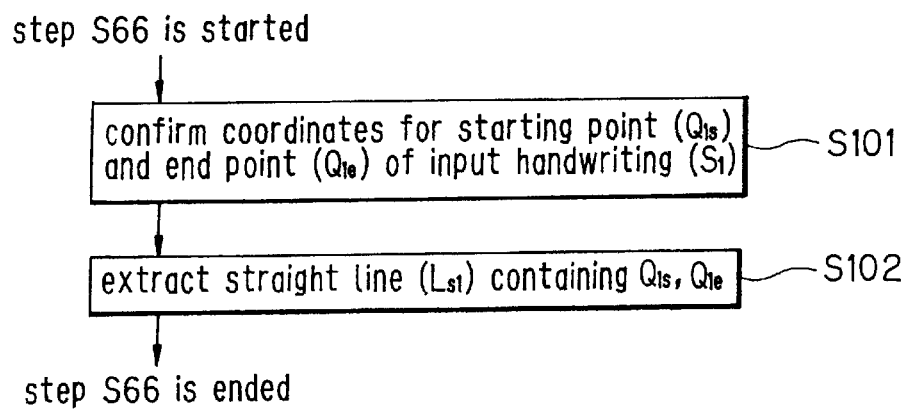
FIG. 14 is a flow chart for explaining in detail the operation from the step S66 of FIG. 7 in case when the process operation shown in FIG. 9 to FIG. 13 is performed.
Figure 15:
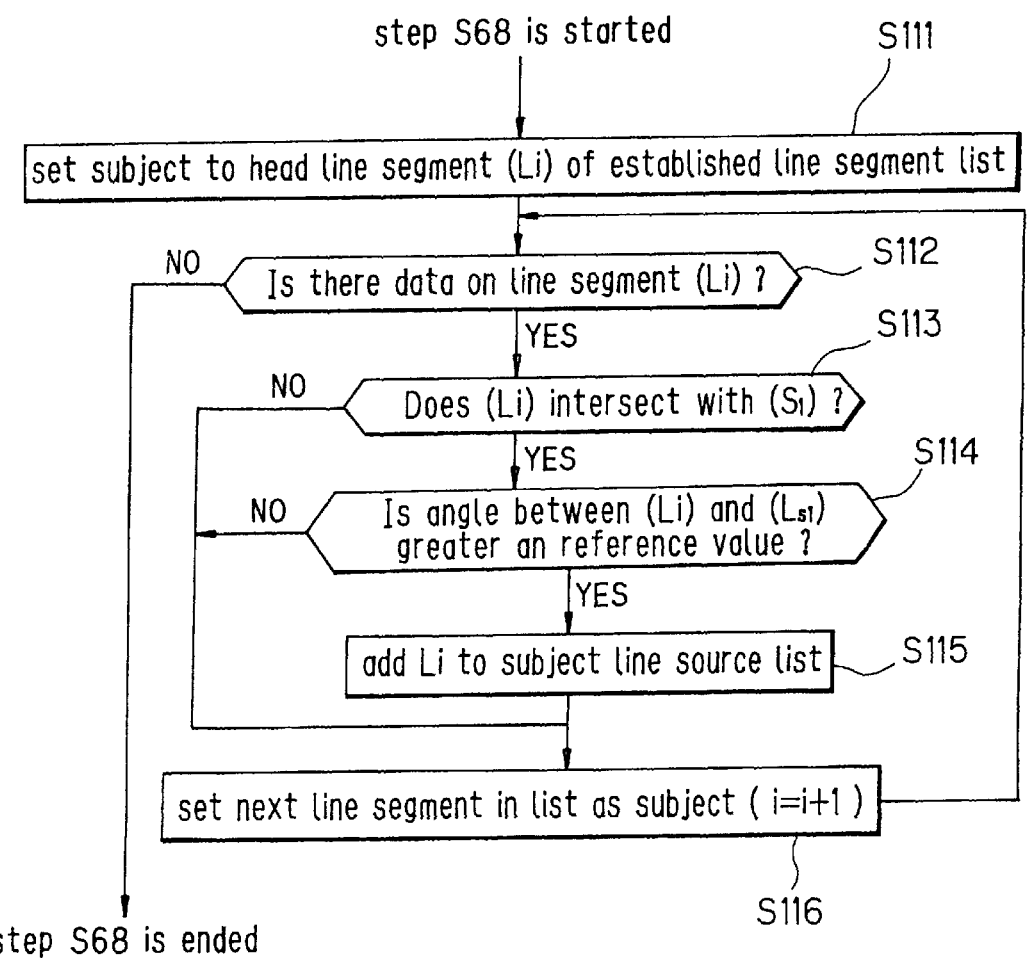
FIG. 15 is a flow chart for explaining in detail the operation from the step S68 of FIG. 7 in case when the process operation shown in FIG. 9 to FIG. 13 is performed.
Figure 16:
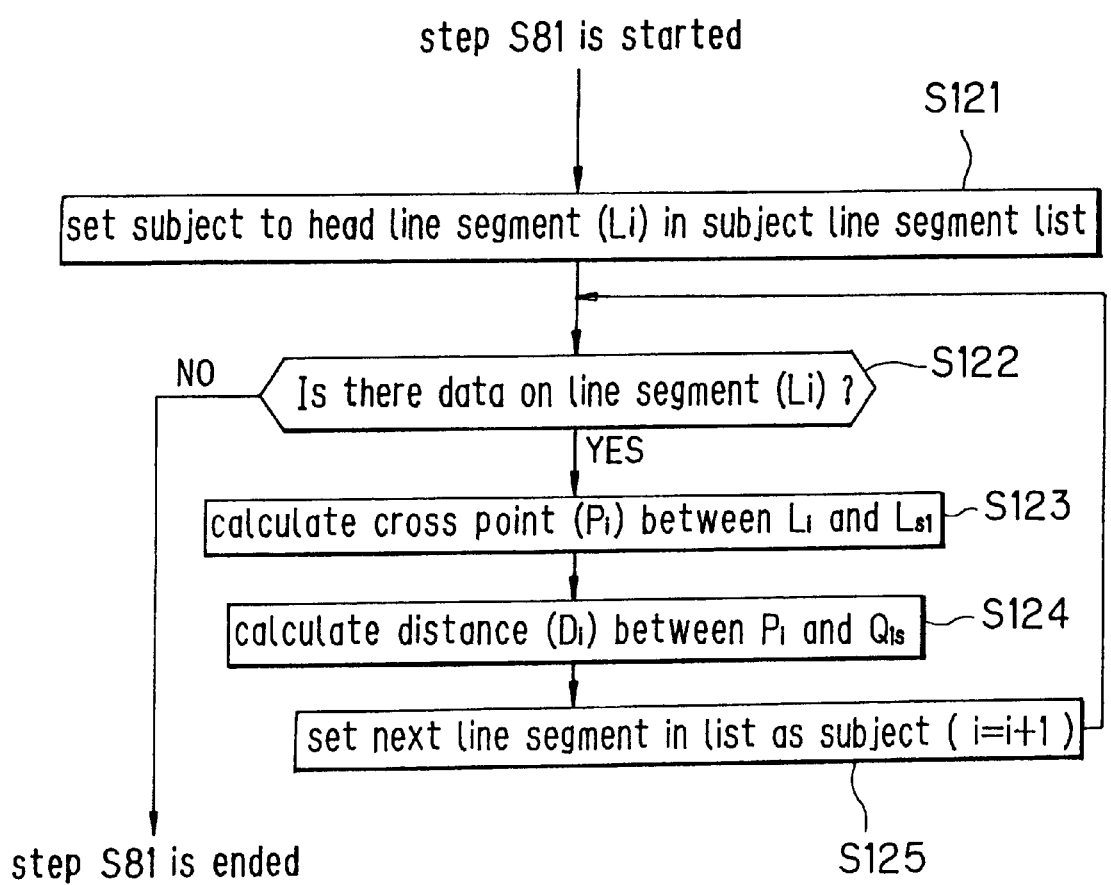
FIG. 16 is a flow chart for explaining in detail the operation from the step S81 of FIG. 8 in case when the process operation shown in FIG. 9 to FIG. 13 is performed.

FIG. 9 to FIG. 13 represent a display example of gestures in case that line segments which have been previously entered and displayed are aligned in a equidistant interval. To perform such a process operation, the process operation of the step S66 is executed as shown in FIG. 14, the process operation of the step S68 carried out as indicated in FIG. 15, the process operation of the step S81 is performed as shown in FIG. 16, and the process operation of the step S82 is performed as denoted in FIG. 17.

Figure 9:
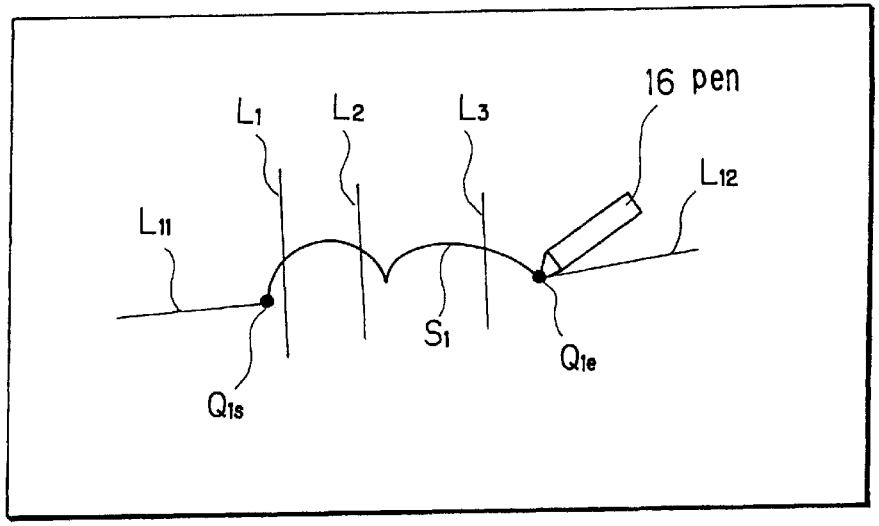
FIG. 9 is a first diagram for explaining a gesture operation to align line segments at an equidistant interval.

As illustrated in FIG. 9, in case of this embodiment, three straight lines $L_1$, $L_2$, $L_3$ are displayed in such a manner that these straight line are mutually extended along the substantially upper and lower directions are located parallel to each other with different intervals. A straight line $L_{11}$ is displayed on the left side of the straight line $L_1$ under substantially horizontal condition in such a manner that a predetermined angle is defined by this straight line $L_1$ and other straight lines $L_2$ and $L_3$. Similarly, another straight line $L_{12}$ is displayed on the right side of the straight line $L_3$ under substantially horizontal condition in such a manner that a certain angle is defined between this straight line $L_{12}$ and the straight line $L_3$.

Assuming now that a user changes the display condition of the three straight lines $L_1$, $L_2$, $L_3$ into an equidistant interval display condition. In this case, as illustrated in FIG. 9, the user inputs such a gesture $S_1$ that two half circular patterns (figures) are continuously connected to each other by way of a pen 16. A starting point of the gesture $S_1$ is $Q_{1s}$ and an end point thereof is $Q_{1e}$.

Figure 10:
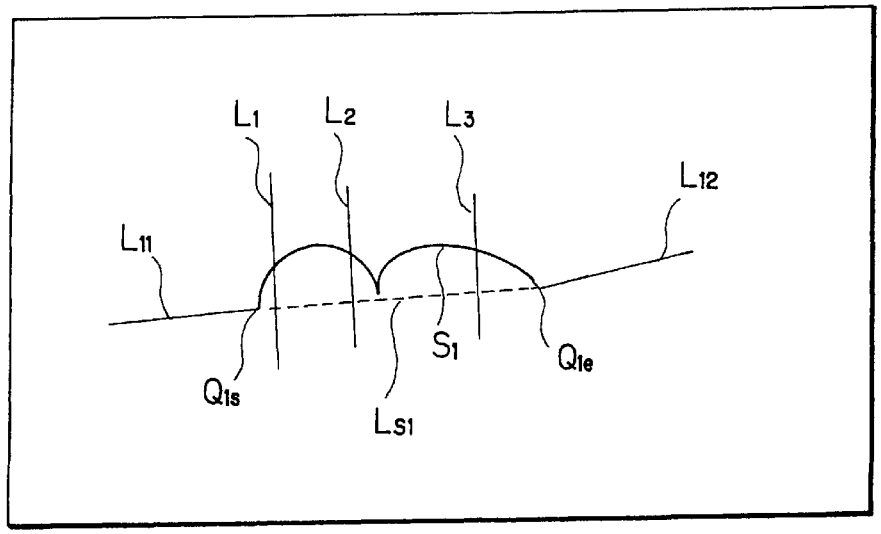
FIG. 10 is a second diagram for explaining a gesture operation to align line segments at an equidistant interval.

The process operation of the step S66 corresponds to a process operation for extracting a featured handwriting amount of a gesture. In this case, as shown in FIG. 14, coordinate values of the starting point $Q_{1s}$ and the end point $Q_{1e}$ of the gesture (input handwriting) $S_1$ are acquired as the featured amounts. Then, at a step S102, a straight line $L_{s1}$ containing the starting point $Q_{1s}$ and the end point $Q_{1e}$ is extracted as represented in FIG. 10.

On the other hand, the step S68 of FIG. 7 corresponds to a process operation for retrieving a line segment which corresponds to a subject to process a gesture command. This process operation is performed as shown in FIG. 15. In other words, at a first step S111, a process subject is set to a head line segment Li of the list in the processed line segment list memory unit 76. For example, it is now assumed that Li=$L_1$. Thereafter, the process operation is advanced to a step S112 at which a judgement is made as to whether or not the data about the lien segment Li set at the step S111 is present.

When this data is present, the process operation is advanced to a step S113 at which a check is done as to whether or not this line segment Li intersects with the gesture $S_1$. If the line segment Li intersects with the gesture $S_1$, the process operation is advanced to a step S114 at which a judgement is made whether or not an angle defined between the line segment Li and the straight line $L_{s1}$ is greater than, or equal. to a preset reference value. In other words, when the angle defined between the line segment Li and the gesture $S_1$ is smaller than the reference value, this line segment Li is excluded from the process subject. When the angle between both of the line segment Li and the gesture $S_1$ is greater than, or equal to the reference value, the process operation is advanced to a step S115 at which this line segment Li is registered to the list of the processed line segment list memory unit 78.

Subsequently, the process operation is advanced to a step S116 at which a variable "i" is incremented by 1, and the next line segment in the processed line segment list is used to be processed. At the step S113, when it is so judged that the line segment Li intersects with the gesture $S_1$, and also at the step S114, when the angle defined between the line segment Li and the straight line $L_{s1}$ is below than the reference value, the process operation is advanced to a step S116 at which the subject is moved to the next line segment.

Figure 11:
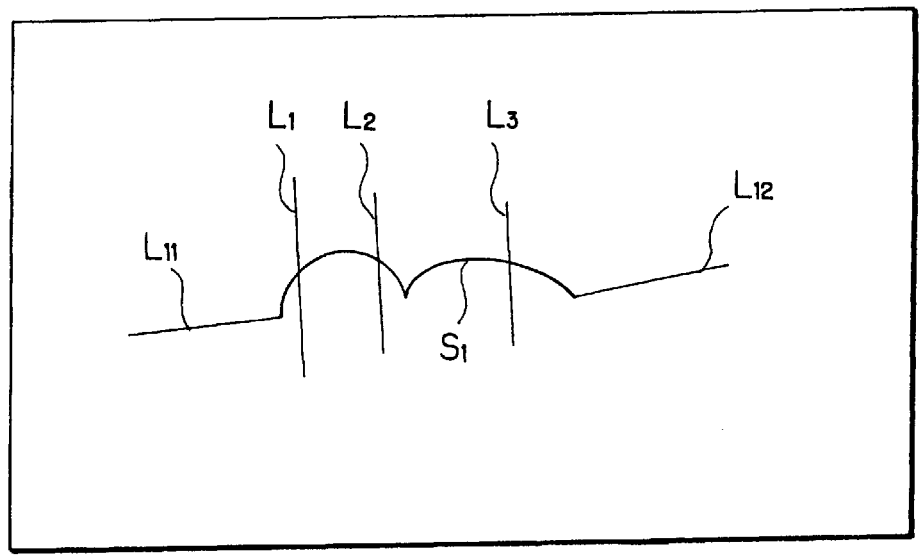
FIG. 11 is a third diagram for explaining a gesture operation to align line segments at an equidistant interval.

In case of this embodiment, as shown in FIG. 11, since the three straight lines $L_1$ to $L_3$ intersect with the gesture $S_1$ at a sufficiently large angle, it is judged that these three straight lines $L_1$ to $L_3$ are to be processed, and these straight lines are stored into the subject line segment list.

On the other hand, the step S81 shown in FIG. 8 corresponds to a process operation for confirming a featured amount of a subject line segment, and this process operation is carried out as shown in FIG. 16 in this embodiment. First, at this step S121, the head line segment Li of the subject line segment list is first processed. Next, the process operation is advanced to a step S122 at which there is data about the line segment Li. If the data about the line segment Li is present, then the process operation is advanced to a step S123, at which a cross point Pi between the line segment Li and the straight line $L_{s1}$ is obtained.

Subsequently, the process operation is advanced to a step S124 at which a distance "Di" between the cross point Pi and the starting point $Q_{1s}$ of the gesture $S_1$ is calculated. Then, the process operation is advanced to a step S125 at which the variable "i" is incremented by 1, and a line segment to be processed is changed into the next line segment. Then, the process operation is returned to the step S122 at which a similar process operation is repeated.

At the step S122, when it is judged that the data about the line segment Li is not present, the process operation is not present, the process operation is advanced to a step S82.

Figure 12:
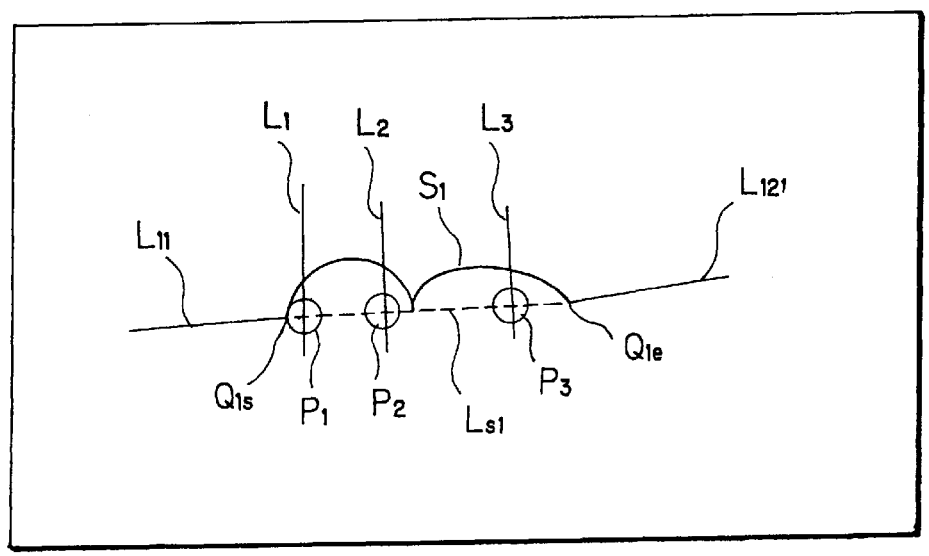
FIG. 12 is a fourth diagram for explaining a gesture operation to align line segments at an equidistance interval.

In case of this embodiment, as illustrated in FIG. 12, a cross point $P_1$ between the straight line $l_1$, and the straight line $L_{s1}$, another cross point $P_2$ between the straight line $l_2$ and the straight line $L_{s1}$, and another cross point $P_3$ between the straight line $L_3$ and the straight line $L_{s1}$ are obtained. Also, distances $D_1$, $D_2$, $D_3$ from the starting point $Q_{1s}$ of the gesture $S_1$ up to the cross points $P_1$, $P_2$, $P_3$ are obtained.

Figure 17:
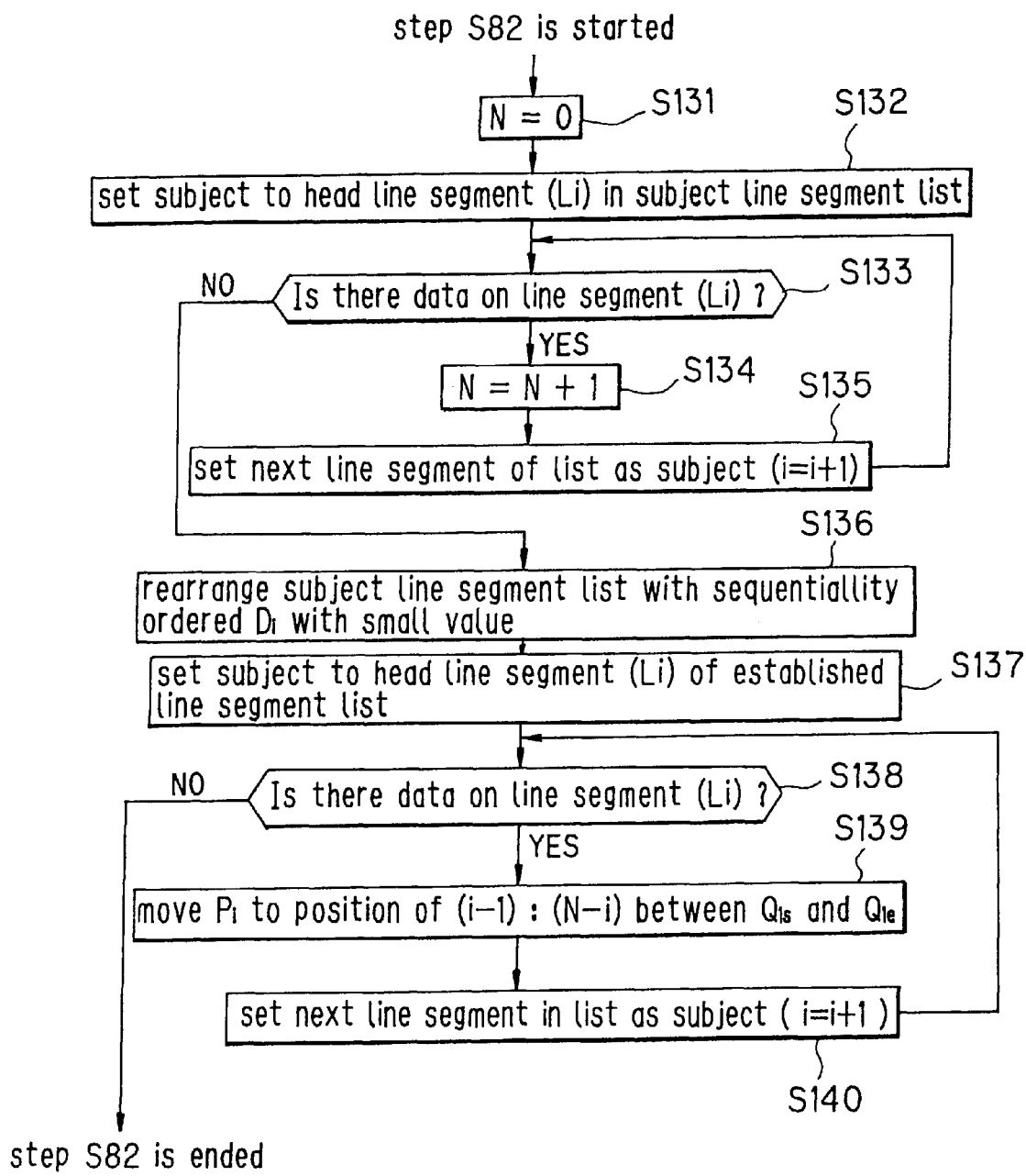
FIG. 17 is a flow chart for explaining in detailed the operation from the step S82 of FIG. 8 in case when the process operation shown in FIG. 9 to FIG. 13 is performed.

A process operation defined at the step S82 of FIG. 8 corresponds to a process operation for performing a calculation of data about a processed line segment. This process operation is performed as shown in FIG. 17 in case of this embodiment. In other words, at a first step S131, a variable N indicative of the number of line segments registered in the subject line segment list is set to "0". Next, at a step S132, the head line segment Li of he subject line segment list is to be processed.

Next, the process operation is advanced to a step S133 at which a judgement is made as to whether or not the data about the lien segment Li is present. If this data about the lien segment is present, then the process operation is advanced to a step S134 at which the variable N is incremented by 1. Then, the process operation is advanced to a step S135 at which the variable "i" is incremented by 1, and also is returned to the step S133 at which a similar process operation is repeated. That is, the quantity of existing line segments is counted by this process operation, and is set to the variable N.

When it is so judged at the step S133 that no data about the lien segment Li is present (namely, all of line segments in list are counted), the process operation is advanced to a step S136, at which the subject line segment list is sorted in such a manner that the line segment data are sequentially aligned in the order of small distances Di. Subsequently, at a step S137, the head line segment Li of the processed line segment list is set to a subject to be processed. Then, the process operation is advanced to a step S138 at which a check is done as to whether or not the data on this line segment Li is present. If there is such a data about the line segment Li, then the process operation is advanced to a step S139. At this step, the cross point Pi between the line segment Li and the line segment $L_{s1}$ is moved to such a point determined by dividing the distance between the starting point $Q_{1s}$ and the end point $Q_{1e}$ of the gesture $S_1$ at a ratio of (i−1) to (N−i). Thereafter, the process operation is advanced to a step S140 at which after the variable "i" is incremented by 1, the process operation is returned to the step S138 where a similar process operation is repeated.

When it is so judged at the step S138 that there is no data about the line segment Li, the process operation is transferred to the process operation defined at the step S83.

Figure 13:
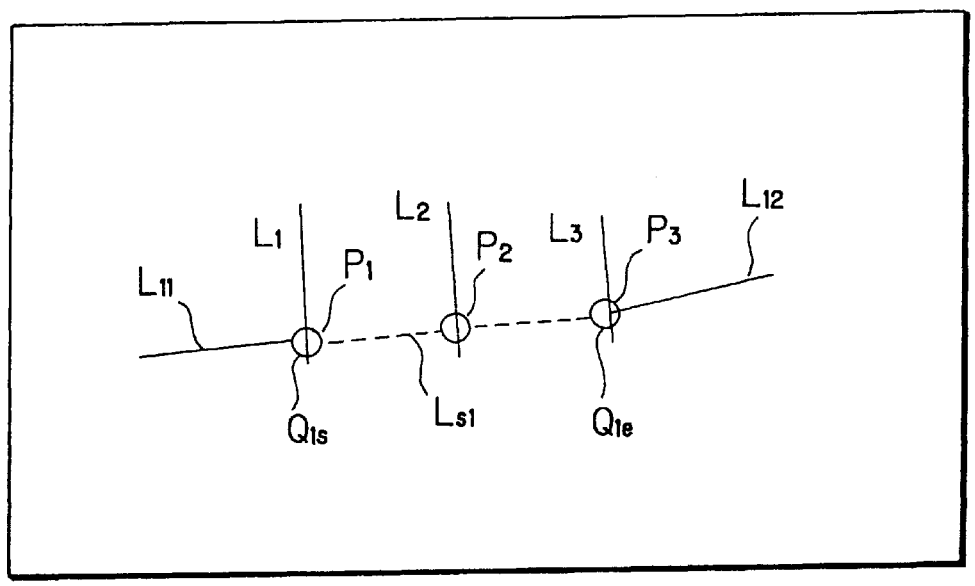
FIG. 13 is a fifth diagram for explaining a gesture operation to align line segments at an equidistant interval.

In case of the present embodiment, as shown in FIG. 13, since the subject line segments are $L_1$, $L_2$, $L_3$, it is set N=3. Then, the cross point $P_1$ between the straight line $L_1$ and the straight line $L_{s1}$ is arranged to a position coincident with the starting point $Q_{1s}$ of the gesture $S_1$, and the cross; point $P_3$ between the straight lien $L_3$ and the straight line $L_{s1}$ is moved to a position coincident with the end point $Q_{1e}$ of the gesture $S_1$. Then, the cross point $P_2$ between the straight line $L_2$ and the straight line $L_{s1}$ is moved to a midpoint between the end point $Q_{1e}$ and the starting point $Q_{1s}$ of the gesture $S_1$. As a result, the straight lines $L_1$ to $L_3$ are moved and displayed in such a manner that the interval between the straight line $L_1$ and the straight line $L_2$ is made equal to the interval between the straight line $l_2$ and the straight line $L_3$.

In an embodiment shown in FIG. 18 to FIG. 22, such a process operation is carried out that two straight lines arranged at a predetermined angle are located at a right angle, namely a trailing process is performed. In this case, the respective process operations defined at the steps S66, S68, S81, or S82 among the process operations shown in FIG. 4 to FIG. 8 are performed as illustrated in FIG. 23, FIG. 24, FIG. 25, or FIG. 26.

Figures 23, 24:
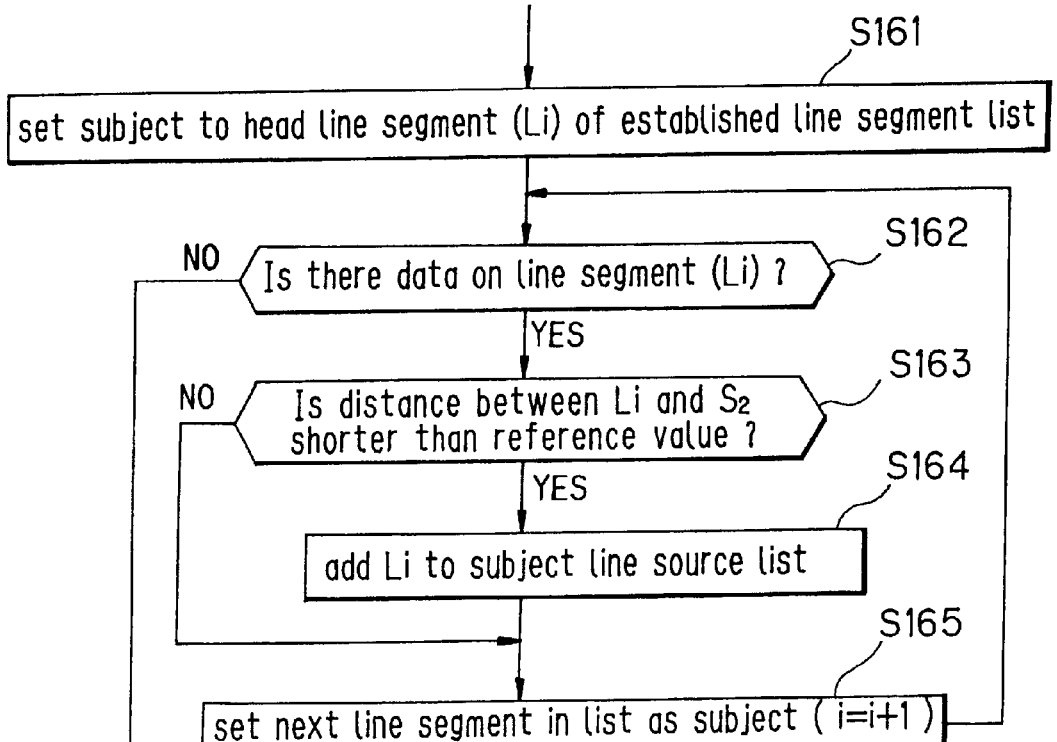
FIG. 23 is a flow chart for explaining in detail the process operation from the step S66 of FIG. 7 in case when the embodiment shown in FIG. 18 to FIG. 22 is performed.
FIG. 24 is a flow chart for explaining in detail the process operation from the step S68 of FIG. 7 in case when the embodiment shown in FIG. 18 to FIG. 22 is performed.

To perform the process operation for extracting the featured amount of the gesture handwriting defined at the step S66, coordinate values of a starting point $Q_{2s}$ and an end point $Q_{2e}$ of a gesture $S_2$ are detected at a step S151 in this embodiment, as illustrated in FIG. 23.

Figure 18:
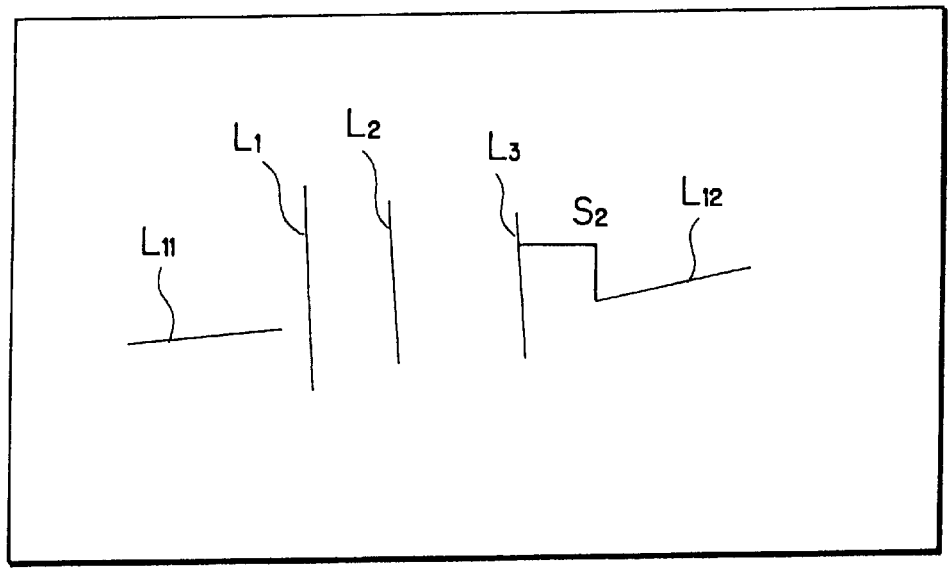
FIG. 18 is a first diagram for describing a gesture to vertically set two straight lines.
Figure 19:
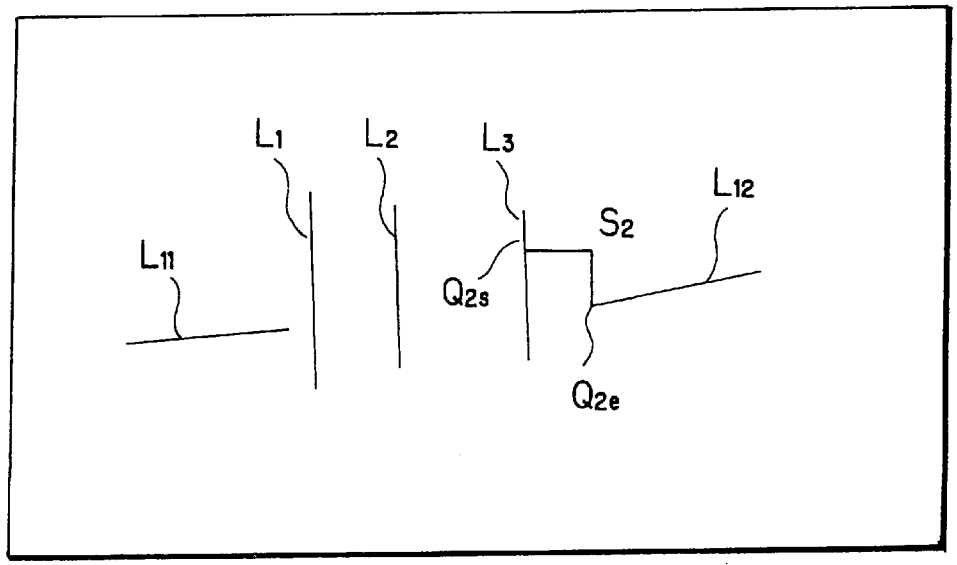
FIG. 19 is a second diagram for describing a gesture to vertically set two straight lines.
Figure 20:
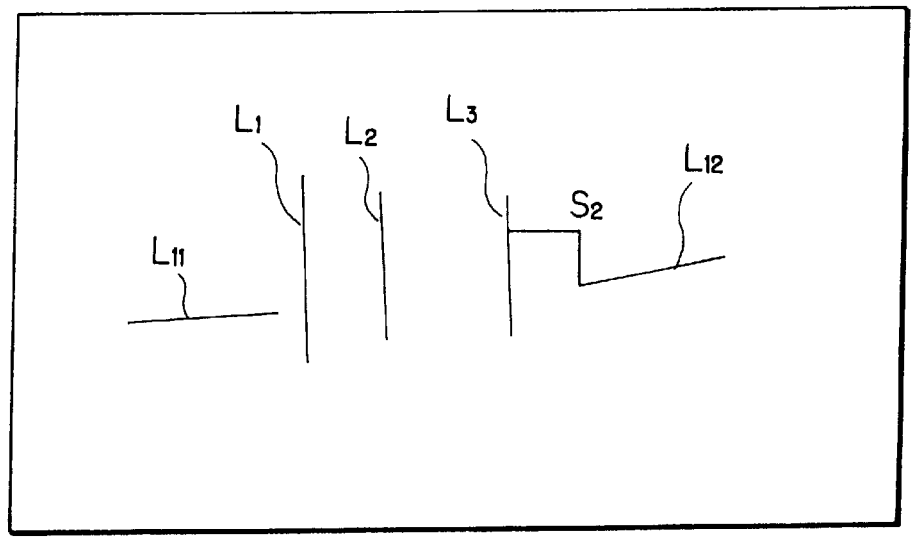
FIG. 20 is a third diagram for describing a gesture to vertically set two straight lines.

In other words, as shown in FIG. 18 and FIG. 19, in accordance with this embodiment, the gesture $S_2$ constructed of a line segment bent at a substantially 90 degrees is written in such a manner that the starting point thereof is $Q_{2s}$ and the end point thereof is $Q_{2e}$ in order to establish such a relationship that the straight lines $L_3$ and $L_{12}$ are positioned at a right angle. Both the starting point $Q_{2s}$ and the end point $Q_{2e}$ are detected.

At the step S68 of FIG. 7, the line segment to be processed is retrieved, so that this process operation is carried out as illustrated in FIG. 24. That is, at a first step S161, the head line segment Li of the processed line segment list is first processed. Then, at a step S162, a judgement is made as to whether or not there is the data about the line segment Li. If this data is present, then the process operation is advanced to a step S163 at which a judgement is made as to whether or not a distance between the line segment Li and the gesture $S_2$ is smaller than, or equal to a preset reference value. When it is so judged the distance is smaller than, or equal to the reference value, the process operation is advanced to a step S164 at which the line segment Li is registered into the subject line segment list.

When it is so judged at the step S163 that the distance between the line segment Li and the gesture $S_2$ greatly exceeds the reference value, this line segment Li is not added to the subject line segment list, but removed from the process subject. That is, in this case, such a line segment whose the distance between the gesture $S_2$ and the line segment is smaller than the reference value, is to be processed.

After the judgement process has been complete for the line segment Li, the process operation is advanced to a step S165 at which the variable "i" is incremented by 1, and the process operation is returned to the step S162 at which a similar process operation is repeated.

At the step S162, when it is so judged that there is no data about the line segment Li, the process operation is advanced to the step S68.

As shown in FIG. 19, in case of this embodiment, since the straight line present at the distance below than the reference value for the gesture $S_2$ corresponds to the straight lines $L_3$ and $L_{12}$, these two straight lines are to be processed.

Figure 25:
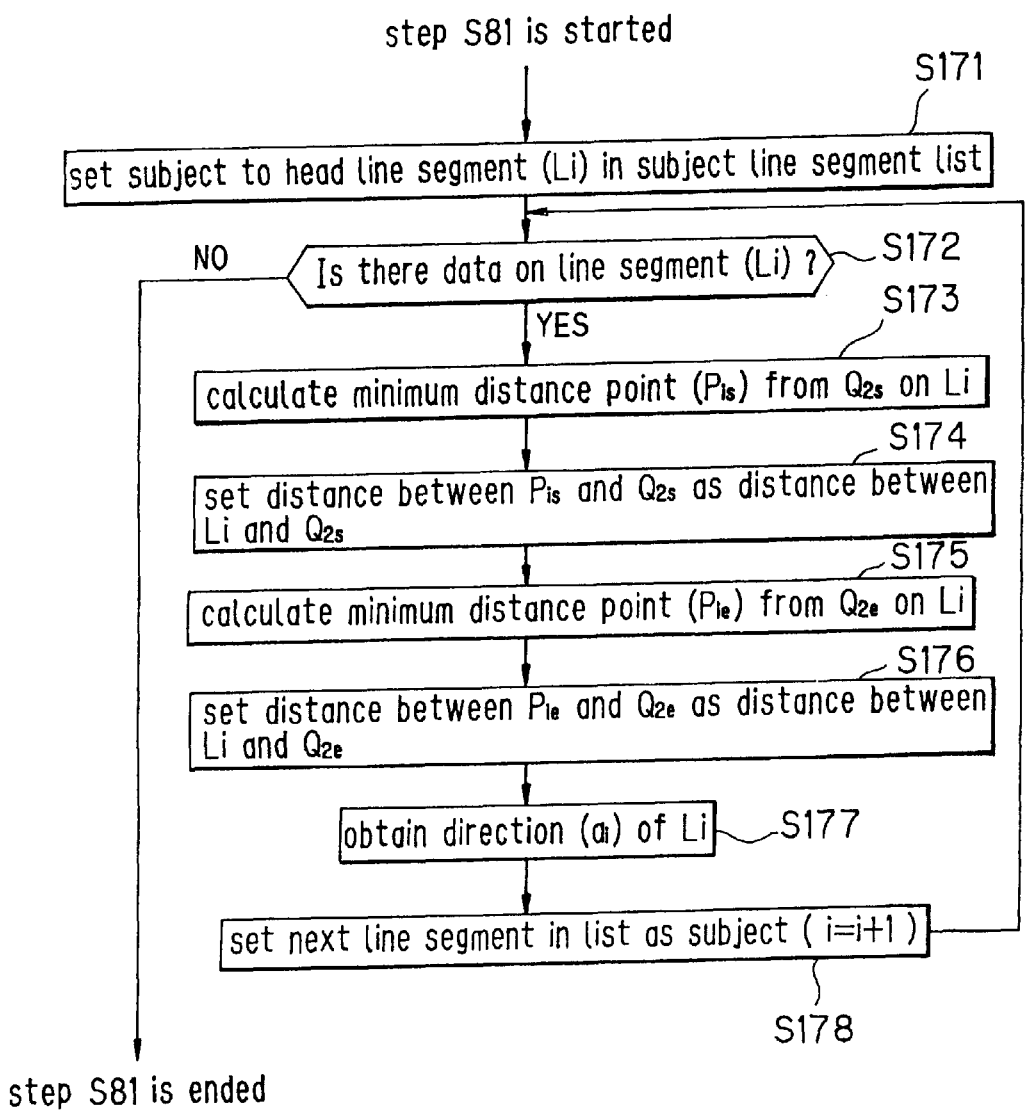
FIG. 25 is a flow chart for explaining in detail the process operation from the step S8 of FIG. 8 in case when the embodiment shown in FIG. 18 to FIG. 22 is performed.

Next, to perform the process operation for confirming the featured amount of the line segment to be processed at the step S81 of FIG. 8, a process operation shown in FIG. 25 is performed. That is, in this embodiment, the head line segment Li of the subject line segment list is first processed at the step S171. Then, the process operation is advanced to a step S172 at which a check is done whether or not there is data about this line segment Li. When the data on the line segment Li is present, the process operation is advanced to a step S173 at which such a point $P_{is}$ whose distance between the stating point $Q_{2s}$ of the gesture $S_2$ and itself is minimum is obtained. Subsequently, at a step S174, a distance between the point $P_{is}$ obtained at the step S173 and the starting point $Q_{2s}$ of the gesture $S_3$ is assumed as a distance $D_{si}$ between the line segment Li and the starting point $Q_{2s}$.

Similarly, at a step S175, a point $P_{ie}$ is obtained whose distance from the end point $Q_{2e}$ of the gesture $S_2$ on the line segment Li. At the next step S176, the distance between the point $P_{ie}$ and the end point $Q_{2e}$ is set as a distance $D_{ei}$ between the line segment Li and the end point $Q_{2e}$.

At a step S177, a direction "ai" of the line segment Li is calculated. Then, a step S178, after the variable "i" is incremented by 1, the process operation is returned to the step S172 at which a similar process operation is repeatedly performed. When it is so judged at the step S172 that there is no data about the line segment, the process operation is advanced to a step S82.

Figure 26:
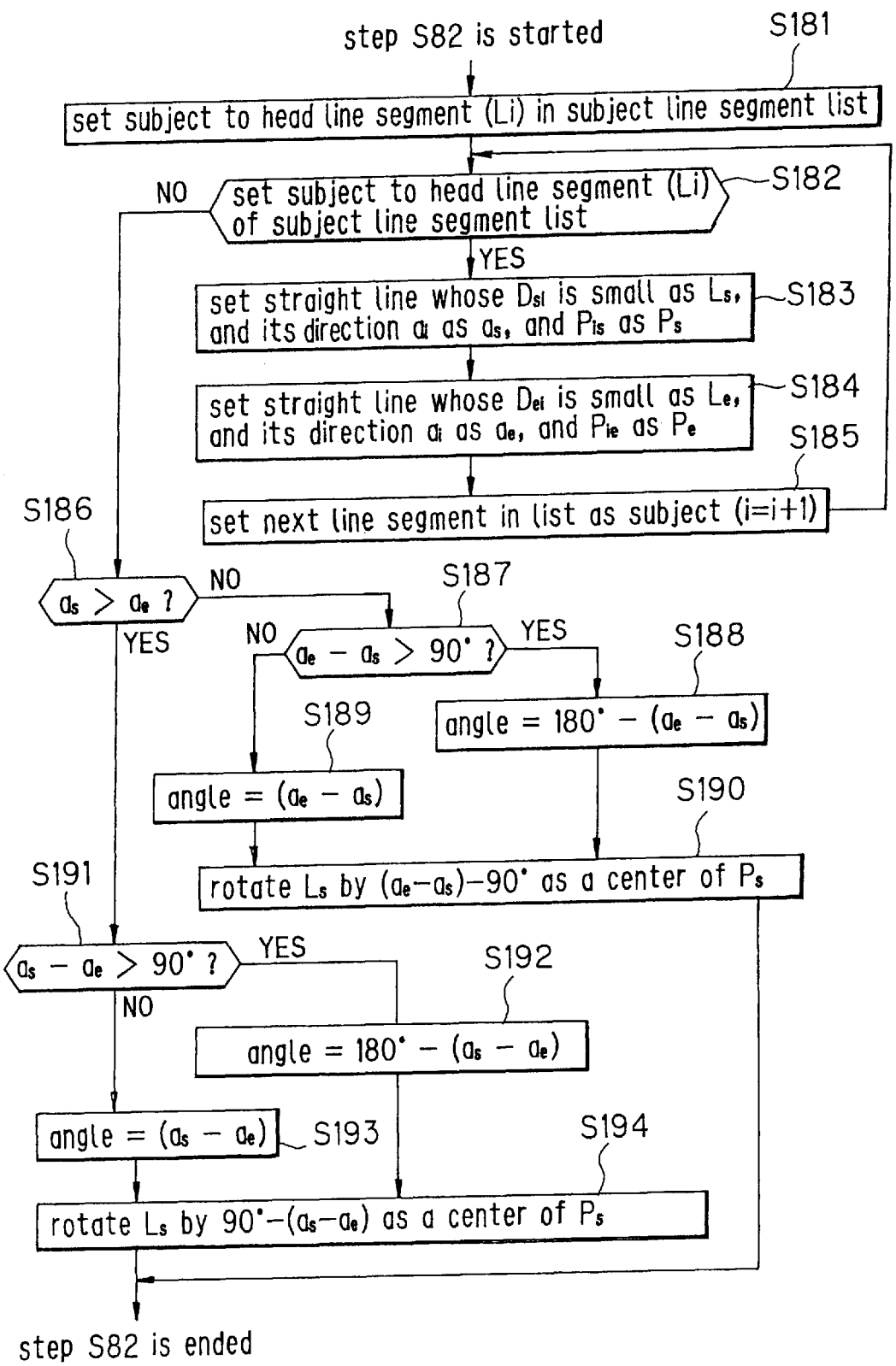
FIG. 26 is a flow chart for explaining in detail the process operation from the step S82 of FIG. 8 in case when the embodiment shown in FIG. 18 to FIG. 22 is performed.

The calculation of the line segment data after being processed at the step S82 of FIG. 8 is performed as defined from the step S181 to S194 of FIG. 26. That is, at a step S181, the head line segment Li in the subject line segment list is first processed. Then, a judgement is made at a step S182 as to whether or not the data on the line segment Li is present. If there is this data, then the process operation is advanced to a step S183. At this step S183, a straight line whose distance "$D_{si}$" from the starting point $Q_{2s}$ of the gesture $S_2$ is minimum is set as Ls, a direction "ai" of this straight line is set as $a_s$, and a point "$P_{is}$" on this straight line, whose distance is the shortest from the starting point $Q_{2s}$.

In other words, at the step S183, a distance $D_{si-1}$ of a line segment $L_{i-1}$, which has been processed just before, is compared with the distance $D_{ci}$ of the line segment Li, which is presently process, so that either the straight line having the shorter distance is set as Ls. As a result, the straight line which is located at the nearest position from the starting point $Q_{2s}$ of the gesture $S_2$, is selected as a first processing line segment Ls.

Next, the process operation is advanced to a step S184 at which a straight line whose distance $D_{ei}$ from the end point $Q_{2e}$ of the gesture $S_2$ is minimum is set as Le, the direction ai of this straight line is set to $a_e$, and the point $P_{ie}$ on this straight line, which is located at the nearest position from the end point $Q_{2e}$ of the gesture $S_2$ is set to a point $P_e$. That is, the distance $D_{ei-1}$ of the previously processed line segment $L_{i-1}$ is compared with the presently processed distance $D_{ei}$, and then either the straight line having the shorter distance is set as Le. As a result, the straight line which is located at the nearest position from the end point $Q_{2e}$ of the gesture $S_2$ is selected as a second processing line segment Le.

Thereafter, the process operation is advanced to a step S185 at which the variable "i" is incremented by 1. Then, the process operation is returned to the step S182 at which a similar process operation is repeated.

At the step S182, when it is so judged that there is no data about the line segment Li (retrieving operations for data on all line segments Li have been accomplished), the process operation is advanced to a step S186 at which a comparison is made between the direction as of the line segment Ls located at the nearest position from the starting point $Q_{2s}$ of the gesture $S_2$ and the direction ae of the line segment Le located at the nearest position from the end position $Q_{2e}$. When either as is larger than, or equal to as, the process operation is advanced to a step S187 at which a judgement is made as to whether or not a value obtained by substracting as from ae is larger than 90 degrees.

When $(a_e-a_s)$ is larger than 90 degrees, the process operation is advanced to a step S188 at which a value of $180°-(a_e-a_s)$ is set to "angle". When the value of $(a_e-a_s)$ is smaller than, or equal to 90 degrees, the process operation is advanced to a step S189 at which the value of $(a_e-a_s)$ is directly set to "angle". In other words, an acute angle (i.e., smaller angle) among the angles defined between the line segment Ls and the line segment Le is set to "angle".

Then, the process operation is advanced from either the step S188 or the step S189 to a step S190 at which the line segment Ls located at the nearest position from the starting position $Q_{2s}$ of the gesture $S_2$ is rotated by an angle $((a_e-a_s)-90°)$ around the point Ps located at the nearest position from the starting point $Q_{2s}$ of the gesture $S_2$ as a center. As a result, the line segment Ls close to the starting point $Q_{2s}$ of the gesture $S_2$ is rotated by a preselected angle with respect to the line segment Le located at he nearest position from the end point $Q_{2e}$, whereby the angle between the line segment Ls and the line segment Le becomes 90 degrees.

When it is so judged at the step S186 that the angle $a_s$ is greater than the angle $a_e$, the process operation is advanced to a step S191 at which another judgement is made whether or not $(a_s-a_e)$ is greater than 90°. When $(a_s-a_e)$ is greater than 90°, the process operation is advanced to a step S192 at which a value of $180°-(a_s-a_e)$ is set to "angle". When it is so judged that the value of $(a_s-a_e)$ is smaller than, or equal to 90°, the process operation is advanced to a step S193 at which the value of $(a_s-a_e)$ is set to "angle".

In other words, similar to the above-described case, the smaller angle (acute angle) is set to "angle" among the angles defined between the two straight lines Ls and Le. Then, at a step S194, the straight Ls is rotated by the angle of $90°-(a_s-a_e)$ around the point Ps as a center, and is inclined by 90° with respect to the straight line Le.

Figure 21:
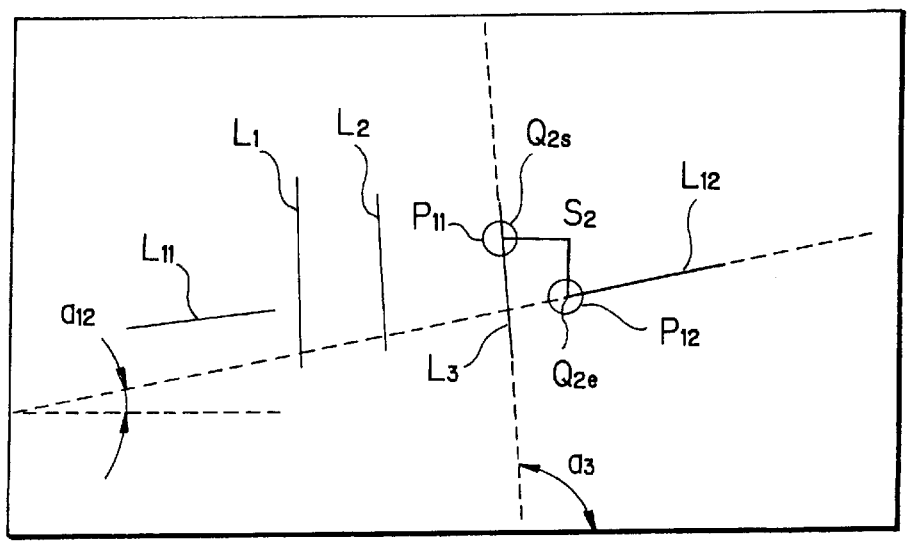
FIG. 21 is a fourth diagram for describing a gesture to vertically set two straight lines.

In the embodiment shown in FIG. 18 to FIG. 22, since the straight line located at the nearest position from the starting point $Q_{2s}$ of the gesture $S_2$ is $L_3$, and the straight line positioned at the nearest location from the end point $Q_{2e}$ is $L_{12}$, these tow straight lines $L_3$ and $L_{12}$ are selected as the processing subject. In FIG. 21, the point $P_{11}$ is located on the straight line $L_3$, at the nearest position from the starting point $Q_{2s}$ of the gesture $S_2$, whereas the point $P_{12}$ is located on the straight line $L_{12}$, at the nearest position from the end point $Q_{2e}$ of the gesture $S_2$. Also, $a_3$ represents the direction (angle) of the straight line $L_3$ and $a_{12}$ indicates the direction (angle) of the straight line $L_{12}$.

Although the angle has been set along the counter clockwise direction with respect to the horizontal direction in the above-described embodiment, this angle may be set along the clockwise direction. Then, in this embodiment, the angle is normalized within a range defined from the positive direction (0°) of the X axis to the negative direction (180°) of the X axis.

Figure 22:
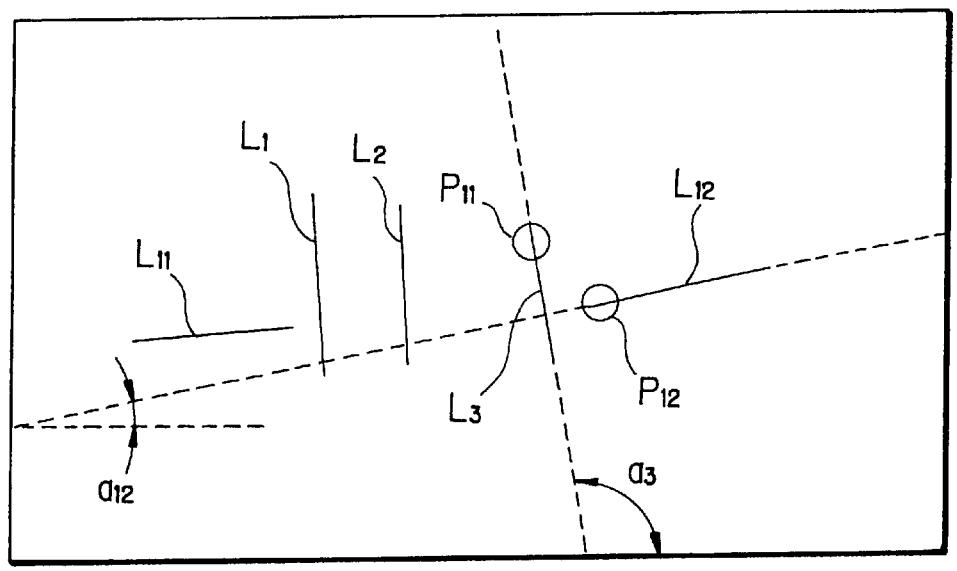
FIG. 22 is a fifth diagram for describing a gesture to vertically set two straight lines.

In FIG. 22, there is shown such a condition that the straight line $L_3$ has been rotated by 90° with respect to the straight line $L_{12}$.

In the above-explained embodiment, the straight line located at the nearest position from the starting point of the gesture is rotated. Alternatively, either the straight line located close to the end point of the gesture, or both of these straight lines may be rotated.

Figure 27:
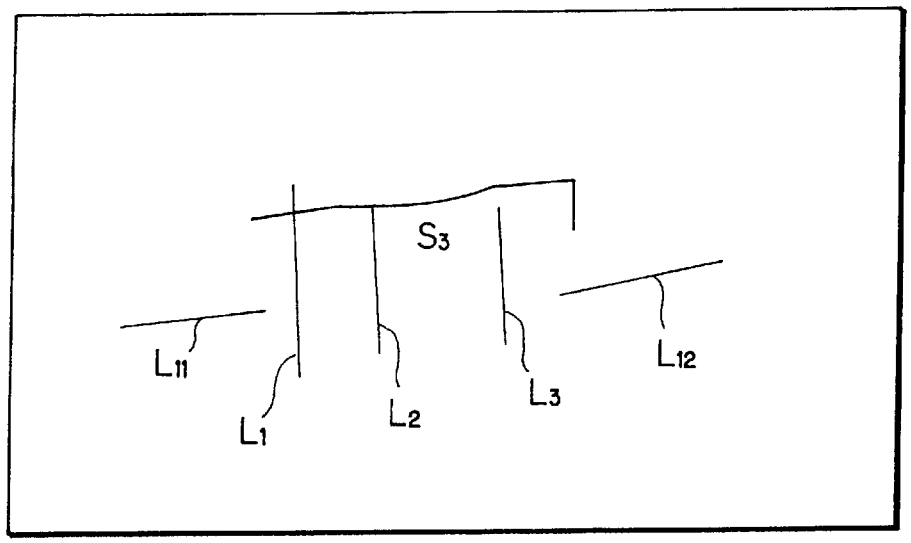
FIG. 27 is a first diagram for describing a gesture which aligns one edge points of straight lines on a straight line.
Figure 28:
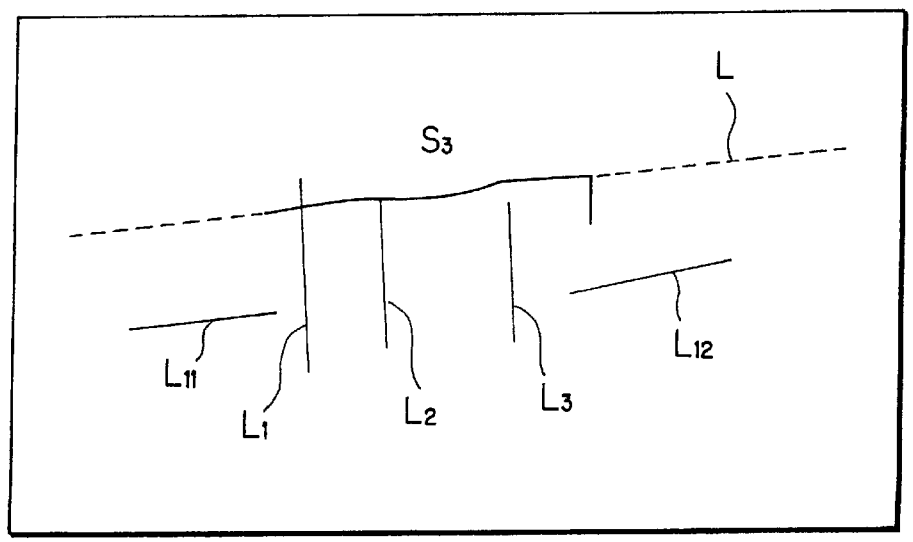
FIG. 28 is a second diagram for describing a gesture which aligns one edge points of straight lines on a straight line.
Figure 29:
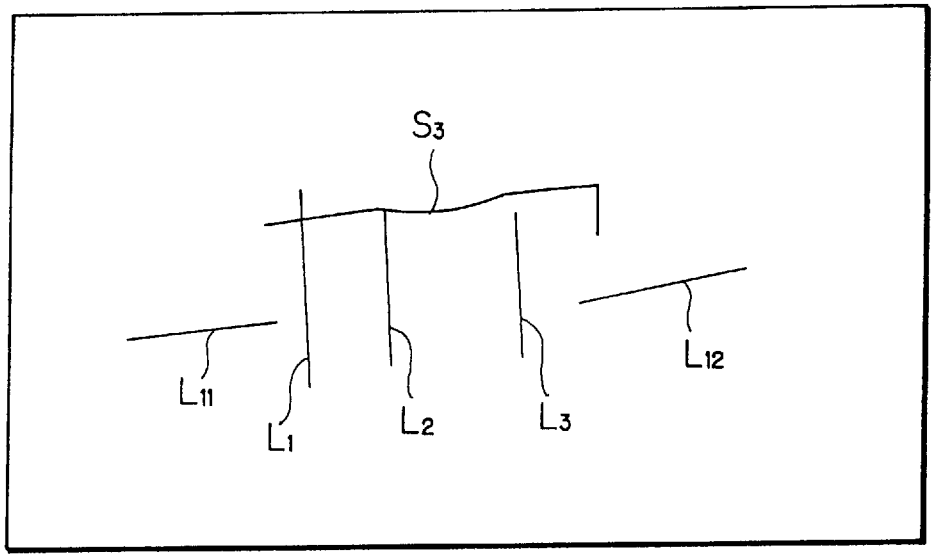
FIG. 29 is a third diagram for describing a gesture which aligns one edge points of straight lines on a straight line.

FIG. 27 through FIG. 31 schematically represent such an embodiment that edge points of line segments are aligned on a predetermined straight line. When such an embodiment is realized, the process operation defined at the step S66 of FIG. 7 is executed by a process operation defined at a step S201 of FIG. 32. That is, as represented in FIG. 27, when a gesture $S_3$ is inputted in which one end portion of a sufficiently long straight line is bent at a short portion thereof, a straight line L involving the longer line segment in this gesture $S_3$ is detected (see FIG. 28).

It should be noted that this gesture $S_3$ has such a shape having a bending angle at a substantially 90°, and when one portion of this gesture $S_3$ owns a twice longer length than the reference value, as compared with the other portion, this gesture $S_3$ is recognized as a gesture whose end points are aligned.

Figure 33:
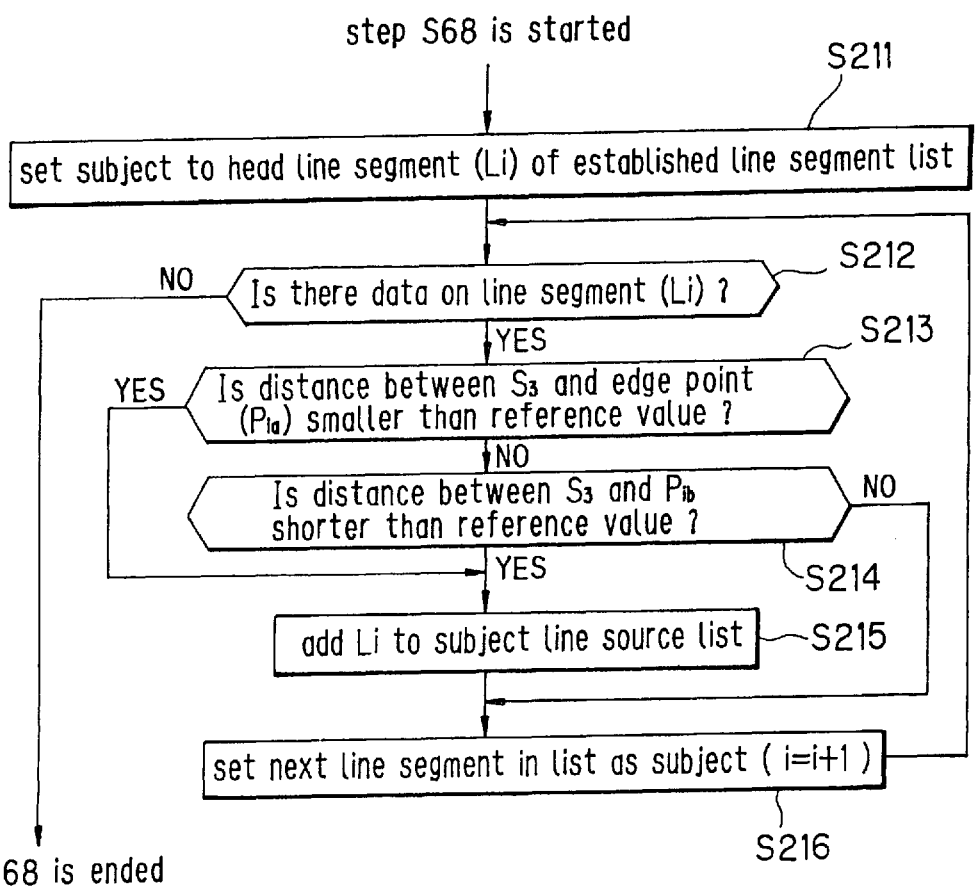
FIG. 33 is a flow chart for explaining in detail the process operation from the step S68 of FIG. 7 in case that the embodiment shown in FIG. 27 to FIG. 31 is performed.

Then, the process operation to retrieve the line segment to be processed as defined at the step S68 of FIG. 7 is carried out shown in FIG. 33. That is, the head line segment Li of the processed line segment list is selected as a first subject to be processed at a step S211. Thereafter, a judgement is made at a step S212 as to whether or not there is data about the line segment Li. When the data about the line segment is present, the process operation is advanced to a step S213 at which another judgement is made as to whether or not a distance between the gesture $S_3$ and one end point $P_{ia}$ of the line segment Li is smaller than, or equal to a preset reference value. When the end point $P_{ia}$ is positioned close to the gesture $S_3$, the process operation is advanced to a step S215 at which this line segment Li is registered into the subject line segment list.

At a step S213, when it is so judged that the edge point $P_{ia}$ is relatively largely separated from the gesture $S_3$, the process operation is advanced to a step S214. At this step S214, another judgement is made as to whether or not a distance between the gesture $S_3$ and the other edge point $P_{ib}$ of this line segment Li is shorter than the reference value. When this distance is shorter than the reference value, the process operation is advanced to a step S215 at which this line segment Li is registered into the subject line segment list.

Subsequently, the process operation is advanced to a step S216 at which the variable "i" is incremented by 1, and the process operation is returned to the step S212 at which a similar operation is repeatedly performed. Thus, the line segments of the gesture $S_3$ to be processed are retrieved by repeating the above-described process operation.

In case of the embodiment shown in FIG. 27 to FIG. 31, there are straight lines $L_1, L_2, L_3$ as the straight lines whose edge points are arranged near the gesture $S_3$. As a result, these three straight lines are selected as the process subject by the gesture $S_3$ in this case.

Figure 34:
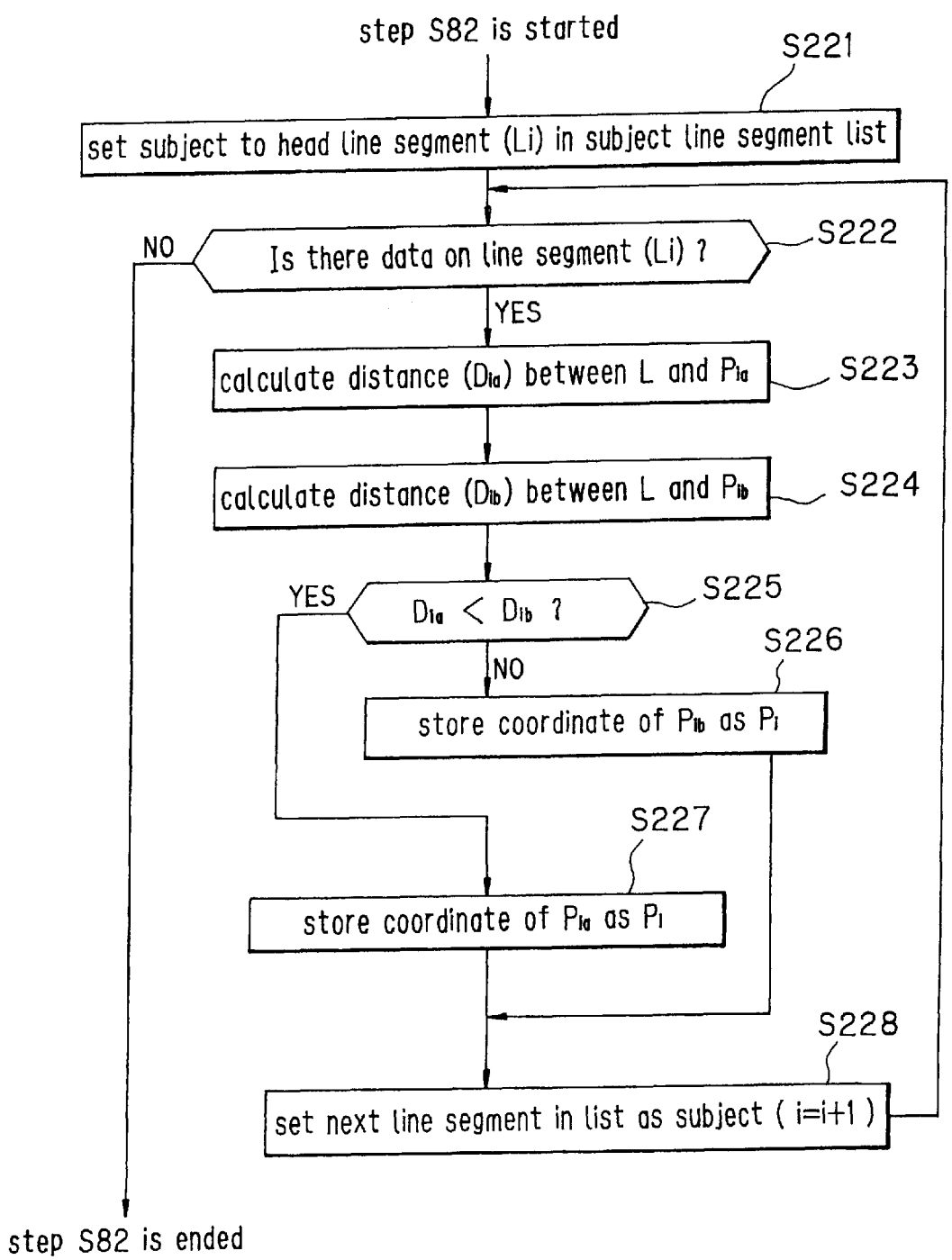
FIG. 34 is a flow chart for explaining in detail the process operation from the step S81 of FIG. 8 in case that the embodiment shown in FIG. 27 to FIG. 31 is performed.

Next, the process operation to confirm the featured amount of the subject line segment as defined at the step S81 in FIG. 8 is carried out as illustrated from a step S221 to S228 of FIG. 34. That is, at a first step S221, the head line segment Li of the subject line segment list is first processed, and at a step S222, a confirmation is made as to whether or not there is the data about this line segment Li. When the data about the line segment Li is present, the process operation is advanced to a step S223. At this step, a calculation is made of a distance $D_{ia}$ between the straight line L corresponding to the gesture $S_3$ confirmed at this step S201 of FIG. 32 and one edge portion $P_{ia}$ of the line segment Li. Similarly, another distance $D_{ib}$ between this straight line L and the other edge point $P_{ib}$ is calculated at a step S224.

At a next step S225, the dimension of the distance $D_{ia}$ is compared with that of the distance $D_{ib}$. The edge point $P_{ia}$, or $P_{ib}$ corresponding to the distance having the smaller dimension is set to a point Pi at either a step S226, or a step S227.

Subsequently, at a step S228, the variable "i" is incremented by 1, and then the process operation is returned to a step S222 at which a similar process operation is repeatedly performed. With this manner, the edge point located at the nearest position from the straight line L corresponding to the gesture $S_3$, among the edge points of these line segments, is stored as Pi.

Figure 30:
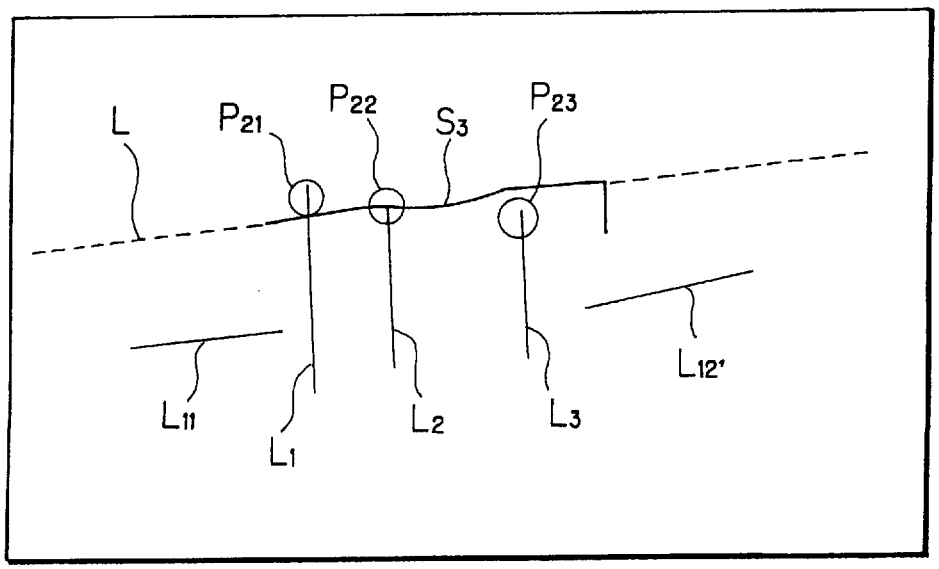
FIG. 30 is a fourth diagram for describing a gesture which aligns one edge points of straight lines on a straight line.

In the embodiment shown in FIG. 30, the edge points $P_{21}$, $P_{22}$, $P_{23}$ of the straight lines $L_1$, $L_2$, $L_3$, as indicated in the upper portion of this drawing, are stored as the edge points located at the nearest point from the straight line L corresponding to the gesture $S_3$.

Figure 35:
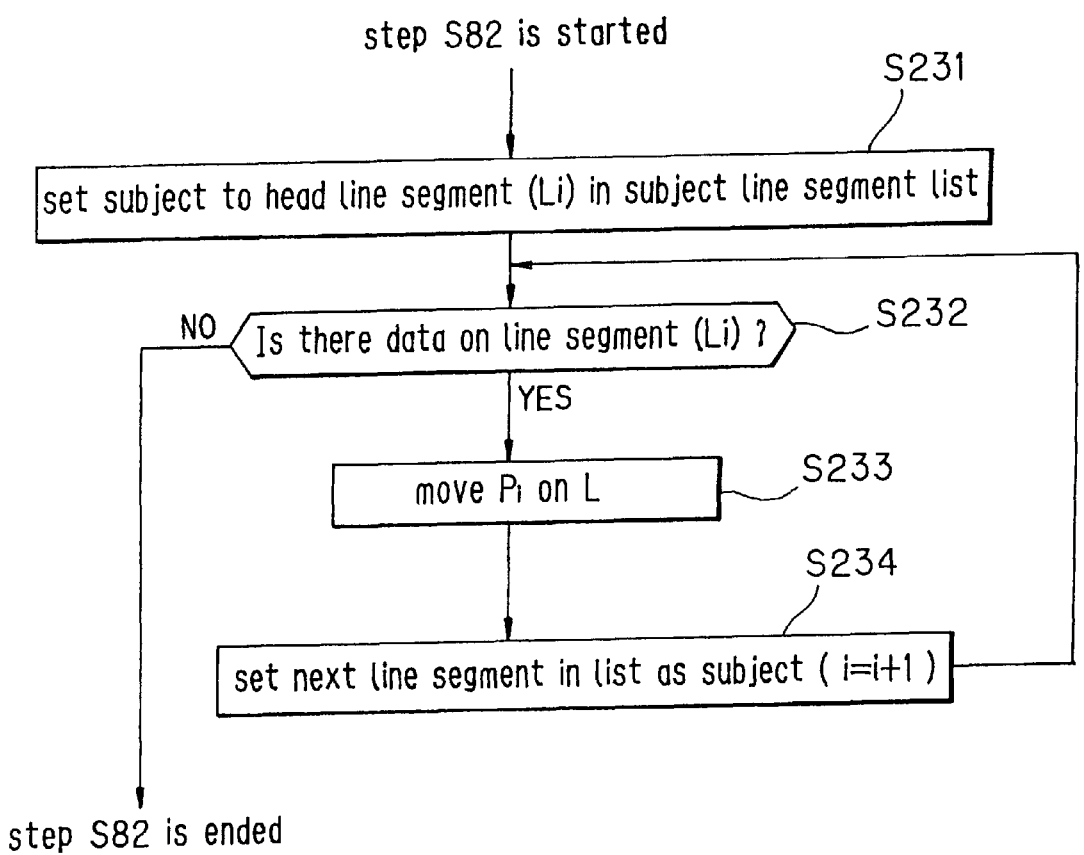
FIG. 35 is a flow chart for explaining in detail the process operation from the step S82 of FIG. 8 in case that the embodiment shown in FIG. 27 to FIG. 31 is performed.

The process operation to calculate the processed line segment data as defined at the step S82 of FIG. 8 is executed as illustrated in a step S231 to a step S234 of FIG. 35. In other words, at the first step S231, a selection is made of the head line segment Li of the subject line segment list. At a step S232, a confirmation is made whether or not the data about this line segment Li is present. When the data about the line segsegment Li is present, the edge point Pi located near the straight line L corresponding to the gesture $S_3$ of this line segment is moved on the straight line L. Then, the process operation is advanced to a step S234 at which the variable "i" is incremented by 1. Then, the process operation is returned to the step S232 at which a similar process operation is repeated. Thus, the edge point of the line segment to be processed is moved on the straight line L.

Figure 31:
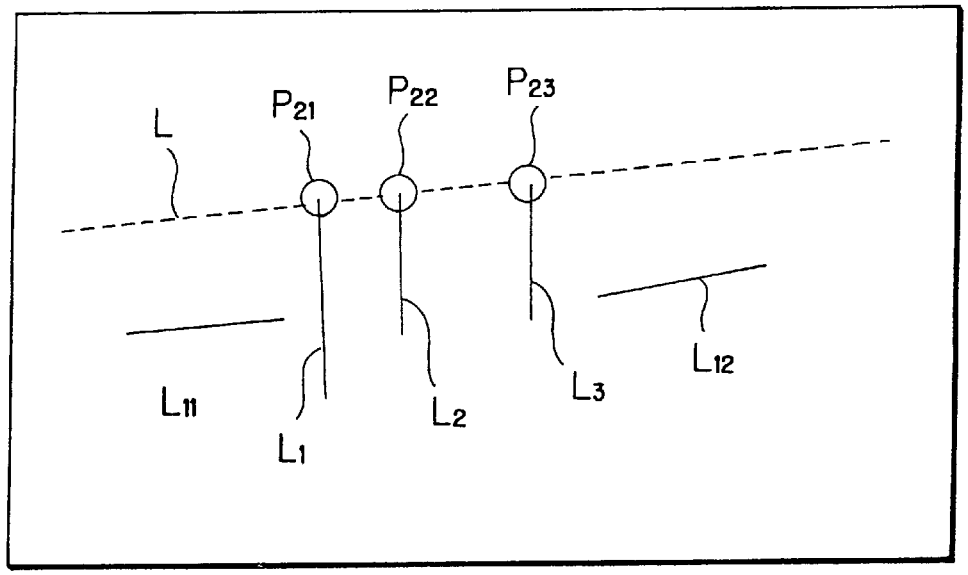
FIG. 31 is a fifth diagram for describing a gesture which aligns one edge points of straight lines on a straight line.
Figure 32:
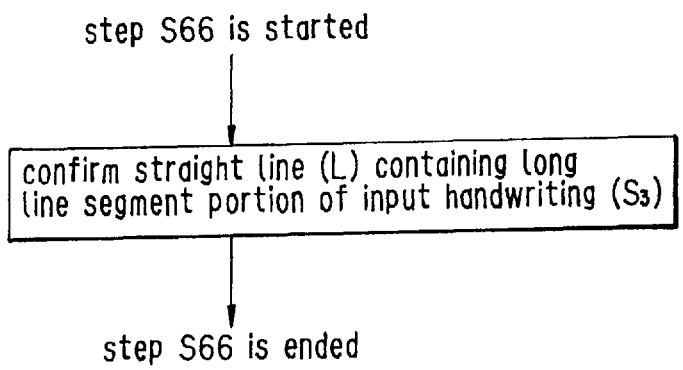
FIG. 32 is a flow chart for explaining in detail the process operatin from the step S66 of FIG. 7 in case that the embodiment shown in FIG. 27 to FIG. 31 is performed.

In the embodiment shown in FIG. 31, the edge points $P_{21}$ to $P_{23}$ of the straight lines $L_1$ to $L_3$ are moved on the straight line L.

It should be noted that although the straight lines $L_1$ to $L_3$ are moved in parallel to this direction in this embodiment, these straight lines may be moved in parallel to the X-axis direction, the Y-axis direction, or the direction perpendicular to the straight line L. Furthermore, the edge points $P_{21}$ to $P_{23}$ are moved on the straight line L, but may be moved in such a manner that these edge points are moved in parallel to the straight line L and on the straight line in such a way that a summation of the distances among these edge points $P_{21}$ to $P_{23}$ become minimum. Alternatively, these edge points may be moved in parallel to the straight line L and on the straight line in such a manner that a powered summation of the distances among these edge points $P_{21}$ to $P_{23}$ becomes minimum.

FIG. 36 to FIG. 40 show such an embodiment that arbitrary straight lines are aligned in parallel to each other at a predetermined angle. To realize such a process operation, the process operations defined at the step S66 and the step S68 shown in FIG. 7, and the steps S82 and S82 indicated in FIG. 8 are executed as illustrated in FIG. 41 to FIG. 4.

Figure 36:
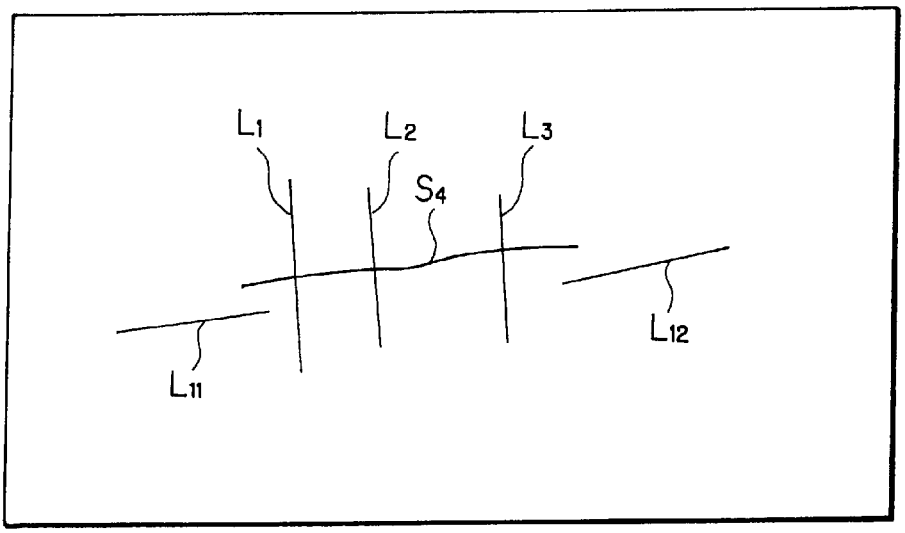
FIG. 36 is a first diagram for explaining a gesture to align a plurality of line segments at a predetermined angle.
Figure 41:
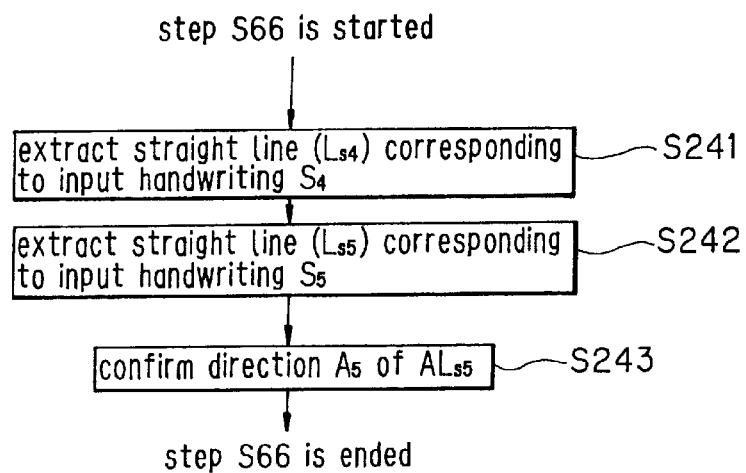
FIG. 41 is a flow chart for describing in detail the process operation from the step S66 of FIG. 7 in case when the embodiment shown in FIG. 36 to FIG. 40 is performed.

In other words, as shown in FIG. 41, the detection of the featured amount of the gesture is carried out as follows: In case of this embodiment, the gesture is arranged by 3 images. As illustrated in FIG. 36, as the first gesture, a gesture $S_4$ is drawn in the form of a single straight line in such a manner that this straight line intersects with line segments $L_1$ to $L_3$ which should be processed.

Figure 38:
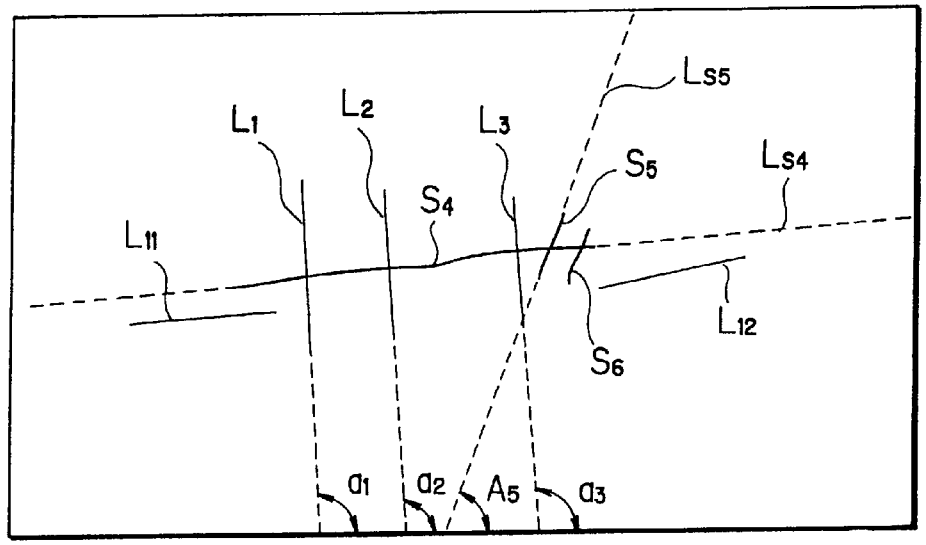
FIG. 38 is a third diagram for explaining a gesture to align a plurality of line segments at a predetermined angle.

As shown in FIG. 3, thereafter, gestures $S_5$ and $S_6$ whose lengths are sufficiently shorter than that of the gesture $S_4$ are entered in such a manner that these gesture $S_5$ and $S_6$ intersect with the gesture $S_4$ at an angle larger than a predetermined reference value. At a step S241, as illustrated in FIG. 38, a straight line $L_{s4}$ corresponding to the gesture $S_4$ is extracted. At the next step S242, another straight line $L_{s5}$ corresponding to the gesture $S_5$ is extracted. Furthermore, at a step S243, a direction $A_5$ of the straight line $L_{s5}$ is detected.

Figure 42:
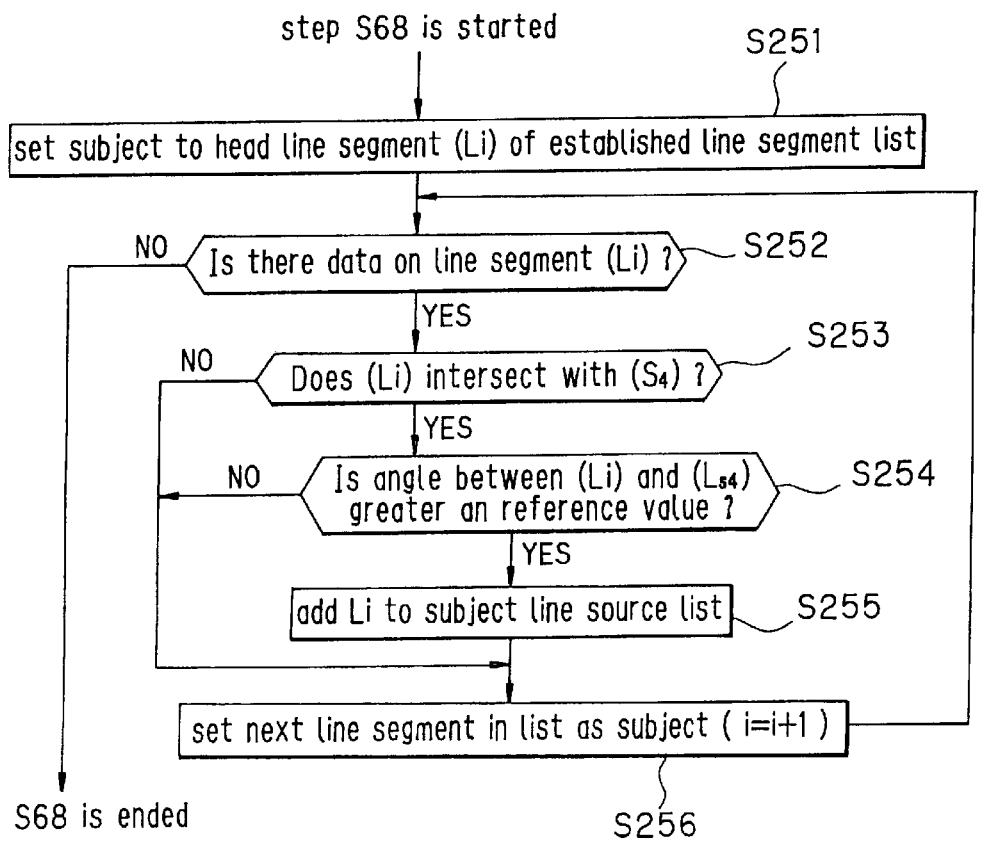
FIG. 42 is a flow chart for describing in detail the process operation from the step S68 of FIG. 7 in case when the embodiment shown in FIG. 36 to FIG. 40 is executed.

As the process operation corresponding to the step S68, as shown in FIG. 42, the head line segment Li of the processed line segment list is first selected as the subject to be processed at a step S251. At a step S252, a judgement is made as to whether or not the data about this line segment Li is present. When is is so judged that the data on the line segment Li is present, the process operation is advanced to a step S253. At this step S253, another check is made as to whether or not does the line segment Li intersect with the gesture $S_4$. When it is so judged that the line segment Li intersects with the gesture $S_4$, the process operation is advanced to a step S254 at which a judgement is made as to whether or not an intersecting angle between the line segment Li and the gesture $S_4$ is larger than, or equal to the reference value. If this intersecting angle is larger than, or equal to the reference value, then the operation is advanced to a step S255 at which this line segment Li is registered into the subject line segment list.

When it is so judged at the step S253 that the line segment Li does not intersects with the gesture $S_4$, when it is so judged at the step S254 that the angle between the line segment Li and the straight line $L_{s4}$ is below than the reference value, and when the register process operation for the processed line segment list has been complete at the step S255, the process operation is advanced to a step S256 at which the variable "i" is incremented by 1, and then the process operation is returned to the step S252. Then, a similar process operation is repeated.

Figure 39:
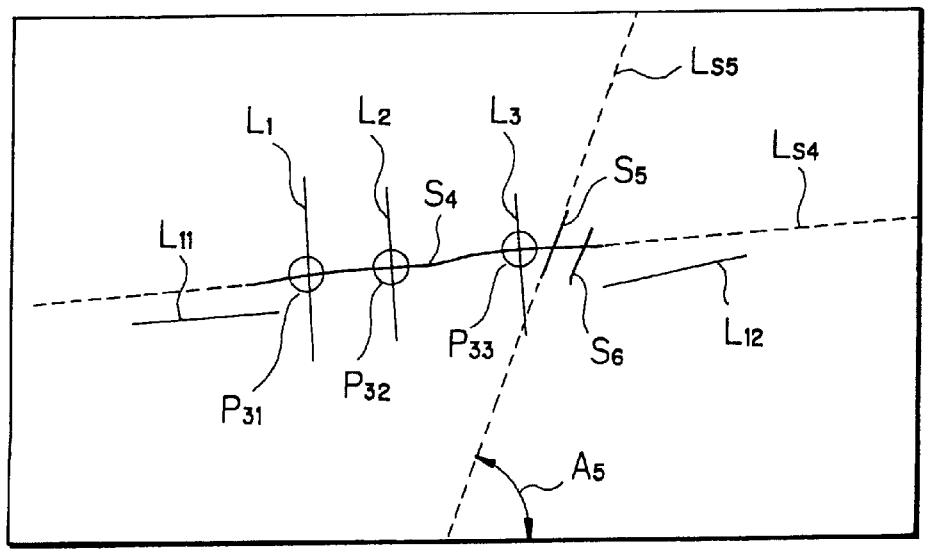
FIG. 39 is a fourth diagram for explaining a gesture to align a plurality of line segments at a predetermined angle.

With the above-described process operation, line segments designated by the gesture $S_4$ and the gesture $S_5$ as the process subject are retrieved. In the embodiment of FIG. 39, three straight lines $L_1$, $L_2$, $L_3$ are registered into the subject line segment list as the subject to be processed.

Figure 43:
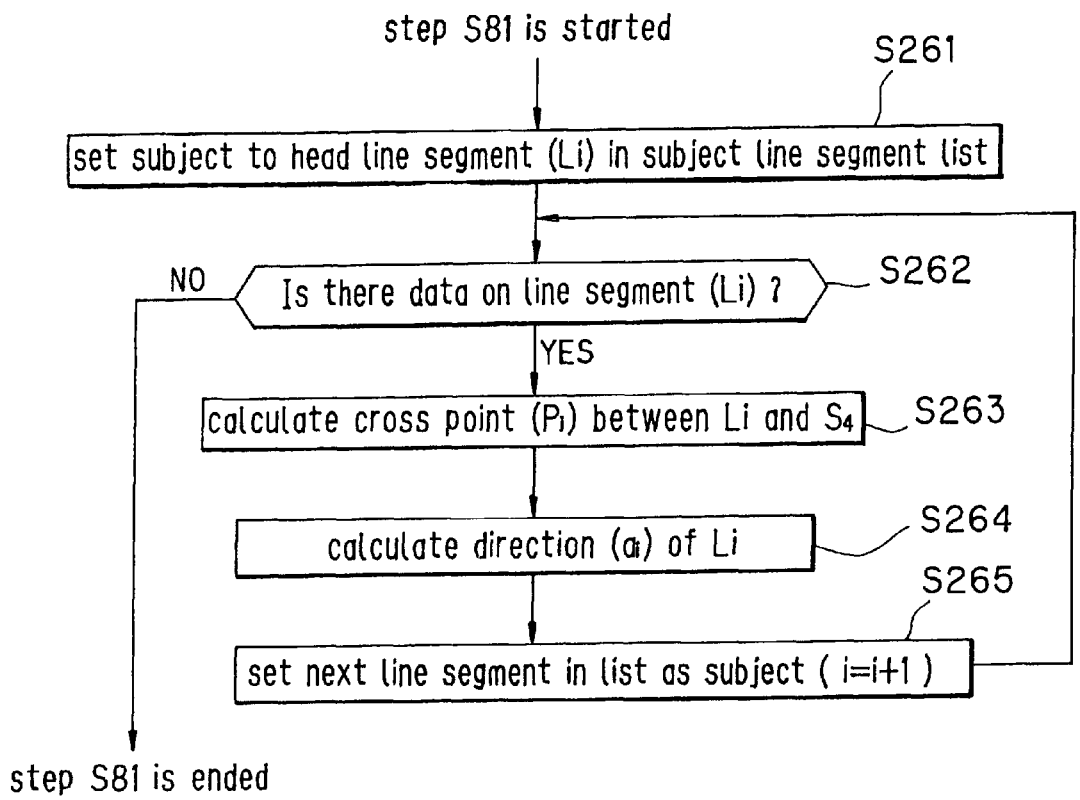
FIG. 43 is a flow chart for describing in detail the process operation from the step S81 of FIG. 8 in case when the embodiment shown in FIG. 36 to FIG. 40 is performed.

As the process operation defined at the step S81 of FIG. 8, a process operation as defined from a step S261 to a step S265 shown in FIG. 43 is carried out. In other words, at a first step S261, the head line segment Li in the subject line segment list is selected as the subject to be processed, and then, a judgement is made at a step S262 as to whether or not the data about this line segment Li is present. When it is so judged at the step S262 whether or not the data about the line segment Li is present, the process operation is advanced to a step S263 at which a cross point Pi between the line segment Li and the gesture $S_4$ is obtained. Then, a direction ai of the line segment Li is obtained at a step S264. Then, the process operation is advanced to a step S265 at which the variable "i" is incremented by 1, and then the process operation is returned to the step S262 at which a similar process operation is repeated.

In case of the above-described embodiments shown in FIG. 38 and FIG. 39, the cross points $P_{31}$, $P_{32}$, $P_{33}$ between the line segments $L_1$, $L_2$, $L_3$ and the gesture $S_4$ are obtained, and also the directions $a_1$, $a_2$, $a_3$ of the respective line segments are obtained with the above-described process operations.

Figure 44:
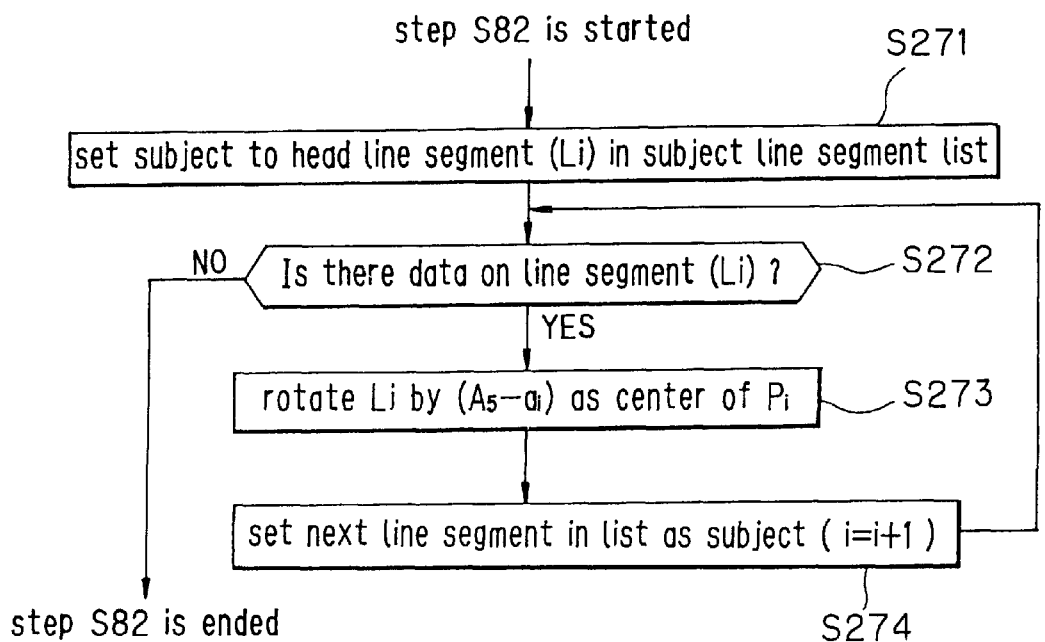
FIG. 44 is a flow chart for describing in detail the process operation from the step S82 of FIG. 8 in case when the embodiment shown in FIG. 36 to FIG. 40 is executed.

Furthermore, the calculation for the processed line segment data at the step S82 of FIG. 8 is carried out as defined from a step S271 to a step S274 of FIG. 44. At a first step 271, the head line segment Li of the processed line segment list is selected as the subject to be processed. At a step S272, a judgement is made as to whether or not there is data about this line segment Li. When it is judged that the data about the line segment Li is present, the process operation is advanced to a step S273 at which this line segment Li is rotated by an angle ($A_5$−ai) around a cross point Pi between the line segment Li and the gesture $S_4$, which is obtained at the step S263 of FIG. 43, as a center. In other words, the line segment Li is rotated in such a manner that the angle becomes $A_5$ (namely becomes in parallel to the gesture $S_5$).

Next, the process operation is advanced to a step S274 at which the variable "i" is incremented by 1. Thereafter, the process operation is returned to the step S272 at which a similar process operation is repeated.

Figure 40:
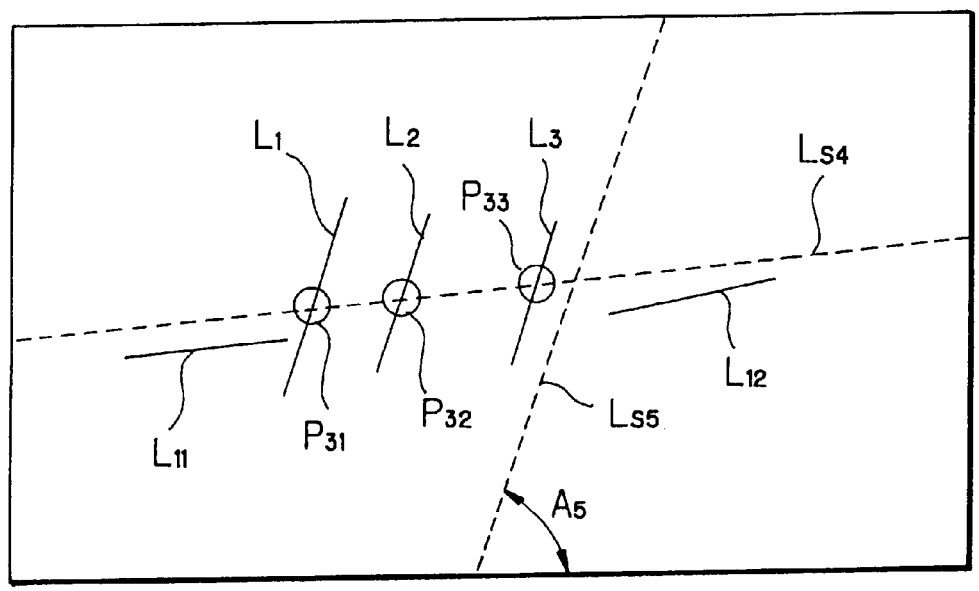
FIG. 40 is a fifth diagram for explaining a gesture to align a plurality of line segments at a predetermined angle.

As illustrated in FIG. 40, the line segments $L_1$, $L_2$, $L_3$ to be processed are rotated around the cross points $P_{31}$, $P_{32}$, $P_{33}$ between these line segments and the gesture $S_5$ in such a manner that these line segments $L_1$, $L_2$, $L_3$ are positioned in parallel to the straight line $L_{s5}$ corresponding to the gesture $S_5$.

It should be noted that although in the above-described embodiment, the straight lines $l_1$ to $L_3$ have been corrected in such a manner that they are equal to the angle $A_5$ corresponding to the straight line $L_{s5}$, they may be equal to either an angle corresponding to an average value between the angle $A_6$ defined by the gesture $S_6$ and the angle $A_5$ defined by the gesture $S_5$, or an angle corresponding to an average value among the angles $a_1$ to $a_3$ of the straight lines $L_1$ to $L_3$.

FIG. 45 to FIG. 48 represent such an embodiment that edge points of both ends of a line segment are aligned on a preselected line. In this case, the process operations as defined in the steps S66, S68, S81, S82 shown in FIG. 7 or FIG. 8 are carried out as illustrated in FIG. 49 to FIG. 52.

Figure 45:
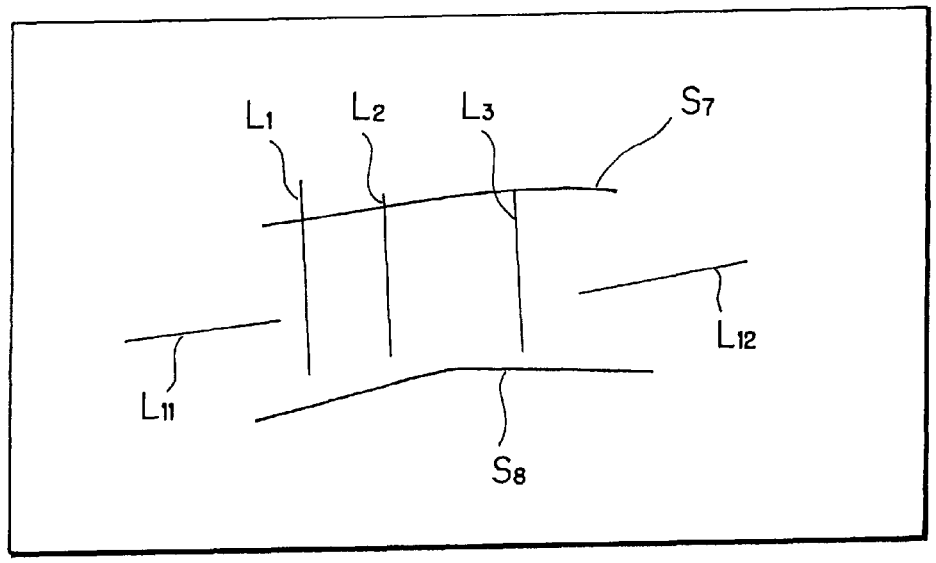
FIG. 45 is a first diagram for descibing a gesture to align both of edge points of plural straight lines on a preselected straight line.

That is, in accordance with the present embodiment, as illustrated in FIG. 45, a gesture is arranged by a gesture $S_7$ which is linearly drawn adjacent to one edge points of the line segments $L_1$, $L_2$, $L_3$ to be processed, and a gesture $S_8$ which is linearly drawn adjacent to the other edge points thereof.

Figure 46:
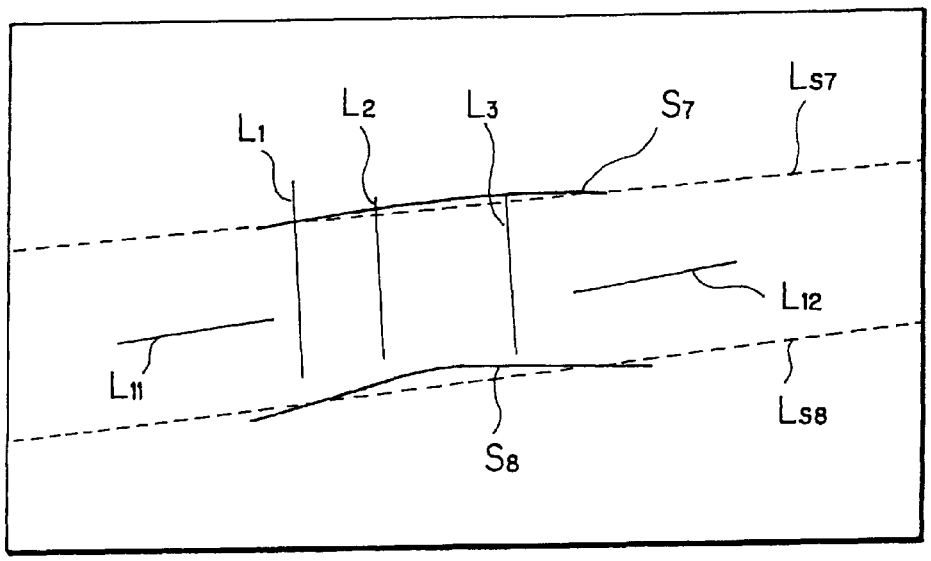
FIG. 46 is a second diagram for describing a gesture to aling both of edge points of plural straight lines on a preselected straight line.
Figure 49:
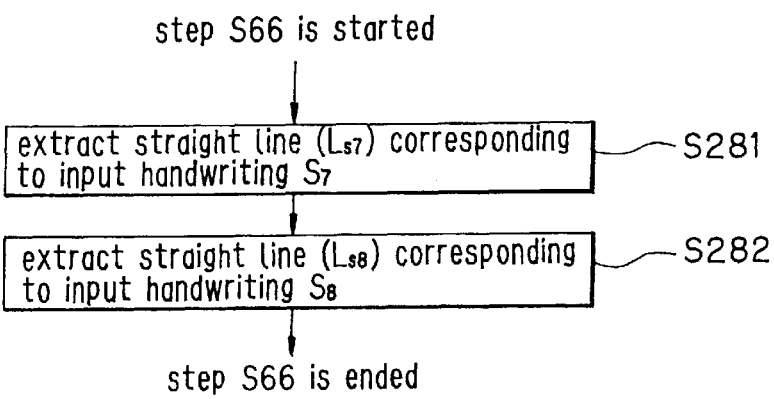
FIG. 49 is a flow chart for explaining in detail the process operation from the step S66 of FIG. 7 in case when the embodiment shown in FIG. 45 to FIG. 48 is performed.

At a step S281 and a step S282 of FIG. 49, straight lines $L_{s7}$ and $L_{s8}$ corresponding to these two gesture $S_7$ and gesture $S_8$ are extracted as shown in FIG. 46.

Figure 50:
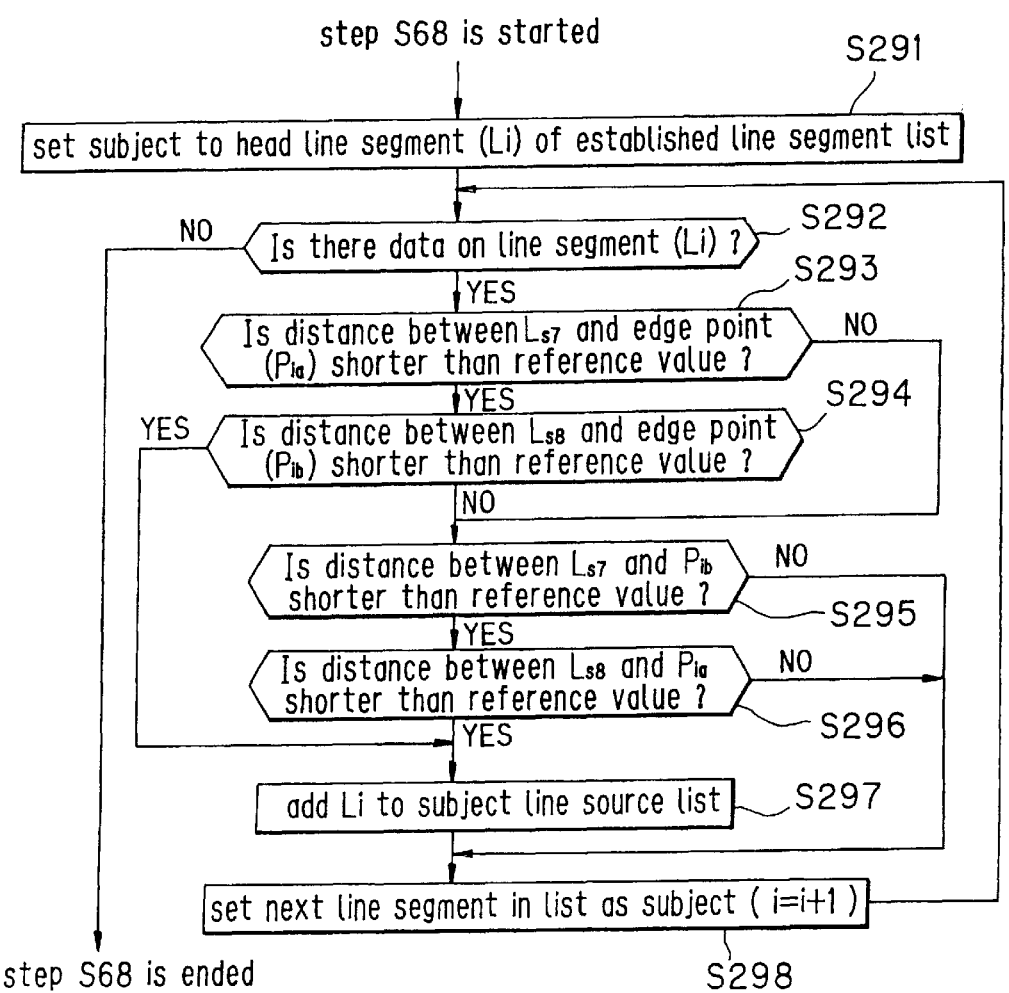
FIG. 50 is a flow chart for explaining in detail the process operation from the step S68 of FIG. 7 in case when the embodiment shown in FIG. 45 to FIG. 48 is performed.

Next, as illustrated in FIG. 50, the process operations as defined from a step S291 to a step S298 are carried out, thereby to retrieve a line segment to be processed. In other words, at a first step S291, a selection is made of the head line segment Li in the processed line segment list as the processing segment. At a step S292, a check is done as to whether or not there is data about this line segment Li. When it is so judged that the data about the line segment Li is present, the process operation is advanced to a step S293 at which another judgement is made as to whether or not a distance between the straight line $L_{s7}$ and one edge point Pia of the straight line Li is smaller than or equal to a preset reference value.

When the distance between the edge point Pia and the straight line $L_{s7}$ is smaller than the reference value, a check is done as to whether or not a distance between the other edge point Pib of this straight line and another straight line $L_{s8}$ is smaller than the reference value. When the distance between the other edge point Pib and the other straight line $L_{s8}$ is smaller than the reference value, since both of the edge points Pia and Pib are eventually positioned adjacent to the straight lines $L_{s7}$ and $L_{s8}$, respectively, the process operation is advanced to a step S297. At this step S297, this line segment Li is registered into the subject line segment list.

At a step S293, when it is so judged that the distance between one edge point Pia and the straight line $L_{s7}$ is smaller than the reference value, otherwise when it is so judged at a step S294 that the distance between the other edge point Pib and the other straight line $L_{s8}$ is below than the reference value, the process operation is advanced to a step S295. At this step S295, a judgement is made as to whether or not a distance between the edge point Pib and the straight line $L_{s7}$ is smaller than the reference value. When it is so judged that this distance is below than the reference value, the process operation is further advanced to a step S296. At this step S296, a check is made as to whether or not a distance between the edge point Pia and the straight line $L_{s8}$ is smaller than the reference value. If this distance is smaller than the reference value, then the process operation is advanced to a step S297 at which this straight line Li is registered into the subject line segment list.

When is is so judged at either the step S295, or the step S296 that the distance between the edge point Pib and the straight line $L_{s7}$, or the edge point Pia and the straight line $L_{s8}$ becomes largely different from the reference value, and further when the straight line Li has been registered into the subject line segment list at the step S297, the operation process is advanced to a step S298 at which the variable "i" is incremented by 1. Then, the process operation is returned to a step S292, at which a similar process operation is repeated.

In other words, when both one edge point Pia and the other edge point Pib are positioned near the straight lines $L_{s7}$ and $L_{s8}$, this line segment is registered as the processing subject into the subject line segment list.

Figure 47:
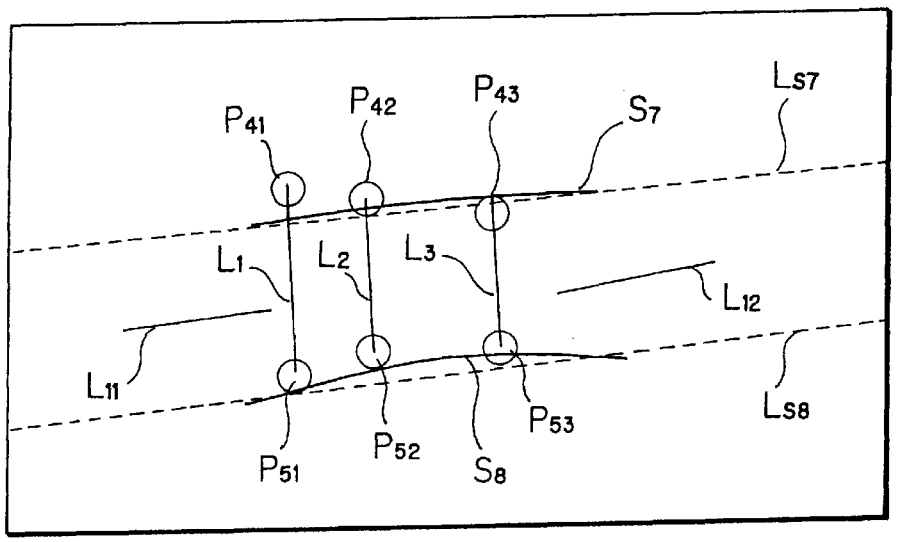
FIG. 47 is a third diagram for describing a gesture to align both of edge points of plural straight lines on a preselected straight line.

In the embodiment of FIG. 47, one edge points $P_{41}$, $P_{42}$, $P_{43}$ of the straight lines $L_1$, $L_2$, $L_3$ are arranged near the straight line $L_{s7}$ respectively. Also, the other edge points $P_{51}$, $P_{52}$, $P_{53}$ are arranged near the other straight line $L^{s8}$, respectively, so that the straight lines $L_1$, $L_2$, $L_3$ are registered as the line segments to be processed.

Figure 51:
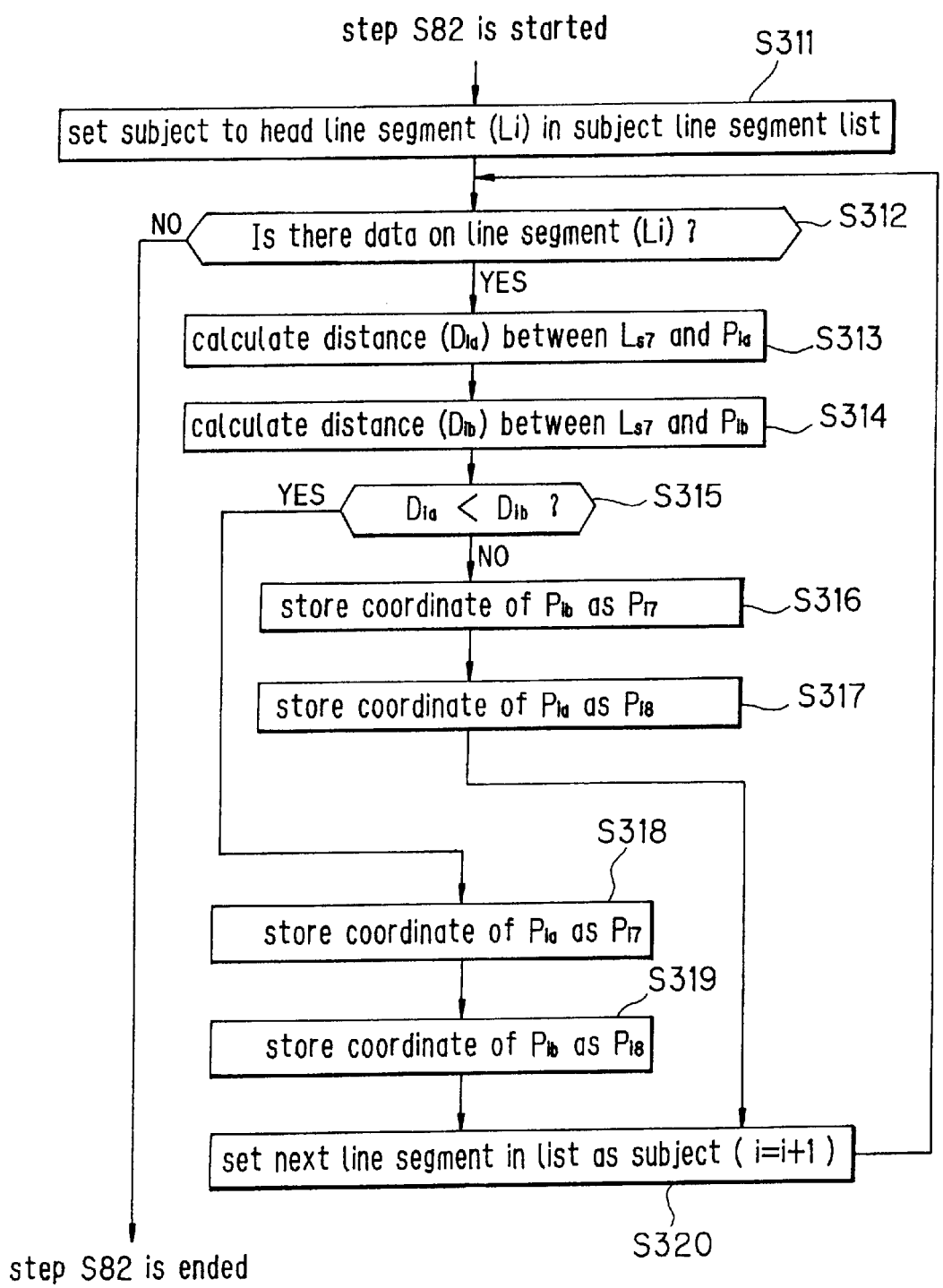
FIG. 51 is a flow chart for explaining in detail the process operation from the step S81 of FIG. 8 in case when the embodiment shown in FIG. 45 to FIG. 48 is performed.

Next, a confirmation is made of a featured amount of a subject line segment as indicated in FIG. 51. That is, at a first step S311, the head line segment Li in the subject line segment list is selected as a subject to be processed. At a step S312, a check is done as to whether or not the data about this line segment Li is present. When it is judged that there is the data on the line segment Li, a distance Dia between the straight line $L_{s7}$ and one edge point Pia of the line segment Li is calculated at a step S313. At a step S314, a distance Dib between the straight line $L_{s7}$ and the other edge point Pib is calculated.

At a step S315, these two distances Dia and Dib calculated in the above-described manner are compared with each other. At a step S316 to a step S319, either the edge point within the edge points Pia and Pib, which is located near the straight line $L_{s7}$, is stored as $P_{i7}$, and the edge point located near the segment line $L_{s8}$ is stored as $P_{i8}$.

Then, the process operation is advanced to a step S320 at which the variable "i" is incremented by 1. Thereafter, the process operation is returned to the step S312 at which a similar process operation is repeated.

As previously described, the coordinate of the both edges of the subject line segment are stored as the point corresponding to the straight line $L_{s7}$, or the straight line $L_{s8}$ located near these edge points.

In the embodiment of FIG. 47, one edge points $P_{41}$ to $P_{43}$ of the straight lines $L_1$ to $L_3$ are stored as the edge point corresponding to the straight line $L_{s7}$, whereas the other edge points $P_{51}$ to $P_{53}$ are stored as the edge point corresponding to the other straight line $L_{s8}$.

Figure 52:
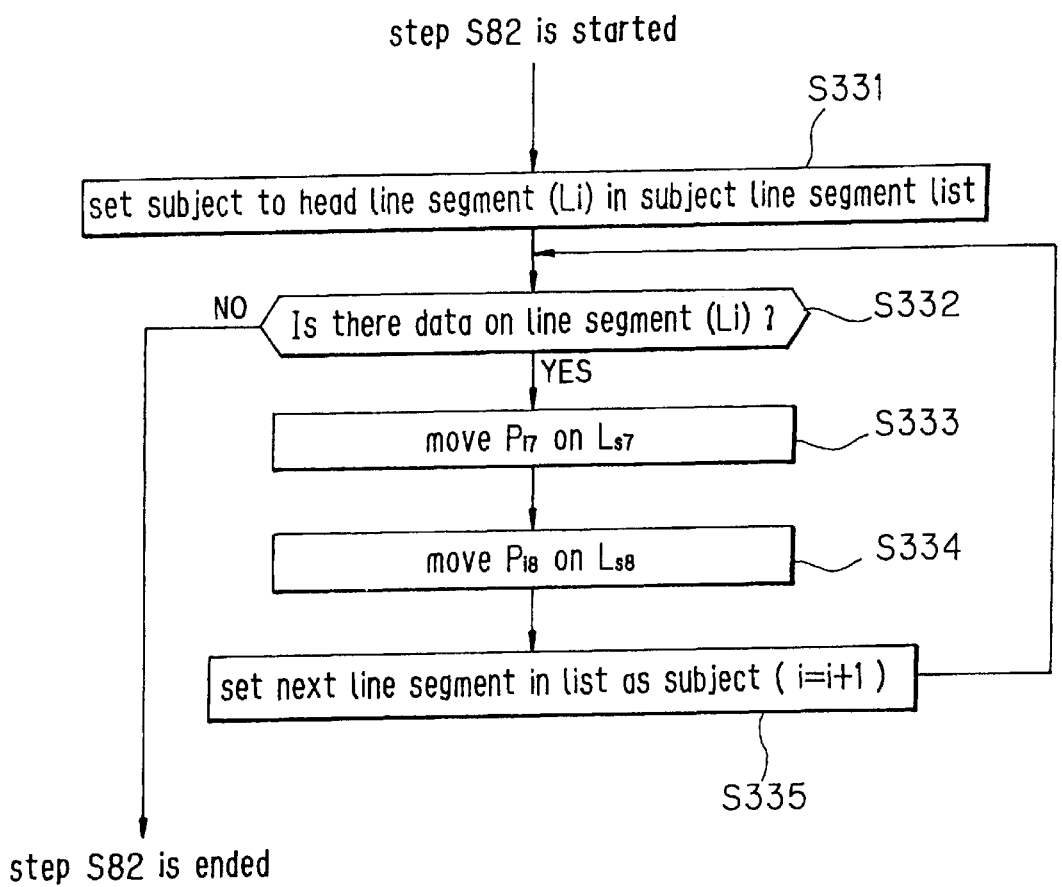
FIG. 52 is a flow chart for explaining in detail the process operation from the step S82 of FIG. 8 in case when the embodiment shown in FIG. 45 to FIG. 48 is performed.

A process operation shown in FIG. 52 is carried out as the calculation for the processed line segment data. That is, at a first step S331, the head line segment Li in the subject line segment list is first selected. At a step S332, a confirmation is made that there is the data about the line segment Li. At the next step S333, the point $P_{i7}$ which has been stored as the edge point corresponding to the straight line $L_{s7}$ is moved on the straight line $P_{s7}$. At a step S334, the point $P_{i8}$ which has been stored as the edge point corresponding to the straight line $L_{s8}$ is moved on the straight line $L_{s8}$. Subsequently, the process operation is advanced to a step S335 at which the variable "i" is incremented by 1. Then, the process operation is returned to the step S332 at which a similar process operation is repeated.

Both of the edge points for the respective line segments Li are transported on the straight lines $L_{s7}$ and $L_{s8}$ in accordance with the above-described manner.

Figure 48:
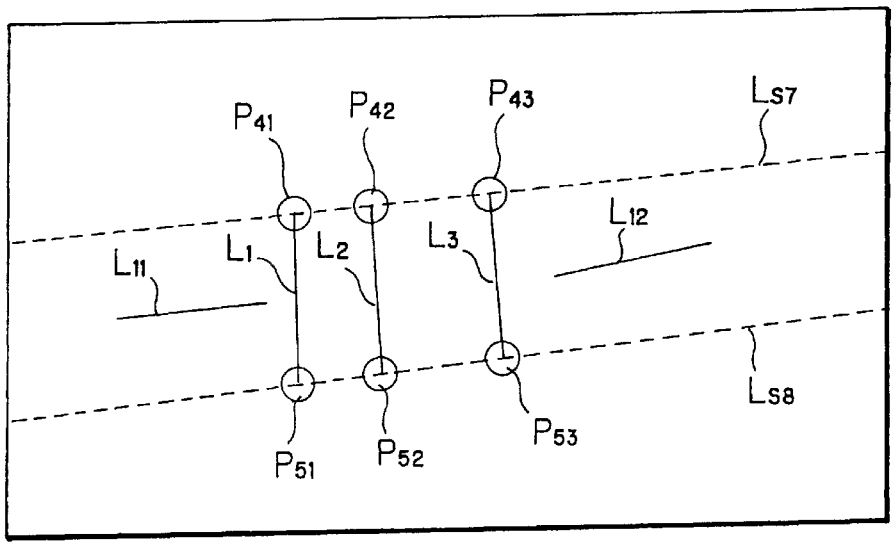
FIG. 48 is a fourth diagram for describing a gesture to align both of edge points of plural straight lines on a preselected straight line.

In the embodiment of FIG. 48, the edge points $P_{41}$ and $P_{51}$, $P_{42}$ and $P_{52}$, $P_{43}$ and $P_{53}$ of both the edges of the respective line segments $L_1$, $L_2$, $L_3$ are moved on either the straight line $L_{s7}$, or the straight line $L_{s8}$, respectively. As a result, the edge points of the respective straight lines are aligned.

In order not to vary the directions of the respective line segments $L_1$ to $L_3$, the respective edge points must be moved on the extended lines of these line segments. When the directions of the line segments are allowed to be changed, the respective edge points may be moved along an arbitrary direction such as the X-axis direction, the Y-axis direction, and the direction intersected with the reference lines $L_{s7}$ and $L_{s8}$ at a right angle.

Figure 53:
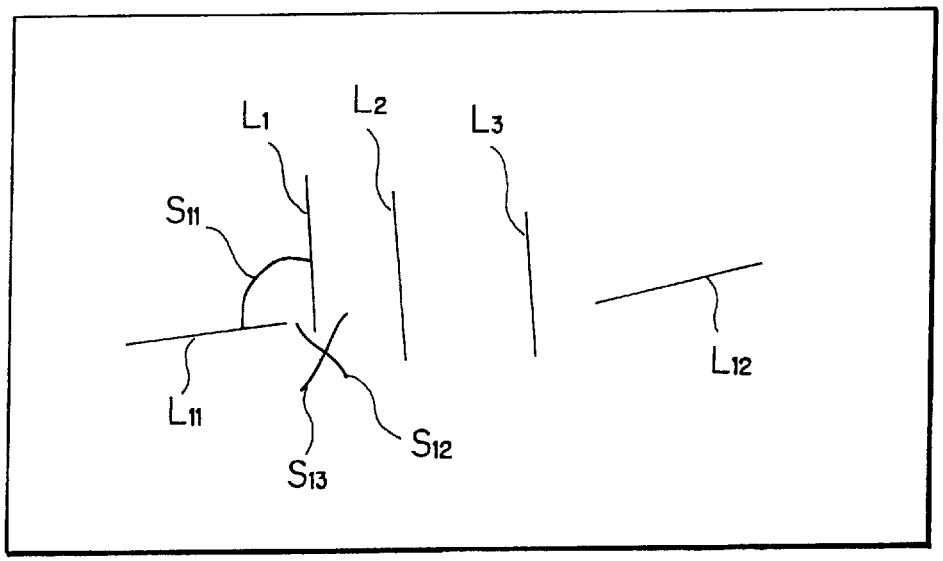
FIG. 53 is a first diagram for describing a gesture to arrange two straight lines at a predetermined angle.

FIG. 53 to FIG. 56 represent such an embodiment that two straight lines intersect with each other at an arbitrary point. In this embodiment, as shown in FIG. 53, an arc-=shaped gesture $S_{11}$ is inputted so as to connect a line segment $L_1$ with a line segment $L_{11}$, which are to be processed. Furthermore, two gestures $S_{12}$ and $S_{13}$ are entered which are mutually crossed, and designate a cross point between these two line segments $L_1$ and $L_{11}$, or extended lines thereof.

Figure 54:
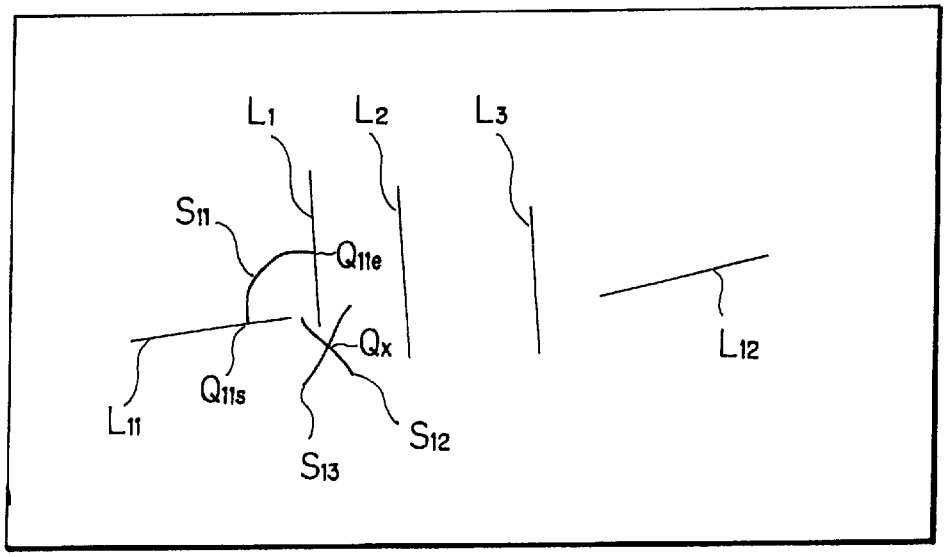
FIG. 54 is a second diagram for describing a gesture to arrange two straight lines at a predetermined angle.
Figure 55:
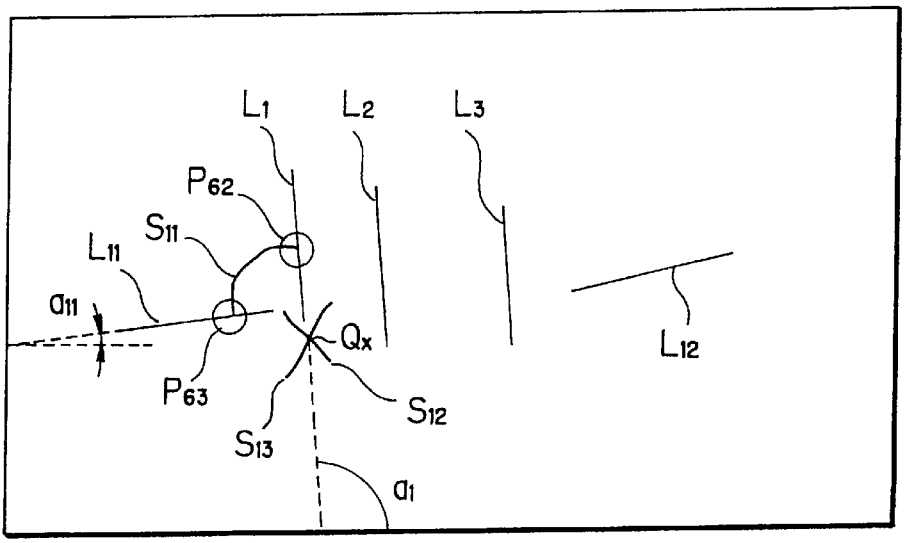
FIG. 55 is a third diagram for describing a gesture to arrange two straight lines at a predetermined angle.
Figure 57:
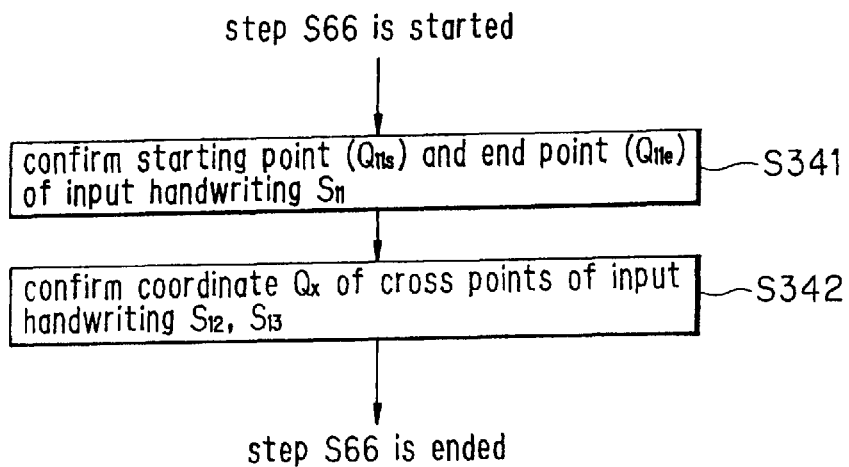
FIG. 57 is a flow chart for describing in detail the process operation from the step S66 of FIG. 7 in case when the embodiment shown in FIG. 53 to FIG. 56 is performed.

At a step S341 of FIG. 57, a starting point $Q_{11s}$ and an end point $Q_{11e}$ of the arc-shaped gesture $S_{11}$ which has been entered in the above manner, are confirmed as illustrated in FIG. 54. At a step S342, a cross point Qx between the gesture $S_{12}$ and the gesture $S_{13}$ is confirmed.

Figure 58:
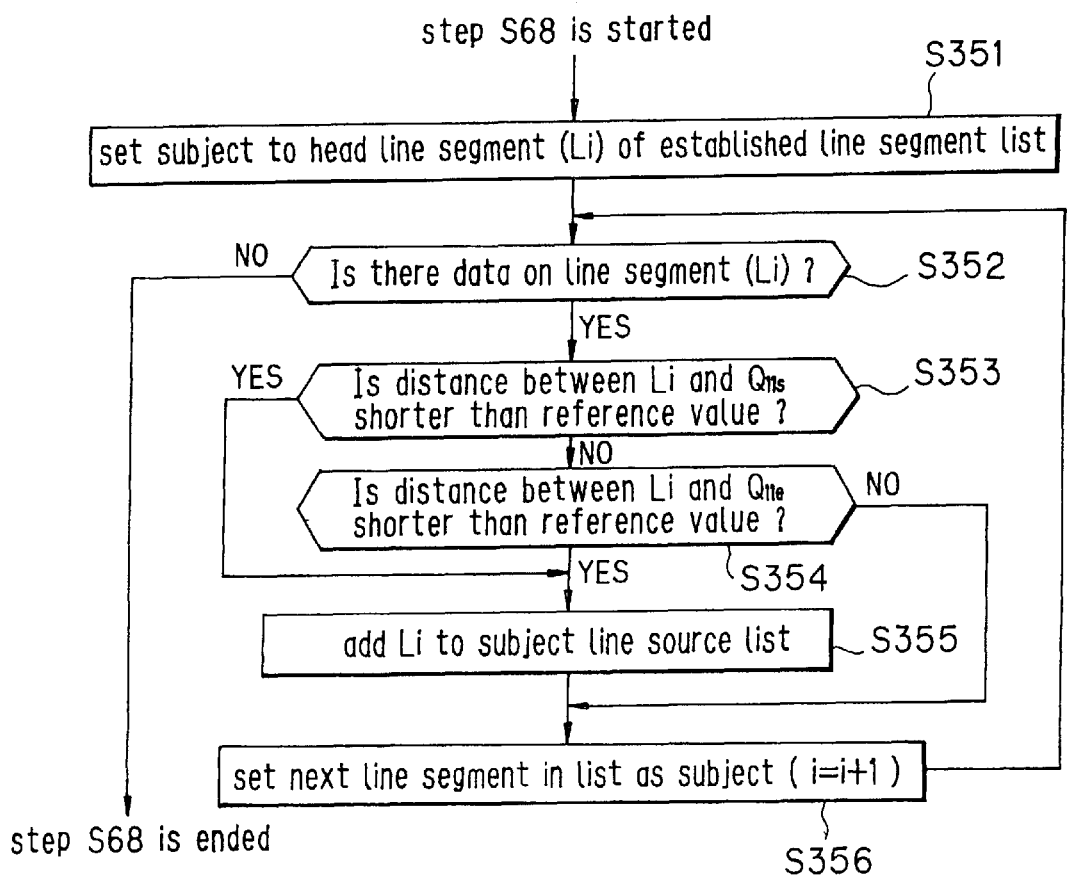
FIG. 58 is a flow chart for describing in detail the process operation from the step S68 of FIG. 7 in case when the embodiment shown in FIG. 53 to FIG. 56 is executed.

Next, at a step S351 to a step S356 of FIG. 58, the retrieving process operation of the subject line segment as defined at the step S68 of FIG. 7 is performed. In other words, at the first step S351, the head line segment Li of the established line segment list is to be processed. At a step S352, a check is done as t whether or not there is the data about the line segment Li. When it is so judged that the data about the line segment Li is present, the process operation is advanced to a step S353 at which another check is made as to whether or not a distance between the line segment Li and the starting point $Q_{11s}$ of the gesture $S_{11}$ is smaller than the reference value.

When the distance is smaller than the reference value, the process operation is advanced to a step S355 at which this line segment Li is registered into the subject line segment list. When the distance between the line segment Li and the starting point $Q_{11s}$ is smaller than the reference value, the process operation is advanced to a step S354 at which a judgement is made as to whether or not a distance between this line segment Li and the end point $Q_{11e}$ is smaller than the reference value. When the distance from this end point $Q_{11e}$ becomes smaller than the reference value, the process operation is advanced to a step S355 at which this line segment Li is registered into the subject line segment list.

After the line segment has been completely registered into the subject line segment list as described above, or when it is so judged at the step S353 and the step S354 that the respective distances between the starting point $Q_{11s}$ of the gesture $S_{11}$ and the line segment Li, and the end point $Q_{11e}$ thereof and this line segment Li are greater than the reference value, the process operation is advanced to a step S356. At this step, the variable "i" is incremented by 1. Thereafter, the process operation is returned to a step S352 at which a similar process operation is repeated.

As indicated in FIG. 54, the line segments $L_{11}$ and $L_1$ which are arranged near the starting point $Q_{11s}$ of the gesture $S_{11}$ and the end point $Q_{11e}$ are registered into the subject line segment list.

Figure 59:
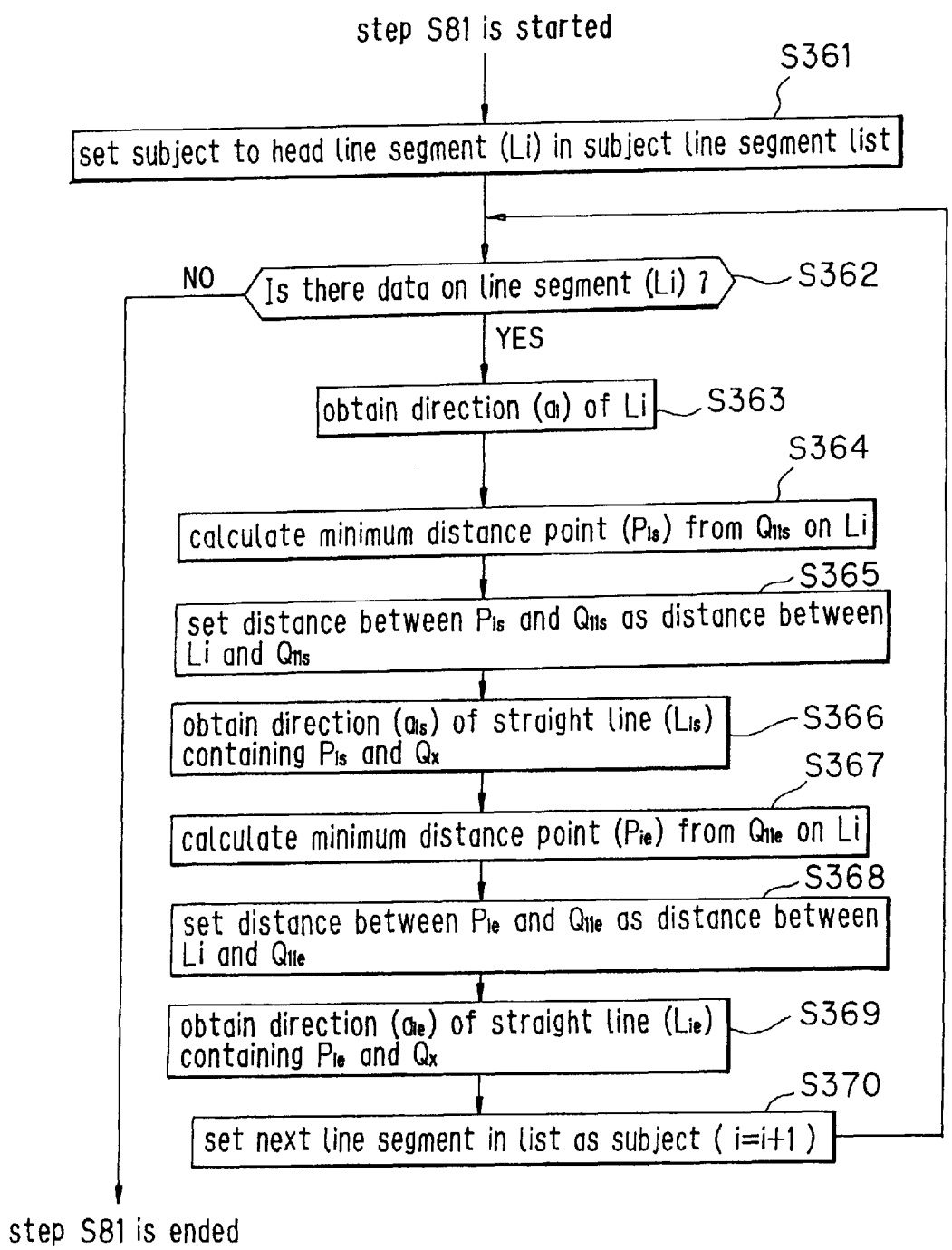
FIG. 59 is a flow chart for describing in detail the process operation from the step S84 of FIG. 8 in case when the embodiment shown in FIG. 53 to FIG. 56 is performed.

At a step S361 to a step S370 shown in FIG. 59, the process operation for confirming the featured amount of the subject line segment as defined at a step S81 of FIG. 8 is carried out. At a first step S361, the head line segment Li of the subject line segment list is to be processed. Then, at a step S362, a judgement is made as to whether or not the data on the line segment Li is present. When it is so judged that there is the data on the line segment Li, the process operation is advanced to a step S363 at which a direction (angle) "ai" of this line segment Li is obtained.

Next, the process operation is advanced to a step S364 at which a point Pis whose distance from the starting point $Q_{11s}$ of the gesture $S_{11}$ becomes minimum and which is located on the line segment Li, is calculated. Furthermore, at a step S365, a distance between this point Pis and the starting point $Q_{11s}$ is set as a distance Dsi between this line segment Li and the starting point $Q_{11s}$ of the gesture $S_{11}$. Next, the process operation is advanced to a step S366 at which a direction $a_{is}$ of the straight line Lis containing the point Pis and a cross point Qx between the gestures $S_{12}$ and $S_{13}$ is obtained.

Similarly, at a step S367, a point whose distance from the end point $Q_{11e}$ of the gesture $S_{11}$ becomes minimum, and which is located on the line segment Li, is set as a "Pie". Then, at a step S368, a distance between this point Pie and the end point $Q_{11e}$ of the gesture $S_{11}$ is set as a distance Dei between the line segment Li and the end point $Q_{11e}$. Furthermore, at a step S369, a direction $a_{ie}$ of the straight line Lie containing the point Pie and the cross point Qx between the gesture $S_{12}$ and $S_{13}$ is obtained.

After the variable "i" is incremented by 1 at a step S370, the process operation is returned to a step S362 at which a similar process operation is repeated.

Figure 56:
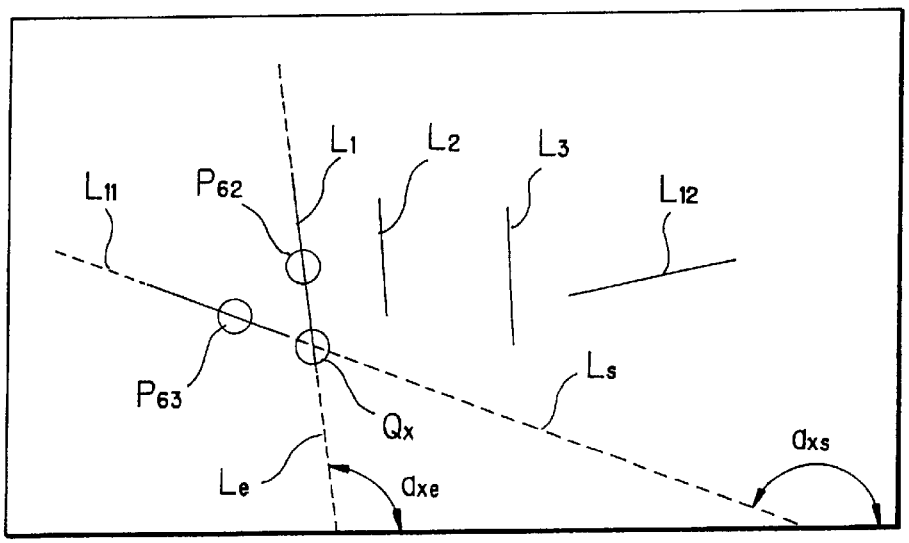
FIG. 56 is a fourth diagram for describing a gesture to arrange two straight lines at a predetermined angle.

As described above, as shown in FIG. 55, both the direction all of the line segment $L_{11}$, and the direction $a_1$ of the line segment $L_1$ are obtained. It is assumed that such a point is $P_{63}$ which is located on the line segment $L_{11}$ positioned at the nearest position from the starting point $Q_{11s}$ of the gesture $S_{11}$, and a point is $P_{62}$ which is present on the line $L_1$ and is located at the nearest position from the end point $Q_{11e}$ of the gesture $S_{11}$. Also, as shown in FIG. 56, a direction $a_{xs}$ of the straight line Ls which passes through the point $P_{63}$ on the straight line $L_1$ and the cross point Qx, is obtained. Further, a direction $a_{xe}$ of the straight line Le passing through the point $P_{62}$ on the straight line $L_1$ and the cross point Qx is obtained.

Moreover, the process operation for calculating the processed line segment data as defined at the step S82 of FIG.

Figure 60:
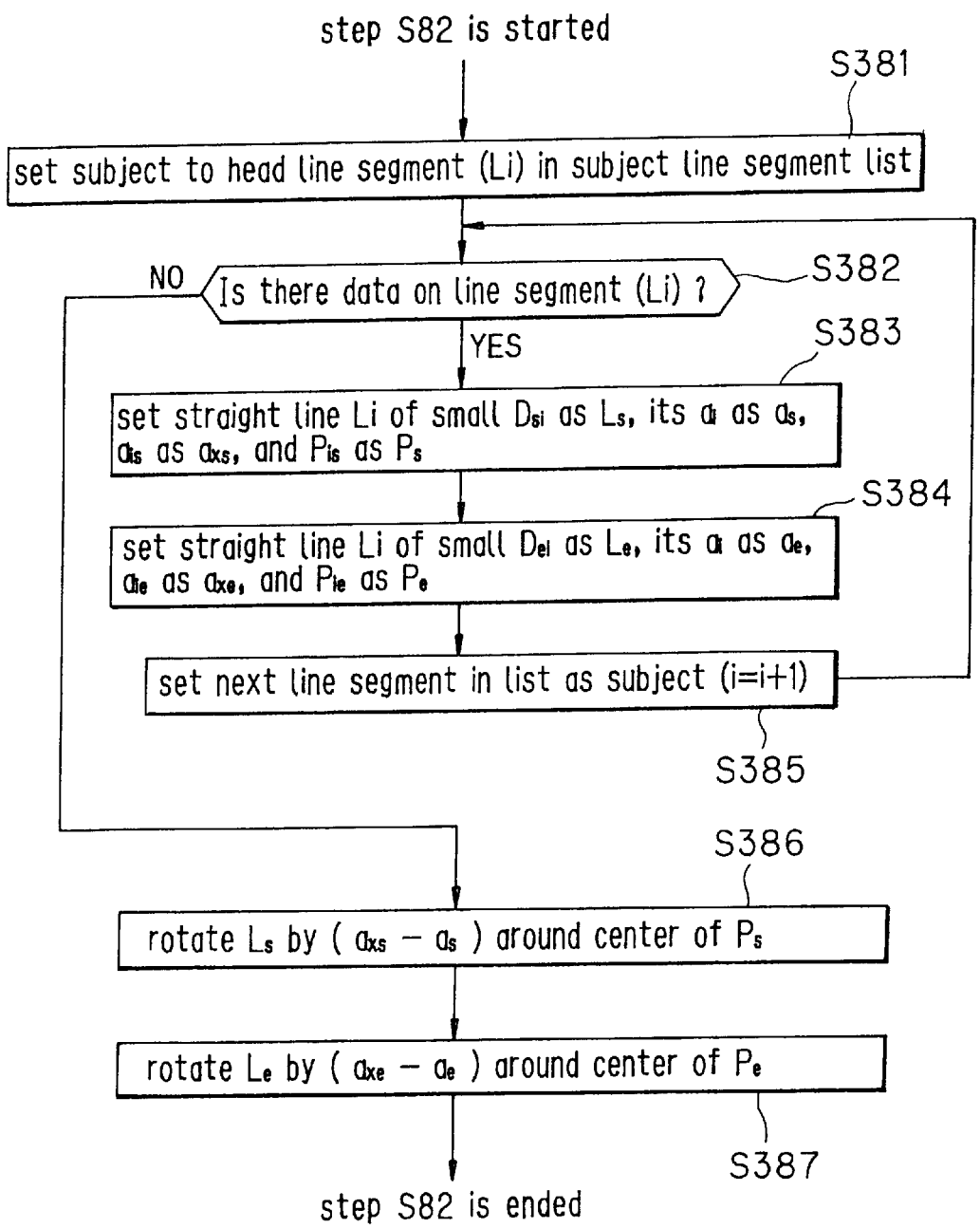
FIG. 60 is a flow chart for describing in detail the procss operation from the step S82 of FIG. 8 in case when the embodiment shown in FIG. 53 to FIG. 56 is executed.
Figure 61:
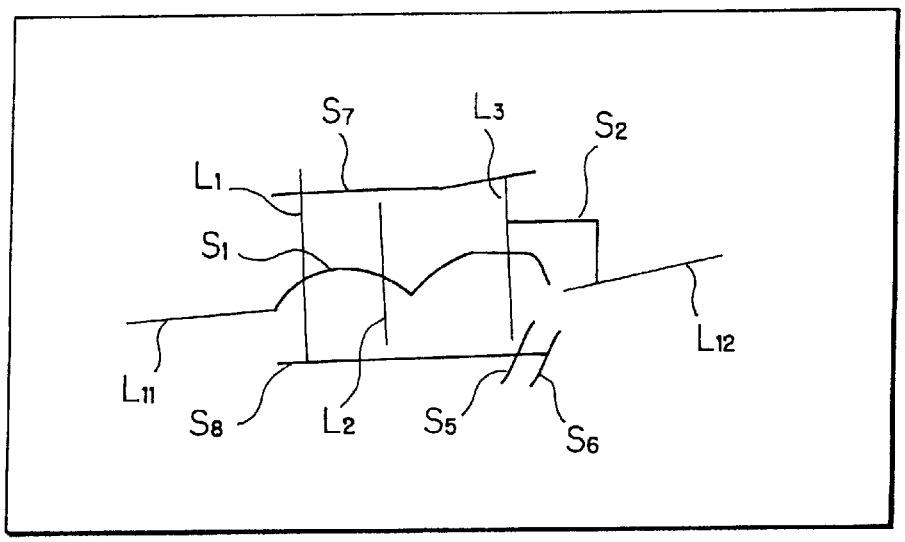
FIG. 61 is a first embodiment for explaining a gesture to wholly process a plurality of gestures.

8 is executed by performing process operations defined from a step S381 to a step S387 shown in FIG. 60. That is, at a step S381, the head line segment Li in the subject line segment list is selected as a first processing subject. At a step S382, a judgement is made as to whether or not there is the data about the line segment Li.

When it is so judged that the data on the line segment Li is present, the process operation is advanced to a step S383. At this step, a comparison is made for the distance Dsi between the line segment Li and the starting point $Q_{11s}$ of the gesture $S_{11}$, with the distance $D_{si-1}$ between this starting point $Q_{11s}$ and the line segment $L_{i-1}$, positioned just before the line segment Li. Then, the straight line having the shorter distance is set as Ls, the direction ai therefore is set as As, and the point Pis located at the nearest position from the starting point $Q_{11s}$ of the gesture $S_{11}$ is set as Ps. Furthermore, the direction ais of the straight line Lis containing this point Ps and the cross point Qx.

Similarly, at a step S384, such a straight line whose distance Dei between the line segment Li and the end point $Q_{11e}$ of the gesture $S_{11}$ is minimum is set as Le. Also in this case, ai of this straight line is set as ae, Pie is set as Pe, and aie is set as $a_{xe}$. Thereafter, the process operation is advanced to a step S385 at which the variable "i" is incremented by 1. Subsequently, the process operation is returned to a step S382 at which a similar process operation is repeated.

In other words, the process operation as defined at this step S382 to the step S385, the line segments located at the nearest positions from both of the starting point $Q_{11s}$ and the ending point $Q_{11e}$ of the gesture $S_{11}$ are selected as either the line segment Ls, or the line segment Le.

Subsequently, the process operation is advanced to a step S386 at which the straight line Ls located at the nearest position from the starting point $Q_{11s}$ of the gesture $S_{11}$ is rotated by an angle $(a_{xs}-a_s)$ around the point Ps as a center which is located at the nearest position from the starting point $Q_{11s}$ and is located on this straight line Ls. That is, the straight line Ls is rotated in such a manner that either this line itself, or the extended line thereof passes through the cross point Qx. Furthermore, at a step S387, the straight line Le located at the nearest position from the ending point $Q_{11e}$ of the gesture $S_{11}$ is rotated by an angle $(a_{xe}-a_e)$ around the point Pe as a center, which is located at the nearest position from the end point $Q_{11e}$. That is, the straight line Le is rotated in such a manner that either this straight line or the extended line thereof passes through the cross point Qx.

In FIG. 56, there is shown such that the straight line $L_{11}$ is rotated around the point $P_{63}$ as a center, and is moved in such a manner that the extended line passes through the cross point Qx. Similarly, the straight line $L_1$ is rotated around the point $P_{62}$ as a center, and is moved and represented in such a way that this straight line $L_1$ passes through the cross point Qx.

FIG. 61 to FIG. 65 represent a further embodiment. In this embodiment, a gesture $S_1$ for arranging the above-described line segments in an equiinterval; a gesture $S_2$ for vertically setting two straight lines; gestures $S_7$ and $S_8$ used to align both end points of a line segment; and gestures $S_8$, $S_5$, $S_6$ used to arrange the line segments at a predetermined angle in a parallel form are combined with each other and are entered.

Figure 37:
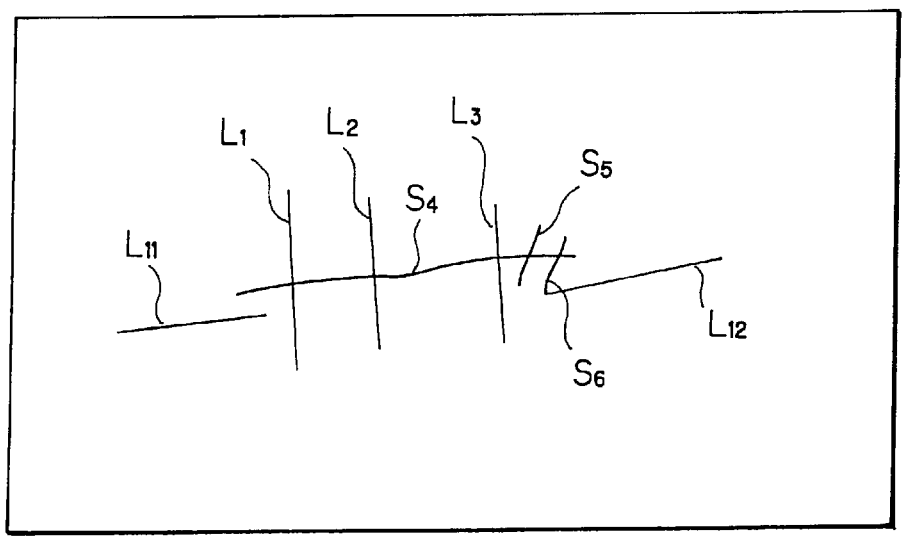
FIG. 37 is a second diagram for explaining a gesture to align a plurality of line segments at a predetermined angle.

In this embodiment, the gesture $S_8$ is inputted together with the gesture $S_7$ as a gesture for aligning both of the edge points, but also is employed in combination with the gestures $S_5$ and $S_6$ as a gesture for aligning the line segments at a preselected angle (namely, gesture $S_4$ shown in FIG. 37).

As described above, a single gesture may be used as the constructive elements for the plural gestures.

Figure 62:
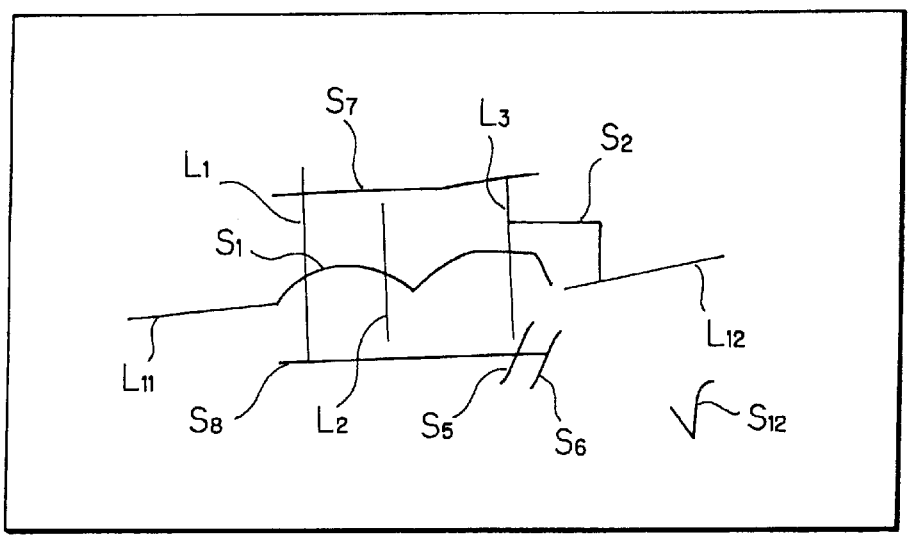
FIG. 62 is a second embodiment for explaining a gesture to wholly process a plurality of gestures.

In this embodiment, the gesture $S_{12}$ shown in FIG. 62 corresponds to such a gesture that when the above-described respective gestures are inputted, this gesture is not executed but reserved, and when these entered gesture are finally and wholly executed, the gesture $S_{12}$ is entered.

Figure 66:
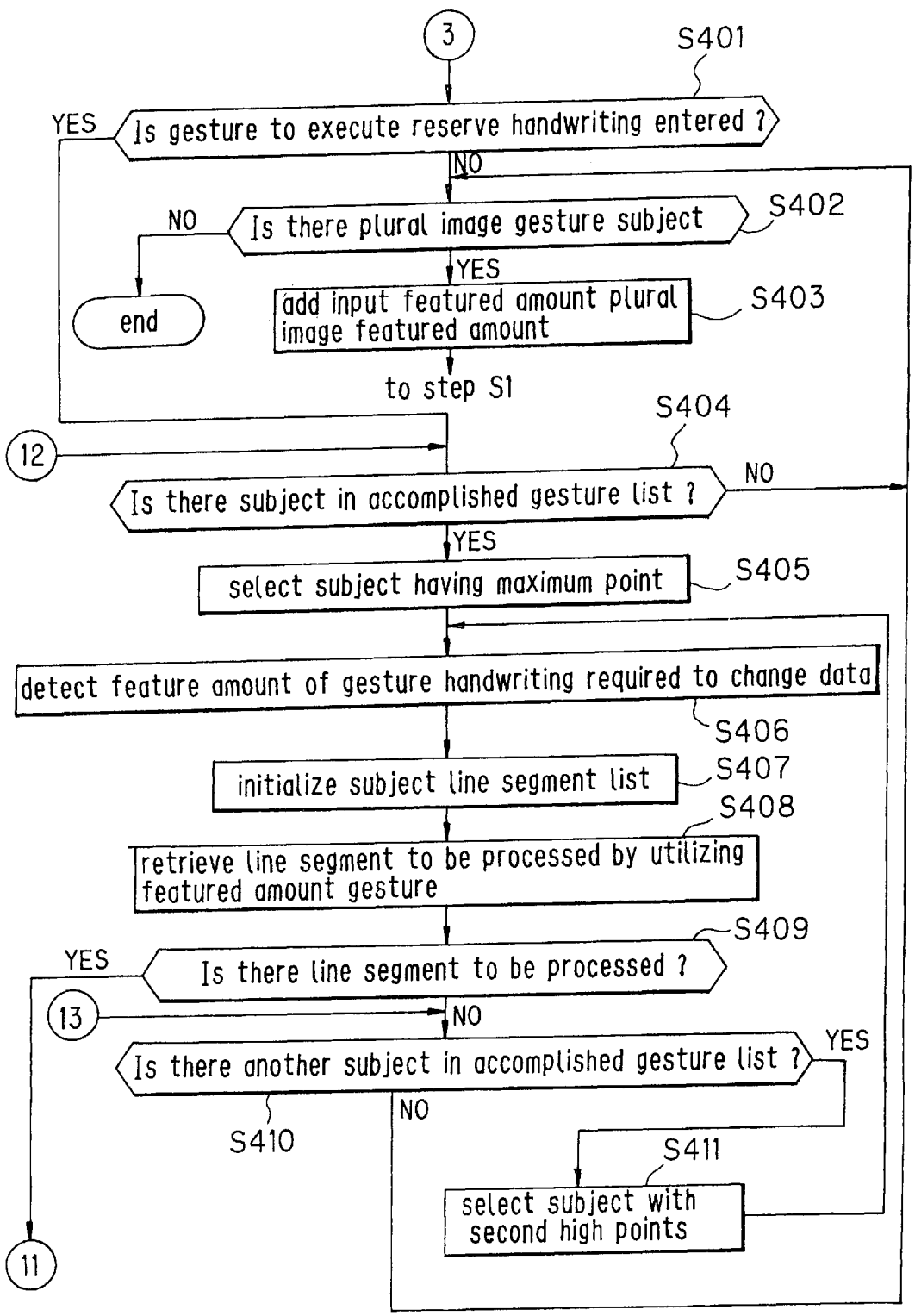
FIG. 66 is a flow chart of a process operation executed subsequent to the flow chart shown in FIG. 4 to FIG. 6 in case that when the embodiment indicated in FIG. 61 to FIG. 64 is performed.
Figure 67:
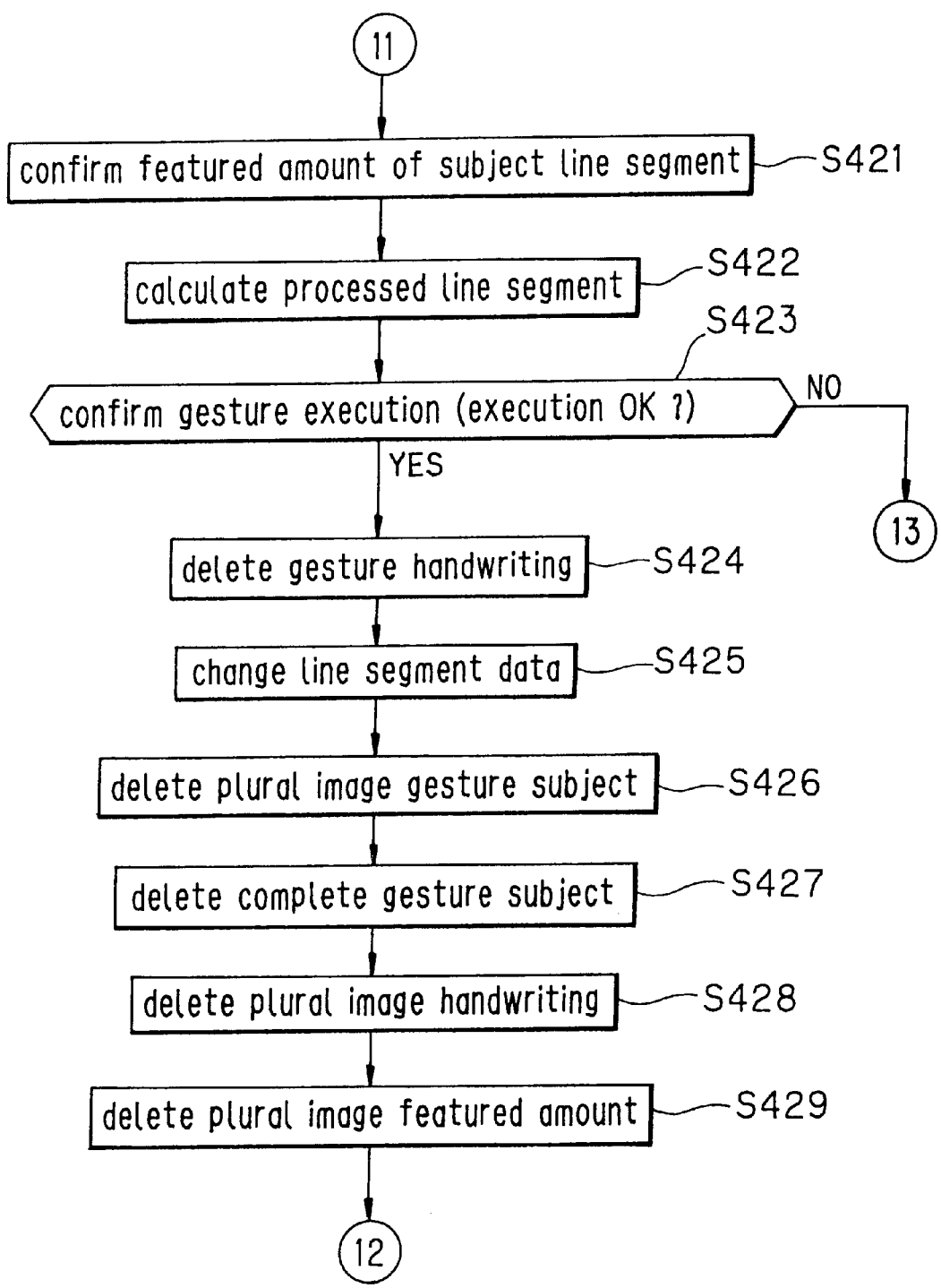
FIG. 67 is a flow chart subsequent to FIG. 66.

When such a process operation is executed, the process operations as defined after the step S61 of FIG. 7 among the process operations indicated from FIG. 4 to FIG. 8, will be modified as illustrated in FIG. 66 and FIG. 67.

In other words, subsequent to the process operation defined at either the step S41, or the step S48 shown in FIG. 6, the process operation is advanced to a step S401 of FIG. 66, at which a check is made as to whether or not the gesture $S_{12}$ used to execute the reserve handwriting as shown in FIG. 62 is inputted. When it is so judged that the gesture $S_{12}$ for executing the reserve handwriting is not entered, the process operation is advanced to a step S402 at which a judgement is made as to whether or not there exists a plural image gesture subject. Then, when it is so judged that there is such a plural image gesture subject, the process operation is further advanced to a step S403. At this step, the featured amount of the entered gesture is added and stored into the plural image featured handwriting amount memory unit 55, and then the process operation is returned to the step $S_1$ of FIG. 4. Then, a process operation is carried out for another image of the plural image gesture which will then be inputted.

When it is so judged at the step S402 that there is no plural image gesture subject, the process operation is accomplished.

That is to say, the above-explained process operation is similar to the process operation defined in the case of FIG. 7.

On the other hand, when it is so judged at the step S401 that the gesture $S_{12}$ to execute the reserve handwriting is inputted, the process operation is advanced to a step S404. At this step, a judgement is made as to whether or not the gesture subject is present in the list of the established gesture subject list memory unit 62. Then, when no gesture subject is present, the process operation is returned to the step S402 at which the subsequent process operation is similarly performed.

When it is so judged at the step S404 that there is the gesture subject in the established gesture subject list, the process operation is advanced to a step S405 at which a selection is made of such a gesture which owns the maximum point from these gesture subjects. Then, at a step S406, a featured amount of handwriting of the gesture is detected. As previously stated, this featured amount is required to change the display condition of the line segment under representation. Then, the process operation is advanced to a step S404 at which the subject line segment list is initialized.

Next, the process operation is advanced to a step S408 at which a retrieve operations carried out for the line segment to be processed by the gesture detected at the step S406 by using the featured amount of this detected gesture. At a step 409, a check is done whether or not there is a line segment to be processed. When it is so judged that no line segment to be processed is present, the process operation is advanced to a step S410 at which a check is done whether or not another gesture subject is present in the established gesture subject list. When there is another gesture subject, the process operation is advanced to a step S411 at which a selection is made of another gesture subject having the second highest point. The process operation is returned to the step S406 at which a similar process operation is executed by detecting a featured amount of this selected subject.

On one hand, when it is so judged at the step S410 that there is no other gesture subject in the established gesture subject list, the process operation is returned to the step S402 at which a judgement is done as to whether or not there is a plural image gesture subject. In correspondence with this judgement result, a similar process operation to that of the above-explained case is executed.

On the other hand, when it is so judged at the step S409 that there is such a line segment to be processed by the gesture command, the process operation is advanced to a step S421 at which a featured amount of this subject line segment is detected. Then, the process operation is advanced to a step S422 at which a calculation for the processed line segment data is performed. Subsequently, the process operation is advanced to a step S423 at which a confirmation is made by a user as to whether or not the gesture is executed. When the user does not allow the gesture execution, the process operation is returned to a step S410 at which such a process operation for checking whether or not another gesture subject is present in the established gesture subject list is performed.

If the user allows to execute the gesture at the step S423, then the process operation is advanced to a step S424 at which the gesture handwriting is erased. At a step S425, the data about the line segment is changed into the data about the processed line segment obtained at the step S422. As a consequence, the display conditions of the line segments are wholly changed.

Next, the process operation is advanced to a step S426 to a step S429, at which the plural image gesture subject, the established gesture subject, the plural image handwriting, and the plural image featured amount are detected. Then, the process operation is returned to the step S404 at which a similar process operation is repeated.

Figure 63:
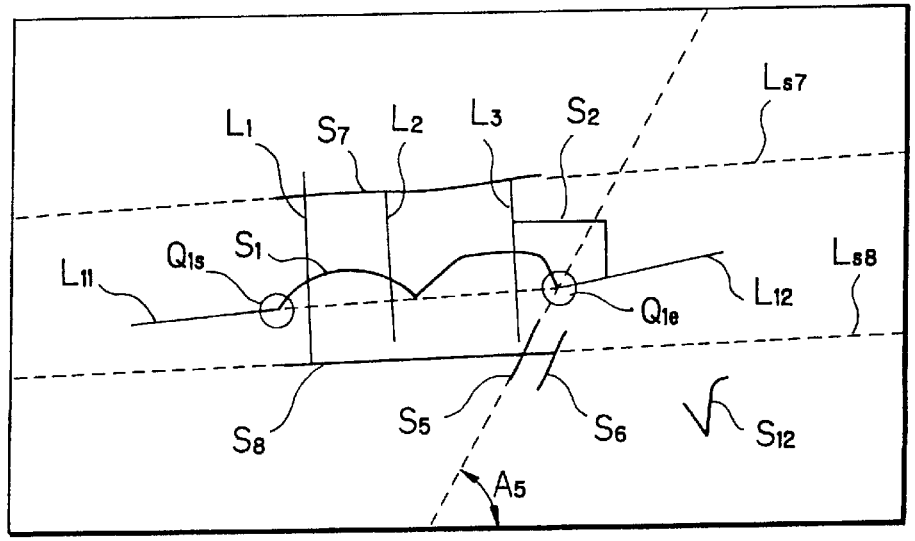
FIG. 63 is a third embodiment for explaining a gesture to wholly process a plurality of gestures.
Figure 64:
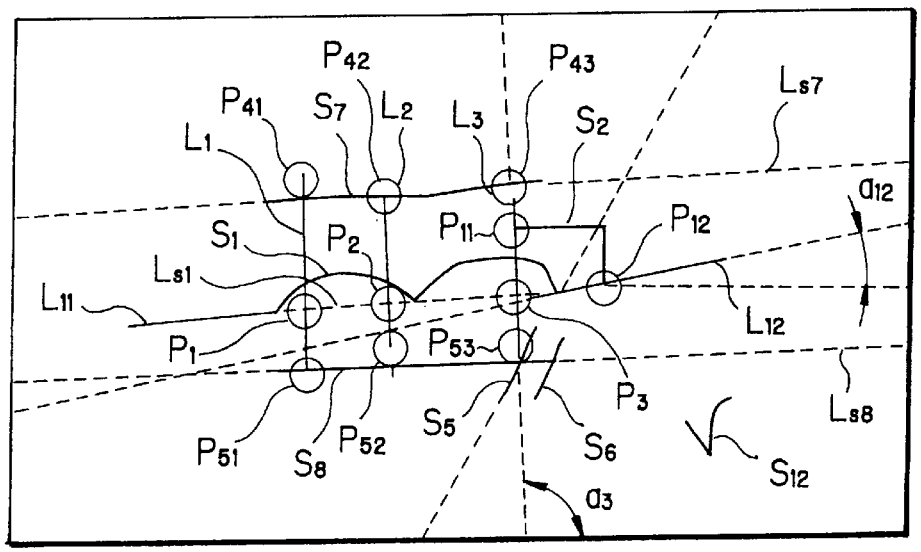
FIG. 64 is a fourth embodiment for explaining a gesture to wholly process a plurality of gestures.
Figure 65:
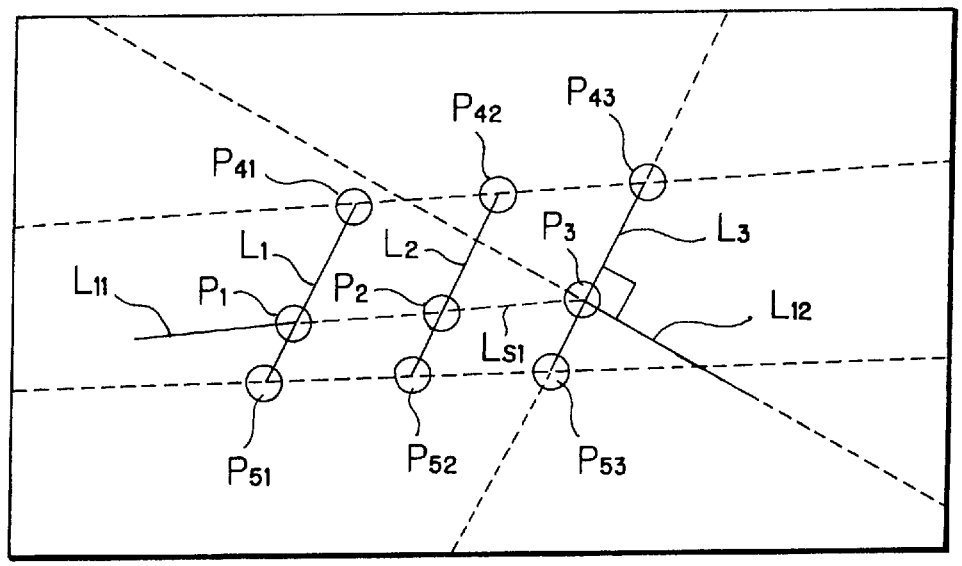
FIG. 65 is a fifth embodiment for explaining a gesture to wholly process a plurality of gestures.

When the above-explained process operations are carried out, as illustrated in FIG. 63 to FIG. 65, the process operations corresponding to the inputted gestures $S_1$, $S_2$, $S_5$, $S_6$, $S_7$, $S_8$ are wholly executed.

That is, at the step 401 of FIG. 6, until the gesture $S_{12}$ to execute the reserved handwriting is inputted, the process operations defined after the step S404 are not carried out. Namely, no process operation to carry out the previously entered gesture is carried out. As a result, the previously entered gesture is reserved as the reserved handwriting by performing the process operations defined before the step S401. Then, after the gesture $S_{12}$ has been entered, these gestures of the reserved handwriting are wholly executed.

FIG. 68 to FIG. 72 schematically represent a further embodiment. In this embodiment, a featured amount (parameter) may be more firmly designated by containing a character as a shape confirmation of inputted handwriting. To execute such a process operation, both of the process operation for detecting the featured amount of the gesture handwriting defined at the step S66, and the process operation for calculating the processed line segment data defined at the step S82 among the above-described process operations shown in FIG. 4 to FIG. 8 are performed as represented in FIG. 73, or FIG. 74, respectively.

It should be noted that the process operations defined at the step S68 and the step S81 are similarly carried out as shown in FIG. 24 or FIG. 25.

Figure 73:
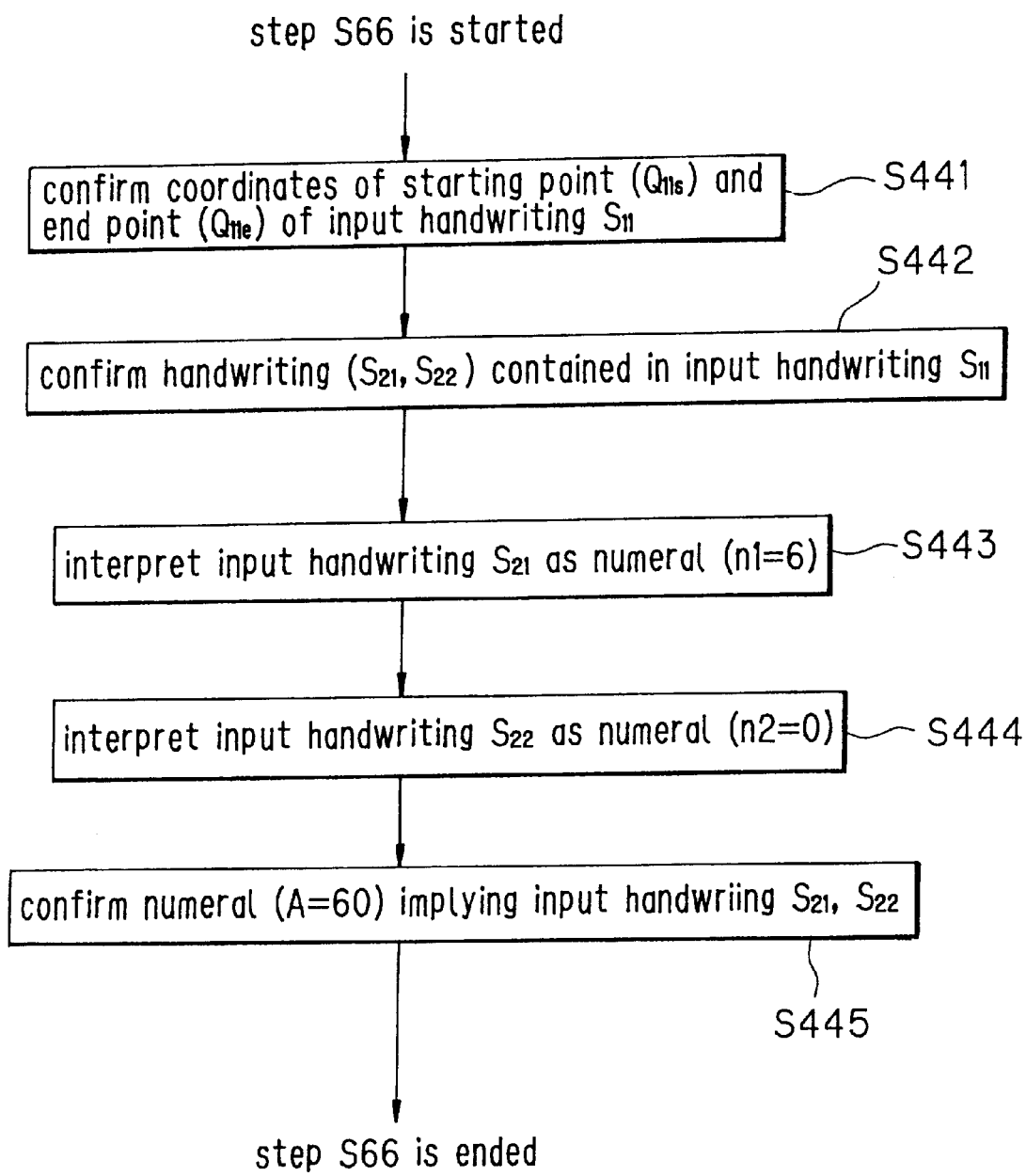
FIG. 73 is a flow chart for describing in detail the process operation from the step S66 of FIG. 7 in case when the embodiment shown in FIG. 68 to FIG. 72 is performed.
Figure 74:
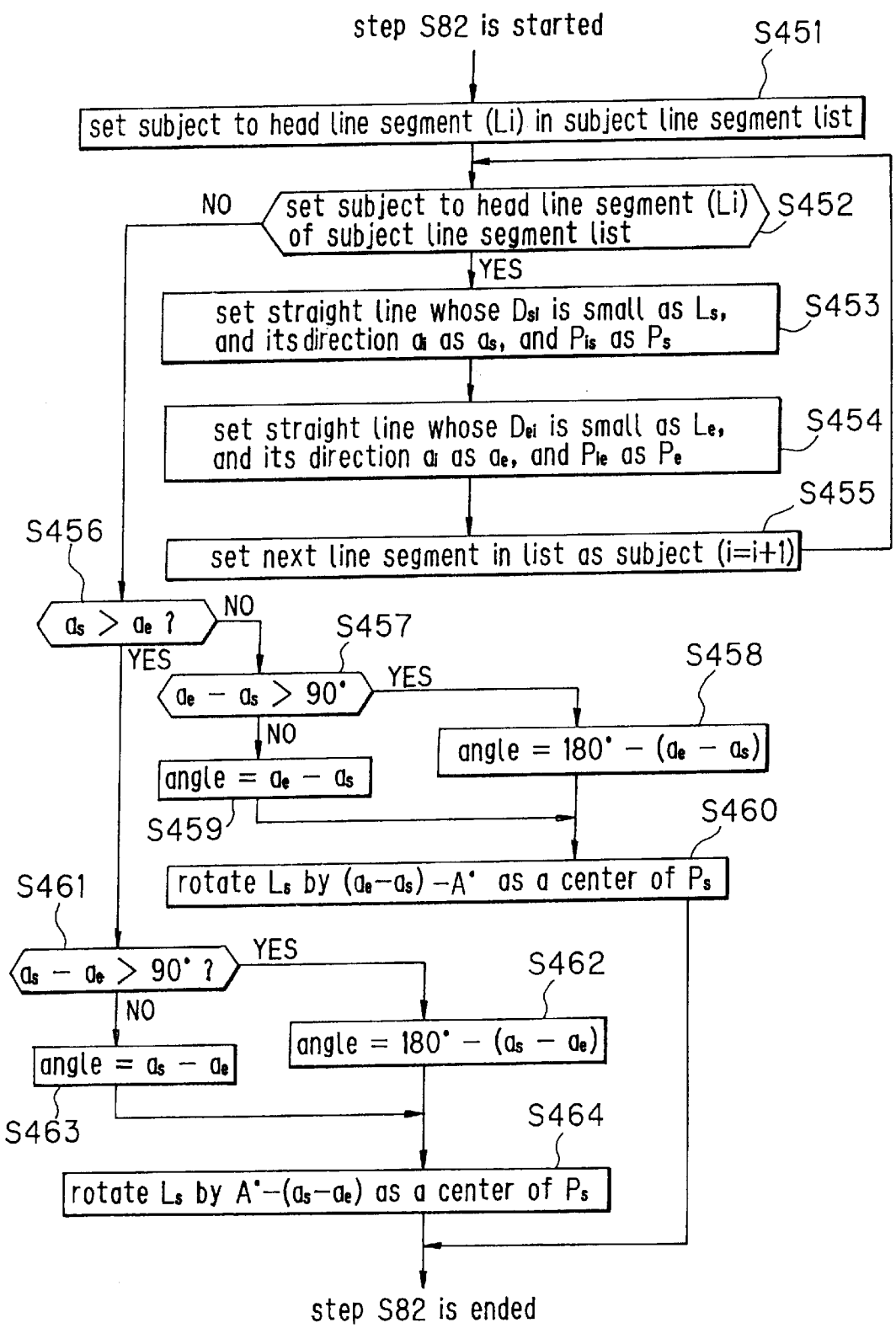
FIG. 74 is a flow chart for describing in detail the process operation from the step S82 of FIG. 8 in case when the embodiment shown in FIG. 68 to FIG. 72 is executed.

In FIG. 73, at a first step S441, a confirmation is made of coordinate values for a starting point $P_{11s}$ of a gesture $S_{11}$ and an end point $P_{11e}$ thereof. At a step S442, both a gesture $S_{21}$ and a gesture $S_{22}$, which are contained in a gesture $S_{23}$ are confirmed. then, at a step S443 and a step 444, numeral values of the gesture $S_{21}$ and the gesture $S_{22}$ inside this gesture $S_{23}$ are interpreted. Then, at the final step S445, a numeral value signified by combining the gesture $S_{21}$ with the gesture $S_{22}$ is confirmed.

Figure 68:
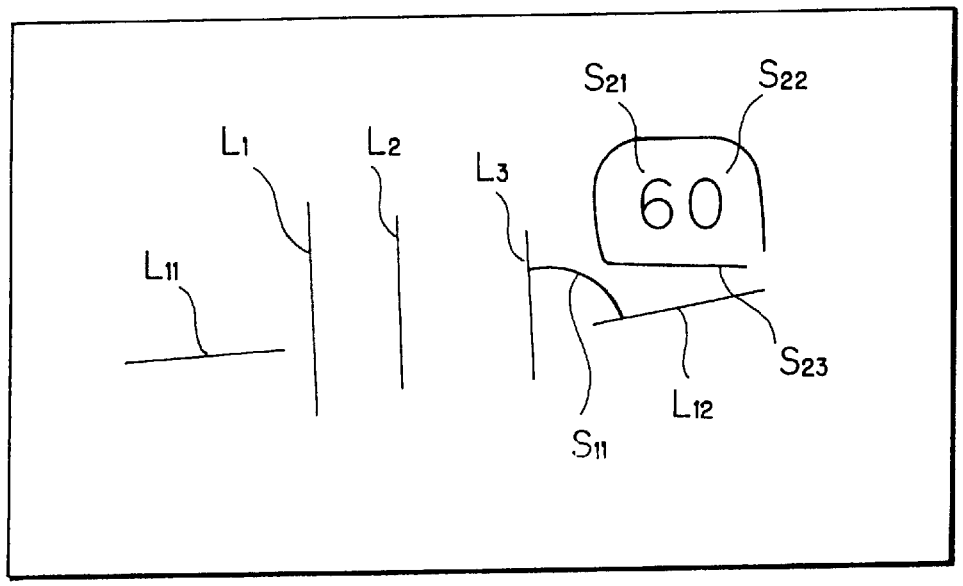
FIG. 68 is a first diagram for explaining a gesture of a handwritten character.
Figure 69:
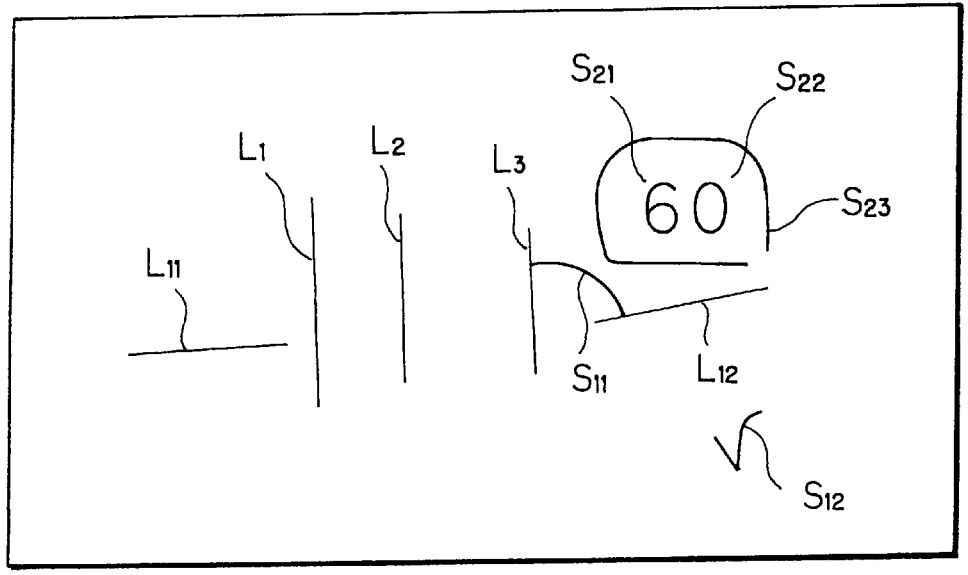
FIG. 69 is a second diagram for explaining a gesture of a handwritten character.
Figure 70:
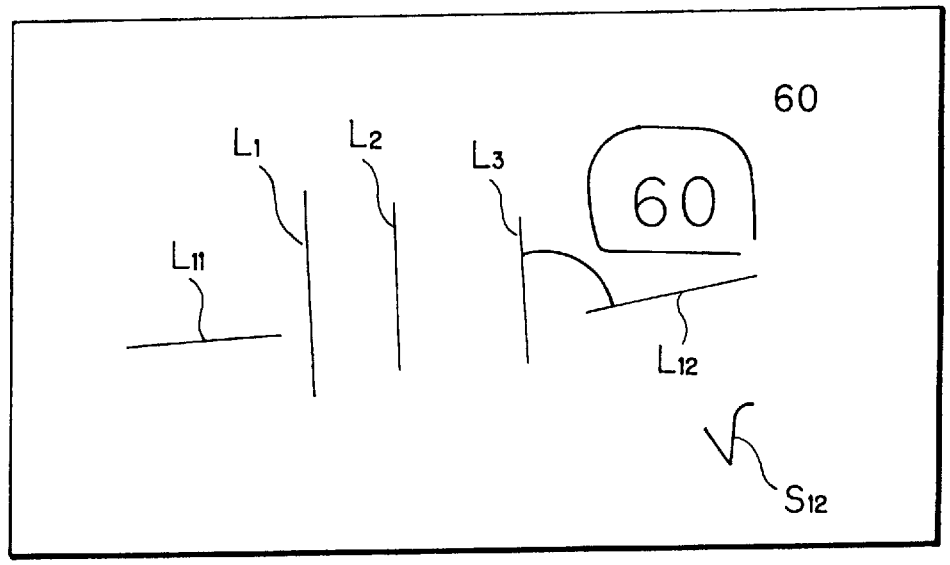
FIG. 70 is a third diagram for explaining a gesture of a handwritten character.

In the embodiment shown in FIG. 68, a character of 60 is entered as the gestures $S_{21}$ and $S_{22}$ into the gesture $S_{23}$ having such a closed shape that an internal space is separated from an external space. Then, as shown in FIG. 69, after these gestures $S_{11}$ and $S_{21}$ to $S_{23}$ have been inputted, when the reserved handwriting executing gesture $S_{12}$ is entered, the character inside the gesture $S_{23}$ is confirmed, and this confirmation result is displayed adjacent to this character, as represented in FIG. 70.

On the other hand, at a step S451 of FIG. 74, the head line segment Li in the subject line segment list is set as a first processing subject. Then, at a step S452, a judgement is made as to whether or not the data about the line segment Li is present. When the data on the line segment Li is present, the process operation is advanced to a step S453. At this step, a straight line is set as Ls, whose distance Dsi from the starting point $Q_{11s}$ of the gesture $S_{11}$ s minimum, and a direction "ai" of this straight line Ls is set as "as". Further, a point Pis is set as Ps, which is located at the nearest position from the starting point $Q_{11s}$, and is positioned on this straight line Ls. In other words, at the step S453, the distance $D_{si-1}$ obtained in the just before signal line $L_{i-1}$ is compared with the distance Dsi of the present line segment Li, and the straight line having the shorter distance is set as Ls. That is, under this condition, the straight line located at the nearest position from the starting point $Q_{11s}$ of the gesture $S_{11}$ is selected as the first line segment Ls to be processed.

Next, the process operation is advanced to a step S454 at which a straight line is set as Le whose distance Dei from then end point $Q_{11e}$ of the gesture $S_{11}$ becomes minimum, and whose direction "ai" is set as "ae", and also a point Pie is set as Pe, which is located on this straight line and at the nearest position from the end point $Q_{11e}$ of the gesture $S_{11}$. In other words, a comparison is performed between the present is performed between the present distance Dei and the distance $D_{ei-1}$ of the previously processed line segment $L_{i-1}$, and the straight line whose distance is small is set as Le. As a result, such a straight line located at the nearest position from the end point $Q_{11e}$ of the gesture $S_{11}$ is selected as the second subject line segment Le to be processed.

Subsequently, the process operation is advanced to a step S455 at which the variable "i" is incremented by 1, and then the process operation is returned to the step S452 at which a similar process operation is repeated.

At the step S452, when it is so judged that there is no data about the line segment Li (namely, retrieving operations for all data about line segment Li have been accomplished), the process operation is advanced to a step S456. At this step, the direction "as" of the line segment Ls located at the nearest position from the starting point $Q_{11s}$ of the gesture $S_{11}$ is compared with the direction "ae" of the line segment Le located at the nearest position from the end point $Q_{11e}$ of this gesture $Q_{11}$. When the direction "ae" is larger than the direction "as", the process operation is advanced to a step S457 at which a judgement is made as to whether or not a value produced by subtracting "as" from "ae" is greater than 90°.

When (ae−as) is greater than 90°, the process operation is advanced to a step S458 at which a value of 180°−(ae−as) is set to "angle". When (ae−as) is smaller than, or equal to 90°, the process operation is advanced to a step S459 at which the value of (ae−as) is directly set to "angle". that is, an acute angle (namely, smaller angle) among the angles defined between the line segment Ls and the line segment Le is set to "angle".

Then, the process operation is advanced from either the step S458 or the step S459 to the step S460 at which the line segment Ls located at the nearest position from the starting point $Q_{11s}$ of the gesture $S_{11}$ is rotated by an angle of ((ae−as)−A°) around the point Ps located at the nearest position from the starting point $Q_{11s}$ of the gesture $S_{11}$ as a center. As a consequence, the line segment Ls located near the starting point $Q_{11s}$ of the gesture $S_{11}$ is rotated by a preselected angle with respect to the line segment Le located at the nearest position from the end point $Q_{11e}$, so that both of these line segments are adjusted to define an angle of A°. It should be understood that this value of "A" is such a value recognized at the step S445.

When it is so judged at a step S456 that the angle "as" is greater than the angle "ae", the process operation is advanced to a step S461 at which a check is made as to whether or not the value of (as−ae) is larger than 90°. When (as−ae) is larger than 90°, the process operation is advanced to a step S462 at which the value of 180°−(as−ae) is set to "angle". When the value of (as−ae) is smaller than, or equal to 90°, the process operation is advanced to a step S463 at which the value of (as−ae) is set to "angle".

That is, similar to the above-described case, a smaller angle (acute angle) among the angles defined by the two straight lines Ls and Le is set to "angle". Then, at the step S464, the straight line Ls is rotated by A°−(as−ae) around the point Ps as a center, and the angle of this straight line Ls with respect to the straight line Le is adjusted to become A°.

Figure 71:
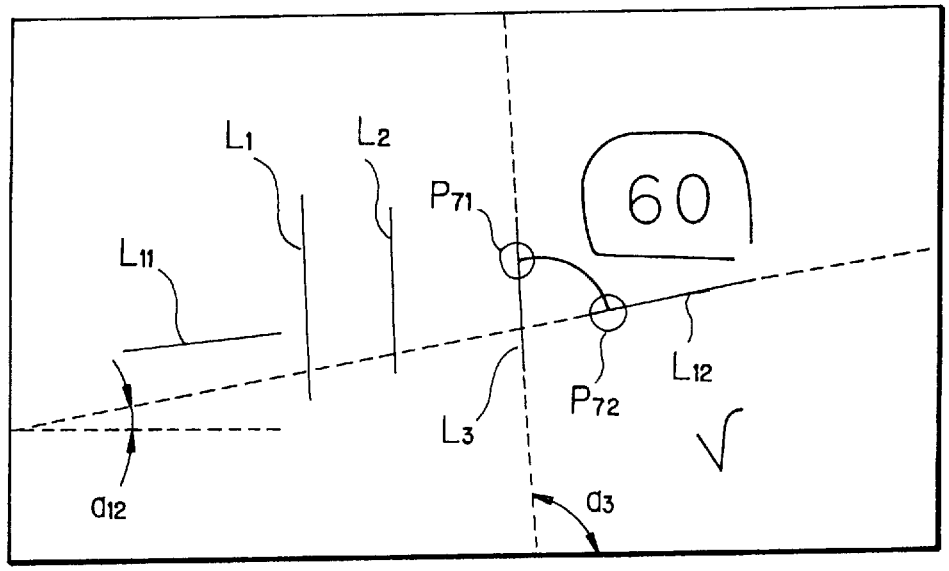
FIG. 71 is a fourth diagram for explaining a gesture of a handwritten character.
Figure 72:
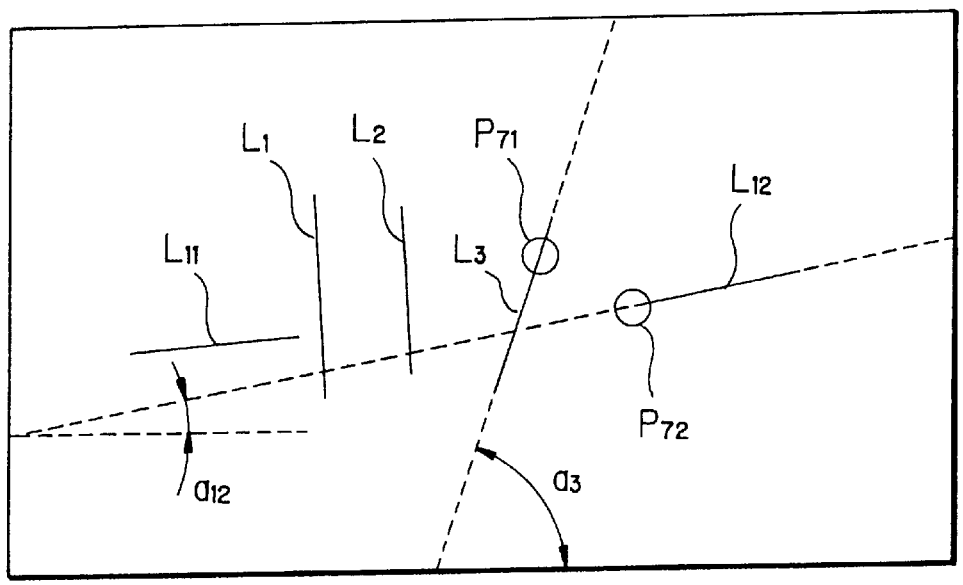
FIG. 72 is a fifth diagram for explaining a gesture of a handwritten character.

In the embodiment shown in FIG. 71 and FIG. 72, both of the direction $a_3$ of the straight line $L_3$ and the direction $a_{12}$ of the straight line $L_{12}$, which are located near the starting point and the end point of the gesture $S_{11}$, are obtained. Furthermore, as indicated in FIG. 72, the direction $a_3$ of the straight line $L_3$ is changed, and the angle of this straight line $L_s$ with respect to the straight line $L_{12}$ is so corrected that it becomes an angle A°(=60°) designated by the gesture $S_{21}$ and the gesture $S_{22}$.

It should be noted that a plurality of windows may be utilized in order that the variation in the representation made when the command corresponding to the gesture has been executed is represented to a user. When the execution of the input gesture is confirmed, not only such a YES/NO checking process, but also change/correct for the process subject/parameter may be employed.

Not only the process operation for the presently available line segment, but also such a mode change as the gesture command recognizing/executing method (for example, interrupt of gesture entry, and allowable of using same handwriting by plural gestures) may be performed by the gesture commands.

Although the display condition of the line segment is corrected in the above-described embodiments, the present invention may be applied to such cases that the display state of the character is changed and corrected. The latter-mentioned embodiment will now be described.

Figure 75:
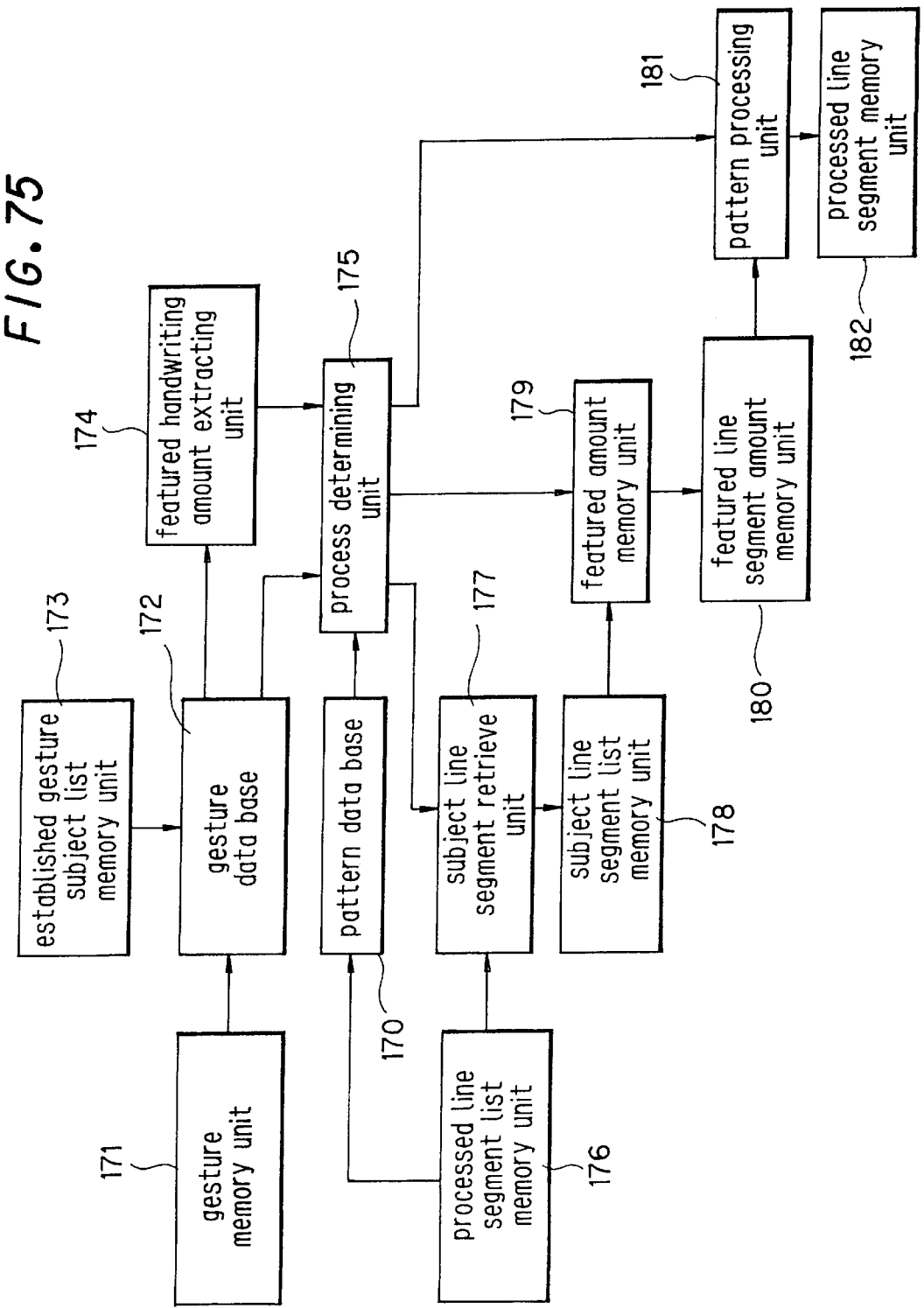
FIG. 75 is a further functional block diagram for explaining the operation of the embodiment shown in FIG. 1.

FIG. 75 schematically represents a functional block diagram for a gesture execution process operation when a display condition of either a character, or a pattern (figure) is changed. The basic arrangement of this functional block diagram including a handwriting memory unit 171 through a processed pattern memory unit 182 is similar to the functional block diagram involving the handwriting memory unit 71 to the processed line segment memory unit 82. In this embodiment, such a point that a pattern data base 170 is added is different from the functional block diagram of FIG. 3.

For instance, when the distance of the line segment with respect to the above-described gesture handwriting is obtained, the distance between the gesture and the edge point of the line segment close to this gesture. When a distance between a pattern (character) and a gesture is obtained, a distance between this gesture and a point located at the nearest position from an outer frame (circumscribed rectangle) of a character is obtained.

Similarly, for instance, when a center of the above-explained line segment is obtained, a center between both edge points of the line segment. In case of a character, a central position thereof is not always clarified. Thus, a center of an outer frame of a character is recognized as a center of this character. As the outer frame, a circle and a polygon other than a rectangle may be employed. When a normal pattern but not a character is processed, a gravity position thereof is recognized as a center thereof. As described above, since the different process operations are required for each of objects such as characters and patterns, these different process operations are performed based on a pattern data base 170, and the characters and patterns are supplied to a process determined.

The process determining unit 175 reads out such data as the subject pattern retrieving method, the subject pattern featured amount extracting method, and the subject pattern processing method corresponding to the gestures stored in the complete gesture subject list memory unit 173 from a gesture data base 172, and also reads out a featured amount of a gesture enter from the handwriting featured amount memory unit 174. Then, the process operation is determined in correspondence with these data to control a subject pattern retrieving unit 177, a featured amount extracting unit 179, and a pattern processing unit 181.

In an established pattern list memory unit 176, a pattern sort number is stored in addition to the previously inputted data about the patterns (patterns to be processed) other than the gesture. This data is processed in accordance with the above-explained necessary modification process operation by the pattern data base 170, and thereafter is supplied to the process determining unit 175. The process determining unit 175 determines the process operation suitable for the sort of the gesture by utilizing this pattern sort number with respect to the element of the list.

Under control of the process determining unit 175, the subject pattern retrieving unit 177 retrieves a pattern to be processed from the line segments stored in the established pattern list memory unit 176, and supplies the retrieved result to the subject pattern list memory unit 178 so as to be stored therein.

Under control of the process determining unit 175, the featured amount extracting unit 179 extracts the featured amount of the subject pattern stored in the subject pattern list memory unit 178, and supplies the extracted result to the pattern featured amount memory unit 180 to be stored therein. The pattern processing unit 181 processes the featured amount of the pattern to be processed, which has been stored in the pattern featured amount memory unit 180, and produces data used to change the display condition of this pattern under control of the process determining unit 175. Then, this data is furnished to the processed pattern memory unit 182 so as to be stored therein.

The data stored in this processed pattern memory unit 182 is read and then supplied via the display controller 11 to the V-RAM 12 to be expanded as bit map data. Then, this expanded data is read by the display controller 11 to be outputted on the display unit 13 for a representation purpose.

Figure 76:
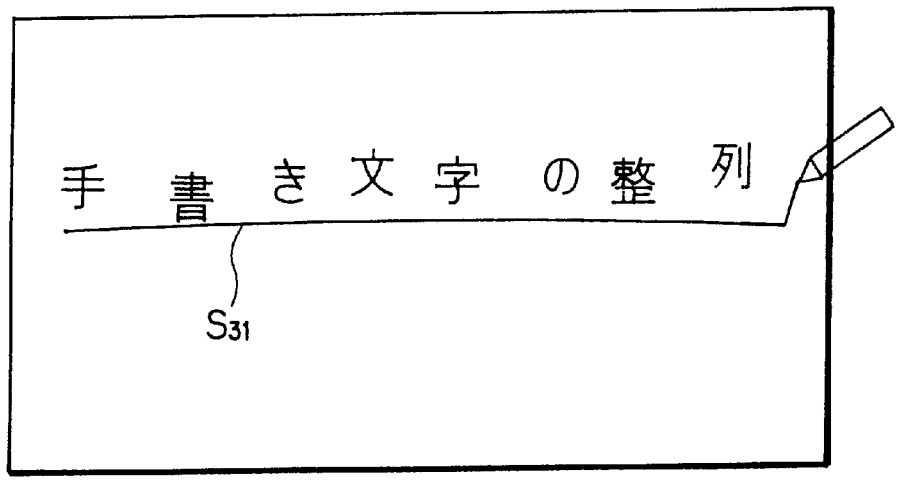
FIG. 76 is a first diagram for describing a process operation to align characters.
Figure 77:
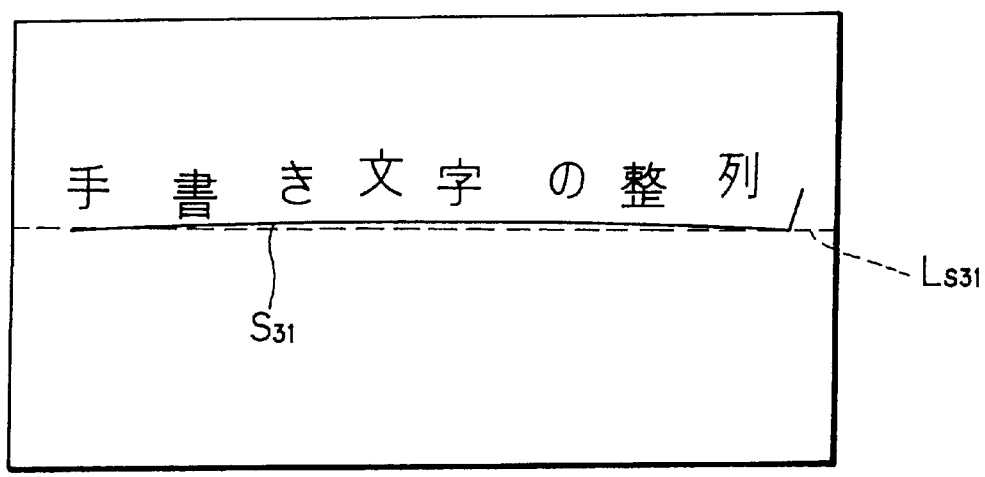
FIG. 77 is a second diagram for describing a process operation to align characters.
Figure 78:
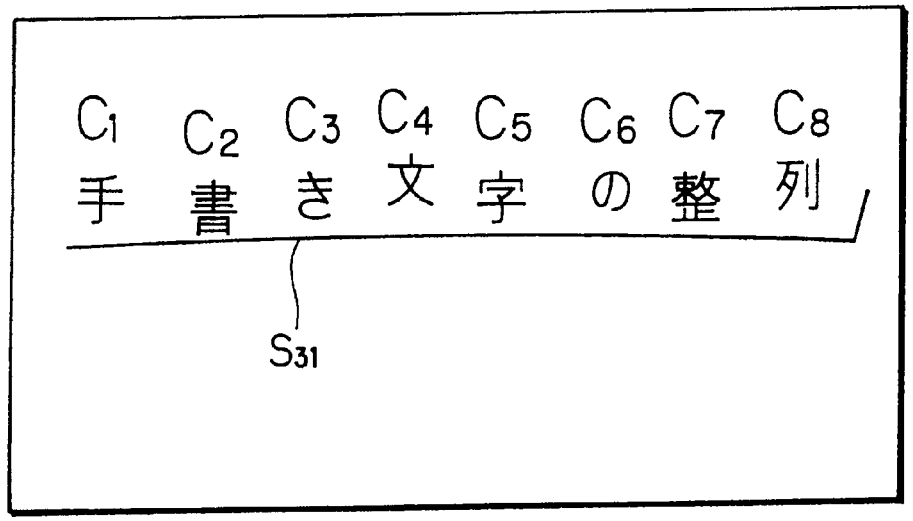
FIG. 78 is a third diagram for describing a process operation to align characters.
Figure 79:
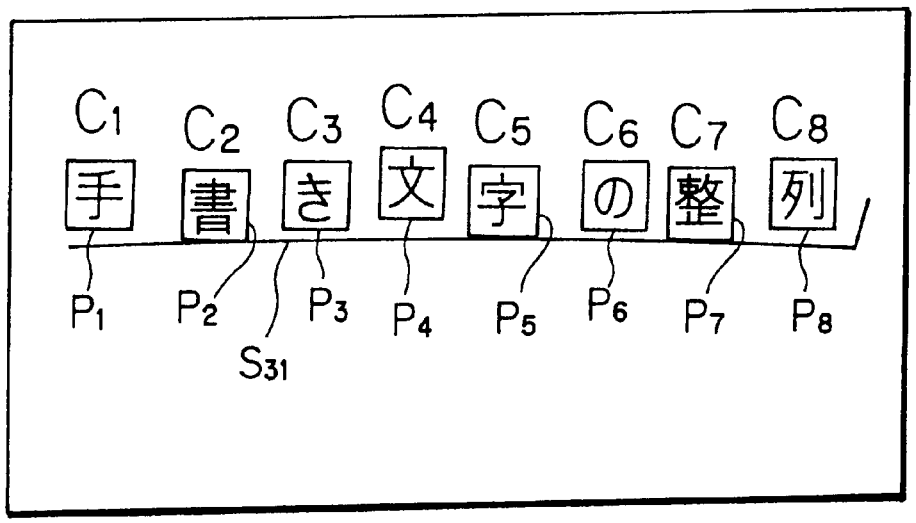
FIG. 79 is a fourth diagram for describing a process operation to align characters.
Figure 80:
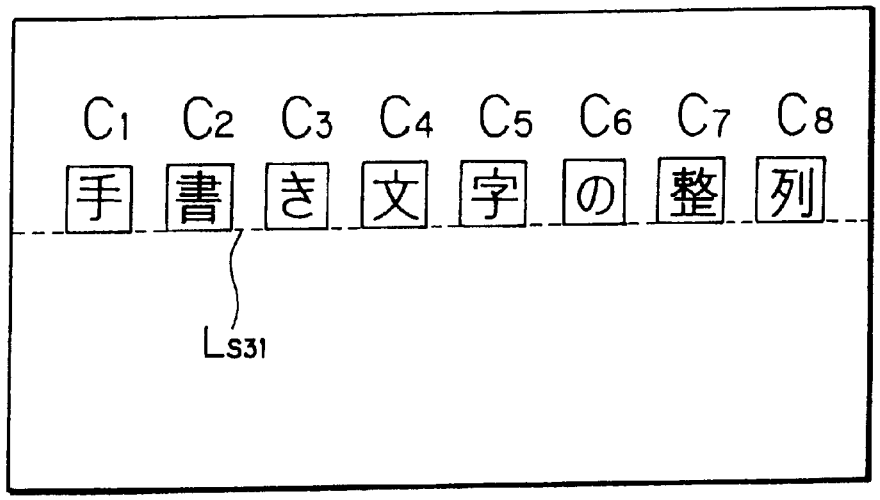
FIG. 80 is a fifth diagram for describing a process operation to align charachters.
Figure 81:
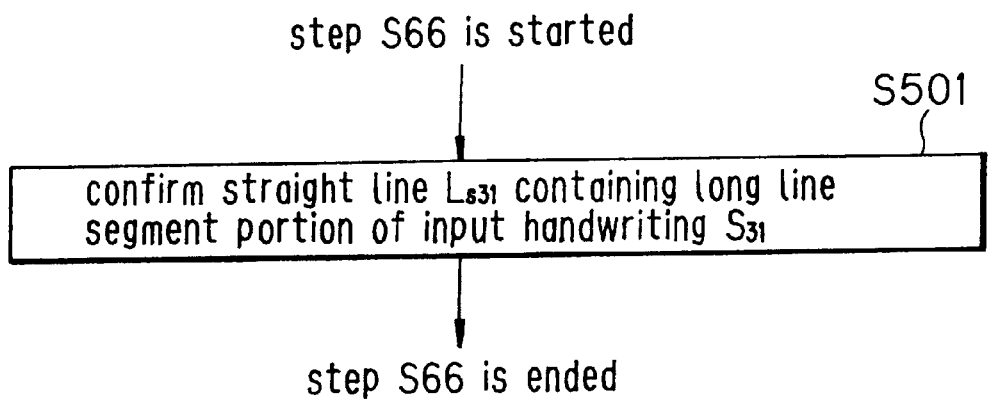
FIG. 81 is a flow chart for describing in detail the process operation from the step S66 to FIG. 7 in case when the embodiment shown in FIG. 76 to FIG. 80 is performed.

FIG. 76 to FIG. 80 schematically indicate an embodiment such that a character is aligned on a preselected straight line. to realize such an embodiment, the process operation defined at the step S66 in FIG. 7 is carried out as shown in a step S501 of FIG. 81. that is, as shown in FIG. 76, when such a gesture $S_{31}$ is inputted which is drawn by bending at a substantially right angle one edge portion of a sufficiently long straight line at a short portion thereof, as illustrated in FIG. 77, a straight line $L_{s31}$ containing a longer line segment among this gesture $S_{31}$ is detected.

It should be noted that when this gesture $S_{31}$ has such a shape with a bending angle at a substantially right angle, and one length of which is longer than the other length multiplied by a reference value, this gesture is recognized as a gesture for a character alignment.

Figure 82:
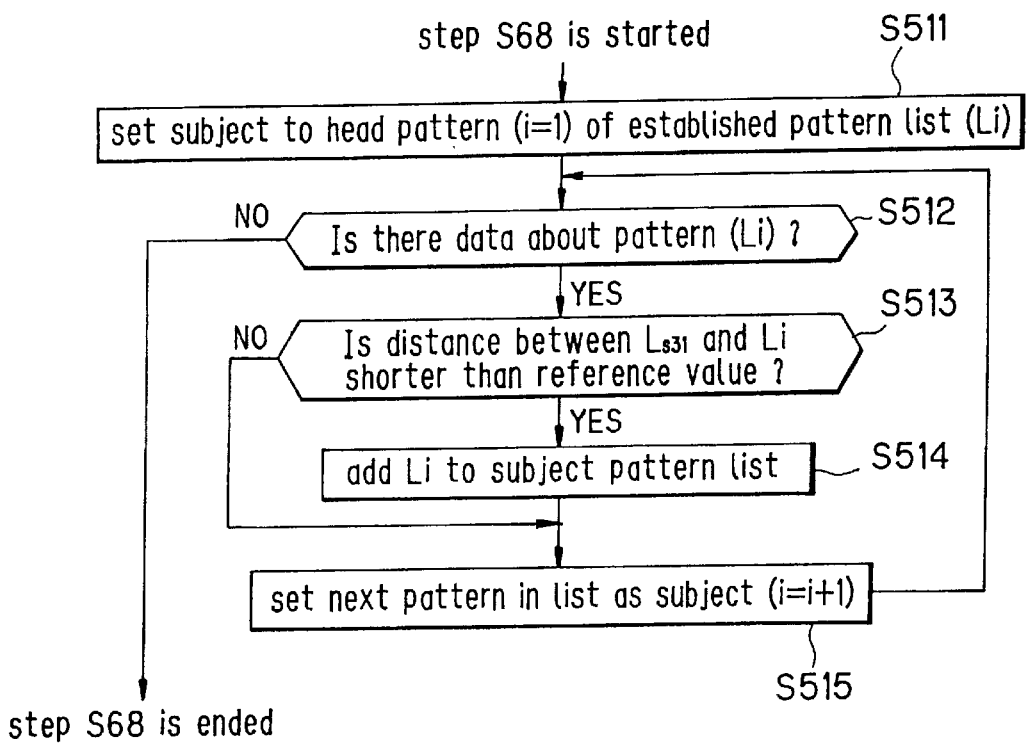
FIG. 82 is a flow chart for describing in detail the process operation from the step S68 of FIG. 7 in case when the embodiment shown in FIG. 76 to FIG. 80 is executed.

The process operation for retrieving the subject line segment as defined at the step S68 of FIG. 7 is carried out as illustrated in FIG. 82. That is, the head pattern Li in the established pattern list is selected as a first processing subject. Since a line segment Li, a character Lci, or a pattern $L_{Fi}$ has been stored as the pattern Li in the established pattern list, any one of them is selected. At the next step S512, a judgement is made as to whether or not there is data about the pattern Li. When the data about the pattern Li is present, the process operation is advanced to a step S513 at which it is so judged whether or not the distance between the straight $L_{s3}$, and the pattern Li is smaller than a preset reference value. When the pattern Li is positioned close to the straight line $L_{s31}$, the process operation is advanced to a step S514 at which this pattern Li is registered in the subject pattern list.

Either when it is so judged at the step S513 that the pattern Li is relatively largely separated from the straight line $L_{s31}$, or after the pattern Li has been registered into the subject pattern list at the step S514, the process operation is advanced to a step S515. At this step S515, the variable "i" is incremented by 1, and the process operation is returned to the step S512 at which a similar process operation is repeated. The pattern (character) of the gesture $S_{31}$ to be processed is retrieved by repeating the above-described process operation.

In case of the embodiment shown in FIG. 76 to FIG. 80, there are characters $C_1$ to $C_8$ as the characters arranged near the straight line $L_{s31}$. As a result, in this case, these 8 characters are selected as the subject processed by the gesture $S_{31}$.

Figure 83:
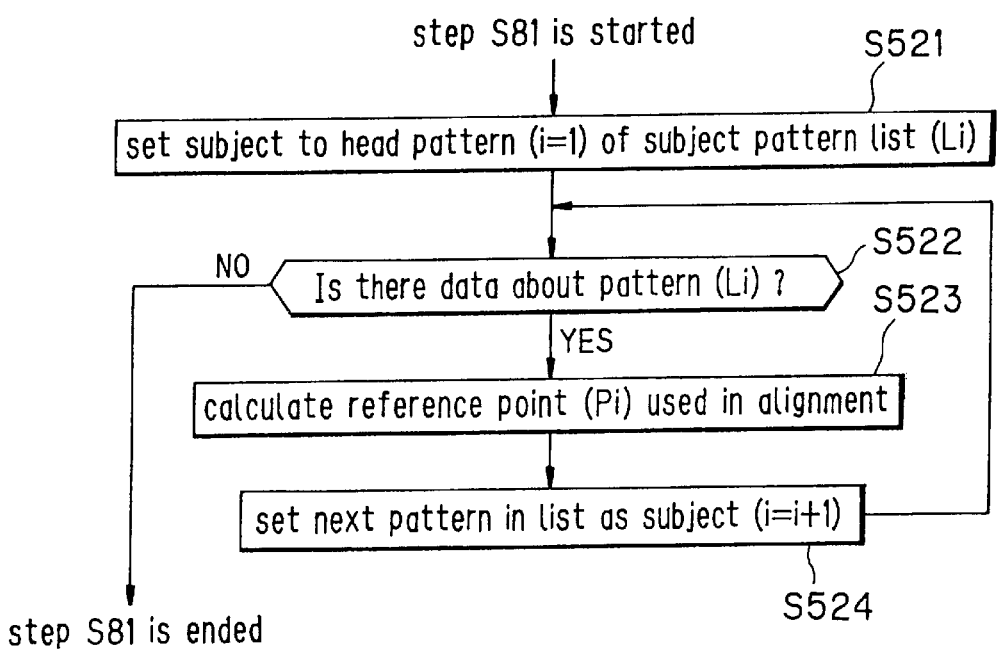
FIG. 83 is a flow chart for describing in detail the process operation from the step S81 of FIG. 8 in case when the embodiment shown in FIG. 76 to FIG. 80 is performed.

Subsequently, the process operation for confirming the featured amount of the line segment to be processed at the step S81 shown in FIG. 8 is carried out as shown at step S521 to S524 of FIG. 83. that is, at a first step S521, the head pattern Li in the subject pattern list is first set as a subject to be processed. At a step S522, a confirmation is made as to whether or not there is data about this pattern Li. When there is the data about the pattern Li, the process operation is advanced to a step S523 at which a reference point Pi of this pattern Li is obtained. This reference point Pi is defined as, for instance, a lower right point of an outer frame of the pattern.

Thereafter, the variable "i" is incremented by 1 at the step S524, and then the process operation is returned to the step S522 at which a similar process operation is repeated. Thus, the point located at the nearest position from the straight line $L_{s31}$ corresponding to the gesture $S_{31}$ corresponding to the gesture $S_{31}$ within the outer frames of the respective patterns Li is stored as "Pi".

In the embodiment shown in FIG. 79, the points $P_1$ to $P_8$ located at the right lower positions of the characters $C_1$ and $C_8$ are stored as the points corresponding to the straight line $L_{s31}$ for the gesture $S_{31}$.

Figure 84:
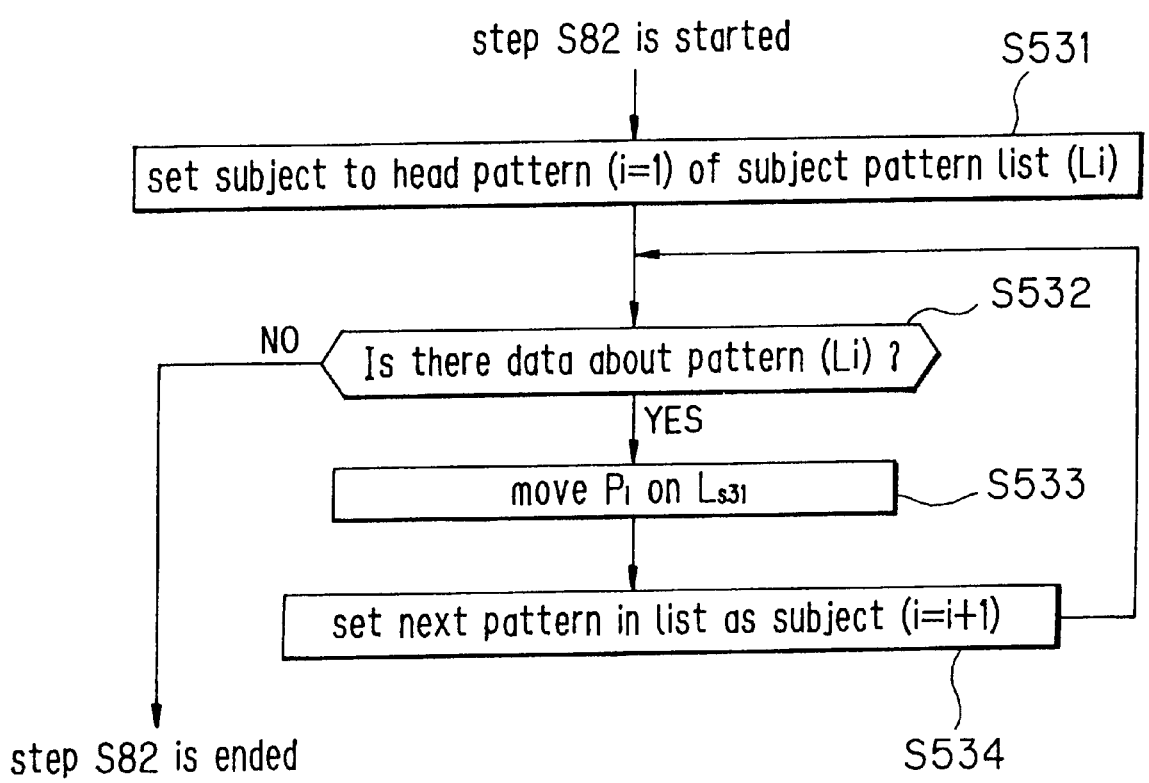
FIG. 84 is a flow chart for describing in detail the process operation from the step S82 of FIG. 8 in case when the embodiment shown in FIG. 76 to FIG. 80 is executed.

The process operation for calculating the processed line segment data at the step S82 of FIG. 8 is executed as illustrated at steps S531 to S534 of FIG. 84. Namely, at a first step S531, the head pattern Li of the subject pattern list is selected, and at a step S532, a confirmation is made as to whether or not there is data about this pattern Li. When the data about the pattern Li is present, this point Pi is moved on the straight line $l_{s31}$ corresponding to the gesture $S_{31}$ at a step S533. Then, the process operation is advanced to a step S534 at which the variable "i" is incremented by 1. Then, the process operation is returned to the step S532 at which a similar process operation is repeated. Thus, the point of the character to be processed is moved on the straight line $L_{s31}$.

In the embodiment shown in FIG. 80, the points $P_1$ to $P_8$ of the outer frame of the characters $C_1$ to $C_8$ are transported on the straight line $L_{s31}$.

It should be understood that although the point Pi is transported on the straight line $L_{s31}$ in this embodiment, this point Pi may be alternatively transported as follows: The point Pi may be moved on the straight line in parallel thereto in such a manner that a summation of the distances between the straight line $L_{s31}$ and this point Pi becomes minimum. The point Pi may be moved on the straight line $L_{s31}$ in parallel thereto in such a manner that a powered summation of the distances between this point Pi and the straight line $L_{s31}$ becomes minimum.

As previously explained, in accordance with the handwriting input display method as recited in claim 1, since the display condition of the line segment is changed in correspondence with the inputted gesture, it is possible to quickly and surely change the display condition of the line segment.

Also, in accordance with the handwriting input display method as recited in claim 2, since the display condition of the shape is changed in correspondence with the featured amount of the gesture, the display condition can be more precisely changed by investigating the input condition of the gesture.

What is claimed is:

1. A handwriting input display apparatus comprising:

display means for displaying either a line segment of a character, corresponding to a calculation result of a computer;

tablet means, at least a portion of which is transparent, and formed on said display means, for providing coordinate data in response to an operation;

at least one input handwriting storing means for storing input handwriting corresponding to said coordinate data provided from said tablet means in response to said operation;

means for detecting a feature portion of said coordinate data which corresponds to a set of one or more characteristics of said input handwriting stored in said input handwriting storing means;

means for comparing said feature portion of said coordinate data handwriting with a feature portion of a gesture stored in a previously employed gesture data base; and means for determining that said operation is a gesture when said feature portion is said coordinate data is similar to the feature portion of said gesture based on a comparison with a predetermined level of similarity and executing the corresponding gesture; wherein:
when either the line segment or the character is being displayed on said display, said feature portion of said coordinate data is provided by said tablet means and in response to said feature portion of said coordinate data, a preselected command is performed to chance a display condition of said line segment or said character,
wherein a plurality of line segments are displayed on said display, and said operation serves to bridge for bridging at least three line segments, said command rearranges at least said three line segments at an equidistant to be displayed.

2. A handwriting input display apparatus comprising:
display means for displaying either a line segment of a character, corresponding to a calculation result of a computer;
tablet means, at least a portion of which is transparent, and formed on said display means, for providing coordinate data in response to an operation;
at least one input handwriting storing means for storing input handwriting corresponding to said coordinate data provided from said tablet means in response to said operation;
means for detecting a feature portion of said coordinate data which corresponds to a set of one or more characteristics of said input handwriting stored in said input handwriting storing means;
means for comparing said feature portion of said coordinate data handwriting with a feature portion of a gesture stored in a previously employed gesture data base; and
means for determining that said operation is a gesture when said feature portion is said coordinate data is similar to the feature portion of said gesture based on a comparison with a predetermined level of similarity and executing the corresponding gesture; wherein:
when either the line segment or the character is being displayed on said display, said feature portion of said coordinate data is provided by said tablet means and in response to said feature portion of said coordinate data, a preselected command is performed to chance a display condition of said line segment or said character,
wherein a plurality of line segments are displayed, and said operation serves to designate an intersecting angle between at least two line segments, said command rearranging at least said two line segments at a predetermined angle for representation.

3. A handwriting input display apparatus as claimed in claim 2 wherein said operation designate an intersection on a preselected point on each of said at least two line segments, said command rearranging said at least two line segments at a predetermined point on each of said line segments at a preselected angle for representation.

4. A handwriting input display apparatus as claimed in claim 2 or claim 3 wherein said operation serves to enter a number adjacent to said at least two line segments, said command rearranging said at least two line segments at an angle designated by said number.

5. A handwriting input display apparatus comprising:
display means for displaying either a line segment of a character, corresponding to a calculation result of a computer;
tablet means, at least a portion of which is transparent, and formed on said display means, for providing coordinate data in response to an operation;
at least one input handwriting storing means for storing input handwriting corresponding to said coordinate data provided from said tablet means in response to said operation;
means for detecting a feature portion of said coordinate data which corresponds to a set of one or more characteristics of said input handwriting stored in said input handwriting storing means;
means for comparing said feature portion of said coordinate data handwriting with a feature portion of a gesture stored in a previously employed gesture data base; and
means for determining that said operation is a gesture when said feature portion is said coordinate data is similar to the feature portion of said gesture based on a comparison with a predetermined level of similarity and executing the corresponding gesture; wherein:
when either the line segment or the character is being displayed on said display, said feature portion of said coordinate data is provided by said tablet means and in response to said feature portion of said coordinate data, a preselected command is performed to change a display condition of said line segment or said character,
wherein a plurality of line segments are displayed on said display, and said operation serves to cause said at least two line segments to intersect each other adjacent to a first set of end points of said two line segments, said command rearranging said first set of end points of at least two line segments so as to align said first set of end points on a common straight line.

6. A handwriting input display apparatus as claimed in claim 5 wherein said operation serves to cause said at least two line segments to intersect with each other at a point near a second set of end points of said line segments, said command rearranging both said first and second sets of end points of said at least two line segments on two common straight lines for representation.

7. A handwriting input display apparatus comprising:
display means for displaying either a line segment of a character, corresponding to a calculation result of a computer;
tablet means, at least a portion of which is transparent, and formed on said display means, for providing coordinate data in response to an operation;
at least one input handwriting storing means for storing input handwriting corresponding to said coordinate data provided from said tablet means in response to said operation;
means for detecting a feature portion of said coordinate data which corresponds to a set of one or more characteristics of said input handwriting stored in said input handwriting storing means;
means for comparing said feature portion of said coordinate data handwriting with a feature portion of a gesture stored in a previously employed gesture data base; and
means for determining that said operation is a gesture when said feature portion is said coordinate data is similar to the feature portion of said gesture based on a comparison with a predetermined level of similarity and executing the corresponding gesture; wherein:

when either the line segment or the character is being displayed on said display, said feature portion of said coordinate data is provided by said tablet means and in response to said feature portion of said coordinate data, a preselected command is performed to change a display condition of said line segment or said character, wherein a plurality of line segments are displayed on said display, and said operation serves to enter parallel lines at a predetermined angle with respect to said at least two line segments, said command rearranging said at least two line segments in parallel to each other.

8. A handwriting input display apparatus as claimed in claim 7 wherein said operation further causes said at least two line segments to intersect each other, said command rearranging cross points on said at least two line segments on a common straight line.

9. A handwriting input display apparatus comprising:

display means for displaying either a line segment of a character, corresponding to a calculation result of a computer;

tablet means, at least a portion of which is transparent, and formed on said display means, for providing coordinate data in response to an operation;

at least one input handwriting storing means for storing input handwriting corresponding to said coordinate data provided from said tablet means in response to said operation;

means for detecting a feature portion of said coordinate data which corresponds to a set of one or more characteristics of said input handwriting stored in said input handwriting storing means;

means for comparing said feature portion of said coordinate data handwriting with a feature portion of a gesture stored in a previously employed gesture data base; and means for determining that said operation is a gesture when said feature portion is said coordinate data is similar to the feature portion of said gesture based on a comparison with a predetermined level of similarity and executing the corresponding gesture; wherein:

when either the line segment or the character is being displayed on said display, said feature portion of said coordinate data is provided by said tablet means and in response to said feature portion of said coordinate data, a preselected command is performed to change a display condition of said line segment or said character, wherein said operation further serves to temporarily stop execution thereof, the execution of said command being temporarily stopped until a release operation is performed.

10. A handwriting input display apparatus comprising:

display means for displaying either a line segment of a character, corresponding to a calculation result of a computer;

tablet means, at least a portion of which is transparent, and formed on said display means, for providing coordinate data in response to an operation;

at least one input handwriting storing means for storing input handwriting corresponding to said coordinate data provided from said tablet means in response to said operation;

means for detecting a feature portion of said coordinate data which corresponds to a set of one or more characteristics of said input handwriting stored in said input handwriting storing means;

means for comparing said feature portion of said coordinate data handwriting with a feature portion of a gesture stored in a previously employed gesture data base; and means for determining that said operation is a gesture when said feature portion is said coordinate data is similar to the feature portion of said gesture based on a comparison with a predetermined level of similarity and executing the corresponding gesture; wherein:

when either the line segment or the character is being displayed on said display, said feature portion of said coordinate data is provided by said tablet means and in response to said feature portion of said coordinate data, a preselected command is performed to chance a display condition of said line segment or said character, wherein a plurality of characters are displayed on said display, and said operation serves to enter a straight line with a predetermined relationship with respect to said at least two characters, said command aligning said at least two characters for representation.

11. A handwriting input display apparatus comprising:

display means for displaying either a line segment of a character, corresponding to a calculation result of a computer;

tablet means, at least a portion of which is transparent, and formed on said display means, for providing coordinate data in response to an operation;

at least one input handwriting storing means for storing input handwriting corresponding to said coordinate data provided from said tablet means in response to said operation;

means for detecting a feature portion of said coordinate data which corresponds to a set of one or more characteristics of said input handwriting stored in said input handwriting storing means;

means for comparing said feature portion of said coordinate data handwriting with a feature portion of a gesture stored in a previously employed gesture data base; and means for determining that said operation is a gesture when said feature portion is said coordinate data is similar to the feature portion of said gesture based on a comparison with a predetermined level of similarity and executing the corresponding gesture; wherein:

when either the line segment or the character is being displayed on said display, said feature portion of said coordinate data is provided by said tablet means and in response to said feature portion of said coordinate data, a preselected command is performed to chance a display condition of said line segment or said character, wherein said set of one or more characteristics of said input handwriting comprises a direction and a length of a straight line of a line segment.

12. A handwriting input display apparatus comprising:

display means for displaying either a line segment of a character, corresponding to a calculation result of a computer;

tablet means, at least a portion of which is transparent, and formed on said display means, for providing coordinate data in response to an operation;

at least one input handwriting storing means for storing input handwriting corresponding to said coordinate data provided from said tablet means in response to said operation;

means for detecting a feature portion of said coordinate data which corresponds to a set of one or more characteristics of said input handwriting stored in said input handwriting storing means;

means for comparing said feature portion of said coordinate data handwriting with a feature portion of a gesture stored in a previously employed gesture data base; and means for determining that said operation is a gesture when said feature portion is said coordinate data is similar to the feature portion of said gesture based on a comparison with a predetermined level of similarity and executing the corresponding gesture; wherein:

when either the line segment or the character is being displayed on said display, said feature portion of said coordinate data is provided by said tablet means and in response to said feature portion of said coordinate data, a preselected command is performed to change a display condition of said line segment or said character, wherein said set of one or more characteristics of said input handwriting comprises a radius and a center angle of an arc.

13. A handwriting input display apparatus comprising:

display means for displaying either a line segment of a character, corresponding to a calculation result of a computer;

tablet means, at least a portion of which is transparent, and formed on said display means, for providing coordinate data in response to an operation;

at least one input handwriting storing means for storing input handwriting corresponding to said coordinate data provided from said tablet means in response to said operation;

means for detecting a feature portion of said coordinate data which corresponds to a set of one or more characteristics of said input handwriting stored in said input handwriting storing means;

means for comparing said feature portion of said coordinate data handwriting with a feature portion of a gesture stored in a previously employed gesture data base; and means for determining that said operation is a gesture when said feature portion is said coordinate data is similar to the feature portion of said gesture based on a comparison with a predetermined level of similarity and executing the corresponding gesture; wherein:

when either the line segment or the character is being displayed on said display, said feature portion of said coordinate data is provided by said tablet means and in response to said feature portion of said coordinate data, a preselected command is performed to chance a display condition of said line segment or said character, wherein said set of one or more characteristics of said input handwriting comprises a number of loops defined by said handwriting.

* * * * *

UNITED STATES PATENT AND TRADEMARK OFFICE
CERTIFICATE OF CORRECTION

PATENT NO.   : 6,240,207 B1
DATED        : May 29, 2001
INVENTOR(S)  : Hideaki Shinozuka It is certified that error appears in the above-identified patent and that said Letters Patent is hereby corrected as shown below:

Column 35,
Line 10, replace "chance" with -- change --.
Line 46, replace "chance" with -- change --.

Column 38,
Line 16, replace "chance" with -- change --.
Line 52, replace "chance" with -- change --.

Column 40,
Line 13, replace "an" with -- of --.
Line 33, replace "chance" with -- change --.

Signed and Sealed this

Eighteenth Day of February, 2003

JAMES E. ROGAN
*Director of the United States Patent and Trademark Office*